(12) United States Patent
Craft

(10) Patent No.: US 11,526,472 B2
(45) Date of Patent: Dec. 13, 2022

(54) MULTI-TRIGGER PERSONALIZED VIRTUAL REPOSITORY

(71) Applicant: Mack Craft, Denver, CO (US)

(72) Inventor: Mack Craft, Denver, CO (US)

( * ) Notice: Subject to any disclaimer, the term of this patent is extended or adjusted under 35 U.S.C. 154(b) by 0 days.

(21) Appl. No.: 17/248,185

(22) Filed: Jan. 13, 2021

(65) Prior Publication Data

US 2021/0133160 A1 May 6, 2021

Related U.S. Application Data

(63) Continuation-in-part of application No. 16/213,959, filed on Dec. 7, 2018, now abandoned.

(60) Provisional application No. 62/974,091, filed on Nov. 13, 2019, provisional application No. 62/596,003, filed on Dec. 7, 2017.

(51) Int. Cl.
| | |
|---|---|
| G06Q 30/06 | (2012.01) |
| G06F 16/245 | (2019.01) |
| G06F 16/188 | (2019.01) |
| G06F 16/14 | (2019.01) |

(52) U.S. Cl.
CPC .......... *G06F 16/196* (2019.01); *G06F 16/148* (2019.01); *G06F 16/156* (2019.01); *G06F 16/245* (2019.01); *G06Q 30/0631* (2013.01)

(58) Field of Classification Search
CPC .... G06F 16/196; G06F 16/156; G06F 16/148; G06Q 30/0631
See application file for complete search history.

(56) References Cited

U.S. PATENT DOCUMENTS

| | | | | |
|---|---|---|---|---|
| 2012/0278314 | A1* | 11/2012 | Sundaresan | G06F 16/3322 707/E17.084 |
| 2013/0347046 | A1* | 12/2013 | Bluvband | H04N 7/15 725/109 |
| 2017/0046965 | A1* | 2/2017 | Kamhi | G03B 29/00 |
| 2017/0109445 | A1* | 4/2017 | Daya | G06F 16/252 |
| 2018/0173896 | A1* | 6/2018 | Arneson | G06F 21/6263 |

* cited by examiner

*Primary Examiner* — Jay A Morrison
(74) *Attorney, Agent, or Firm* — Mark Young, PA

(57) ABSTRACT

A virtual repository system with robust item management automatically derives item data from accessed current and past transactions. The system interfaces with merchant systems to receive current and archived transaction data, scans emails for current and past transaction data, monitors browser data for online transaction data, and accepts manual input. Data obtained from all sources is collated and stored in a cache for user validation, whereupon it is added to a virtual repository. Triggers prompt the delivery of responsive results including information from shared virtual repositories.

20 Claims, 33 Drawing Sheets

Side-by, Reel, 9 flop
There should have the following "Gender" drop down (Choices) buttons for the user to pick:
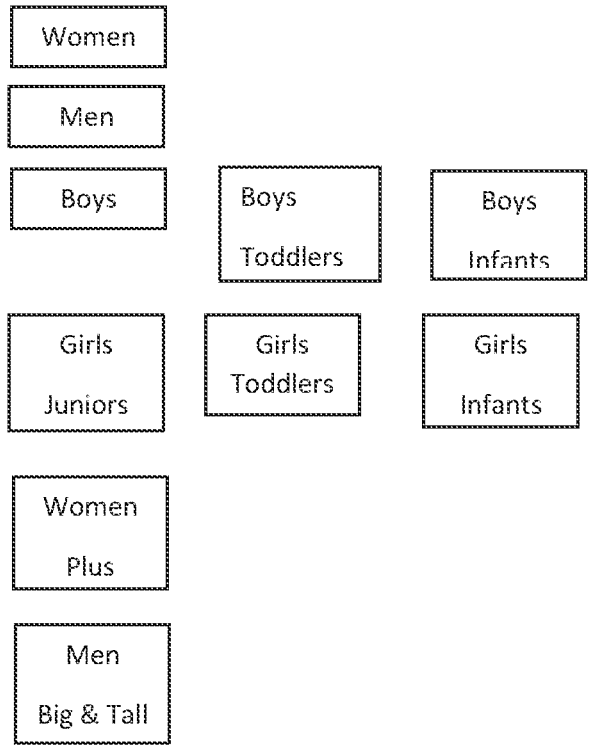
Once user Chooses Gender, user will choose from the following categories:
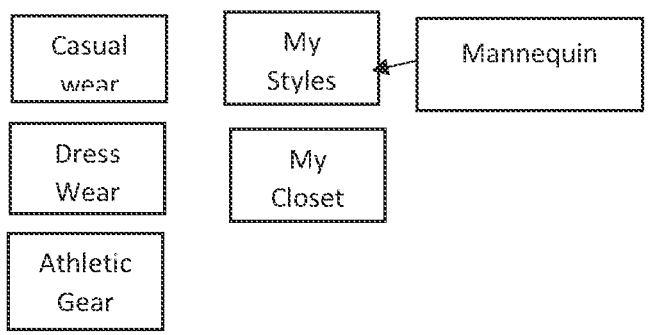
FIG. 24

Slide-by, Reel, 9 flop: Each Main Category will come with

1. Tops, Shirts, jackets, coats

Red, blue, yellow, black, green, brown, white, black, beige

Price: $0 - $20, $21 - $50, $51 - $100, $101 - $150, $151 - $250, $251 - $500, $501+

2. Shirts, Dresses, Shorts, Pants, Jeans

Red, blue, yellow, black, green, brown, white, black, beige

Price: $0 - $20, $21 - $50, $51 - $100, $101 - $150, $151 - $250, $251 - $500, $501+     SAVE

3. Heels, wedges, pumps, sandals, Sneakers, Basketball shoes, casual shoes

Red, blue, yellow, black, green, brown, white, black, beige

Price: $0 - $20, $21 - $50, $51 - $100, $101 - $150, $151 - $250, $251 - $500, $501+     SAVE Budget logic: For all 3 windows or all 9 windows on 9flop (rolodex appears prompting $ dollar amount to enter)

System to keep all auto-match products displaying in window of the slot machine mode feature, slide-by, reel display under dollar amount or price point chosen by the user:

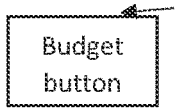

FIG. 25

MULTI-TRIGGER PERSONALIZED VIRTUAL REPOSITORY

RELATED APPLICATION

This application is a nonprovisional of and claims the benefit of priority of U.S. Provisional Application 62/974,091 filed Nov. 13, 2019, and a continuation in part of U.S. Nonprovisional application Ser. No. 16/213,959 filed Dec. 10, 2018, which is a nonprovisional of and the claims the benefit of priority of Provisional Application 62/596,003, filed on Dec. 7, 2017, the entire contents of which are incorporated herein by this reference and made a part hereof.

FIELD OF THE INVENTION

This invention relates to a data management system, and more particularly, to a web-based system that automatically populates, manages and shares data for a virtual repository based on data from disparate sources relating to past and present acquisitions, such as a plurality of products owned, possessed and sought by a user, and shares such data based upon triggers.

BACKGROUND

Individuals own, possess, seek and sell various products. As a nonlimiting example, individuals own and possess clothing items. Some individuals may want to purchase additional clothing items, or sell or donate clothing items. Many individuals are unaware of the vast array of clothing items they currently possess, or when they acquired the items, or from whom they acquired the items. They may not sell or donate unused clothing simply because they forgot they even possess the unused clothing and/or because they cannot be bothered with the hassle of selling and/or donating. Unused clothing consumes valuable closet space, adds to clutter, and requires effort during relocation.

Individuals may want to add garments to their wardrobe. They may want to add a garment that matches another garment they already possess. They may want to add garments that they admired when the garment was worn by another person. They may want to add garments that another person possesses, even if the other person has not worn the garment. They may want to inform others of garments they would like to add to their wardrobe. They may want to inform others of garments they possess and believe others may want to acquire from a merchant.

Individuals may also want to gift garments to a friend, family member, acquaintance or significant other. Without knowing the recipient's size, style and existing wardrobe, any such gift may be a roll of the dice. With knowledge of the recipient's size, style and existing possessions, a gift giver would stand a much greater chance of success.

Individuals may want to sell or donate garments. Garments may no longer fit. Garments may not longer meet the individual's style preferences. Yet, such garments may be valued by others. However, many individuals will not consider selling, donating or leasing the garments because of the inconvenience and uncertainty that such transactions present.

Merchants want to increase sales. They would like consumers to purchase the merchant's garments worn by other purchasers. Many merchants would be willing to provide a purchaser a reward if, in a verifiable manner, their wearing of a garment leads to additional sales of the garment by the merchant. Many consumers who have purchased or possess a garment from a merchant would be receptive to such a reward, and would be receptive to promoting the garment in consideration for the reward.

Many consumers would like and/or would be willing to share information about their possessions with others who are interested. Even if a consumer does not know another person, the consumer may be willing share such information, whether or not the sharing may lead to a reward.

Celebrities may be highly motivated to share information about their possessions with others who are interested. Not only will such sharing foster and enrich their fan base, but it may lead to appreciable rewards.

The foregoing problems and needs are not limited to clothing. Furniture, tools, vehicles, hobby and recreation items, and household items are nonlimiting examples of items in other product categories that an individual may own, possess, or seek, and may be subject to the same or similar problems or needs.

A system that helps individuals manage their possessions and share information about their possessions with others is needed. The system should be easy to setup and maintain. Past and new acquisitions should automatically be added, to facilitate setup and maintenance. Relegating a user to the unenviable task of manually entering all items would prevent widespread acceptance of such a system.

The invention is directed to overcoming one or more of the problems and solving one or more of the needs as set forth above.

SUMMARY OF THE INVENTION

To solve one or more of the problems set forth above, in an exemplary implementation of the invention, a computer-implemented method of managing a virtual repository system includes providing on a computing system a plurality of virtual repositories. Each virtual repository is assigned to a user. Each virtual repository includes item records for items owned and used by the user. A first trigger is received on the computing system, which includes a programmed computer, from a first computing device of a first user. The first trigger requests information associated with at least one virtual repository of the plurality of virtual repositories. Results are sent from the computing system to the first computing device. The results including links to at least one virtual repository of the plurality of virtual repositories in response to the trigger.

The exemplary method accepts various triggers. A target trigger requests information associated with at least one virtual repository of the plurality of virtual repositories assigned to an identified user. An event trigger requests virtual repository information for one or more users appearing at a scheduled event. A location trigger requests information for one or more users at the same location (which includes the vicinity) as the location of the first user who submitted the trigger. A media trigger contains an image, video or sound recording, from which a user's identity is determined via facial or speaker recognition. A product trigger identifies a product and seeks links to users and/or virtual repositories that contain item records that corresponds to the product. A directive trigger includes a condition, which, when satisfied, causes the computing system to send results that include responsive details. In all cases, displayed results may be filtered and sorted by the user In another aspect of an exemplary implementation of the invention a virtual repository method and system with robust item management automatically derives item data from accessed current and past transactions. The system interfaces with merchant systems to receive current and archived transaction data, scans emails for current and past transaction data, monitors browser data for online transaction data, and accepts manual input. The system establishes a communication channel with each remote disparate source. The system executes program instructions to harvest data from each local source. The system filters and collates data from all sources and stores the processed data in a virtual repository for presentation to a user in an easy to navigate GUI. Data obtained from all sources is filtered, collated and stored in a cache for user input and approval. Approved cached entries are migrated into the virtual repository. The resulting virtual repository is an accurate reflection of the user's real-world acquisitions within a user-defined category. A management system enables scheduling and tracking use of, sharing information about and capitalizing on (e.g., selling, leasing, promoting, donating) items. Merchants may reward users for sales attributed to the user's promotion.

In one embodiment, an exemplary computer-implemented method of managing a virtual repository includes a step of a user, via a user computing device, creating a virtual repository. The virtual repository includes a virtual repository identification. A programmed system obtains, on a server, via network communication, item records from a plurality of third party sources, the item records being records of items (e.g., clothes, furniture, etc. . . . ) acquired by the user. The programmed system collates the obtained item records. At this point the records are merged into a structured form, such as a table or list. The step of the programmed system collating the obtained item records entails extracting data from the obtained item records(e.g., identifying and storing data for the fields of each item record) and merging obtained item records into a table, each item record comprising a plurality of fields. The programmed system stores the collated obtained item records in a cache (i.e., a temporary storage). The programmed system presents to the user the collated obtained item records stored in the cache. This gives the user a chance to validate (e.g., accept, reject and delete, or modify) records. The user, via the user computing device, validates the collated obtained item records stored in the cache as presented by the programmed system. Then the programmed system associates the validated collated obtained item records stored in the cache with the virtual repository. The programmed system also stores the validated collated obtained item records on a storage device, whereupon the cache may be wiped clean (i.e., all records may be deleted from the cache). Each item record may include a photograph of an item or an address (e.g., URL or pointer) to a photograph of an item. An affiliate link may be associated with any of the validated collated obtained item records. The affiliate link allows affiliate compensation for clickthrough purchases by other users. A software component on the user computing device (e.g., a plugin, addon or application) searches emails for item records, and provides the item records from searched emails to the programmed system for collating with the obtained item records, for subsequent validation in the cache. Another software component on the user computing device monitors browser activity for item records, and provides the item records from browser activity to the programmed system for collating with the obtained item records, again for subsequent validation in the cache. Manually input item records may be received on the user computing device and provided (communicated via network communication) to the programmed system for collating with the obtained item records, again for subsequent validation in the cache. At least one image and/or information relating to a virtual repository may be displayed on a display device of the user computing device. The displayed image and/or information may be one or more item photos, a navigable two-dimensional graphic representation of the virtual repository, a navigable three-dimensional graphic representation of the virtual repository, item photos arranged in a continuous list from which any photo from the continuous list is displayable by user command, several levels of item photos arranged in continuous lists from which any photo from a continuous list at each displayed level is displayable by user command. Virtual repositories and/or item records marked for sharing may be viewed (accessed for viewing but not changed) by other users. This allows users to browse virtual repositories and item records (e.g., images of items and information pertaining to such items) of other users. A user may record dates of use of items corresponding to item records. This facilitates management of items according to recorded use. Items may be marked for sale, rental and donation. In the cases of sale and rental, a marked item is shared with other users, who may purchase or rent the items through the system. In the case of donation, the user may select a charity to which the item may be donated.

BRIEF DESCRIPTION OF THE DRAWINGS

The foregoing and other aspects, objects, features and advantages of the invention will become better understood with reference to the following description, appended claims, and accompanying drawings, where:

FIG. 24 is an exemplary nonlimiting high-level schematic for a user interface for a system according to principles of the invention;

FIG. 25 is an exemplary nonlimiting high-level schematic for a example use case for a system according to principles of the invention;

Figure 1:
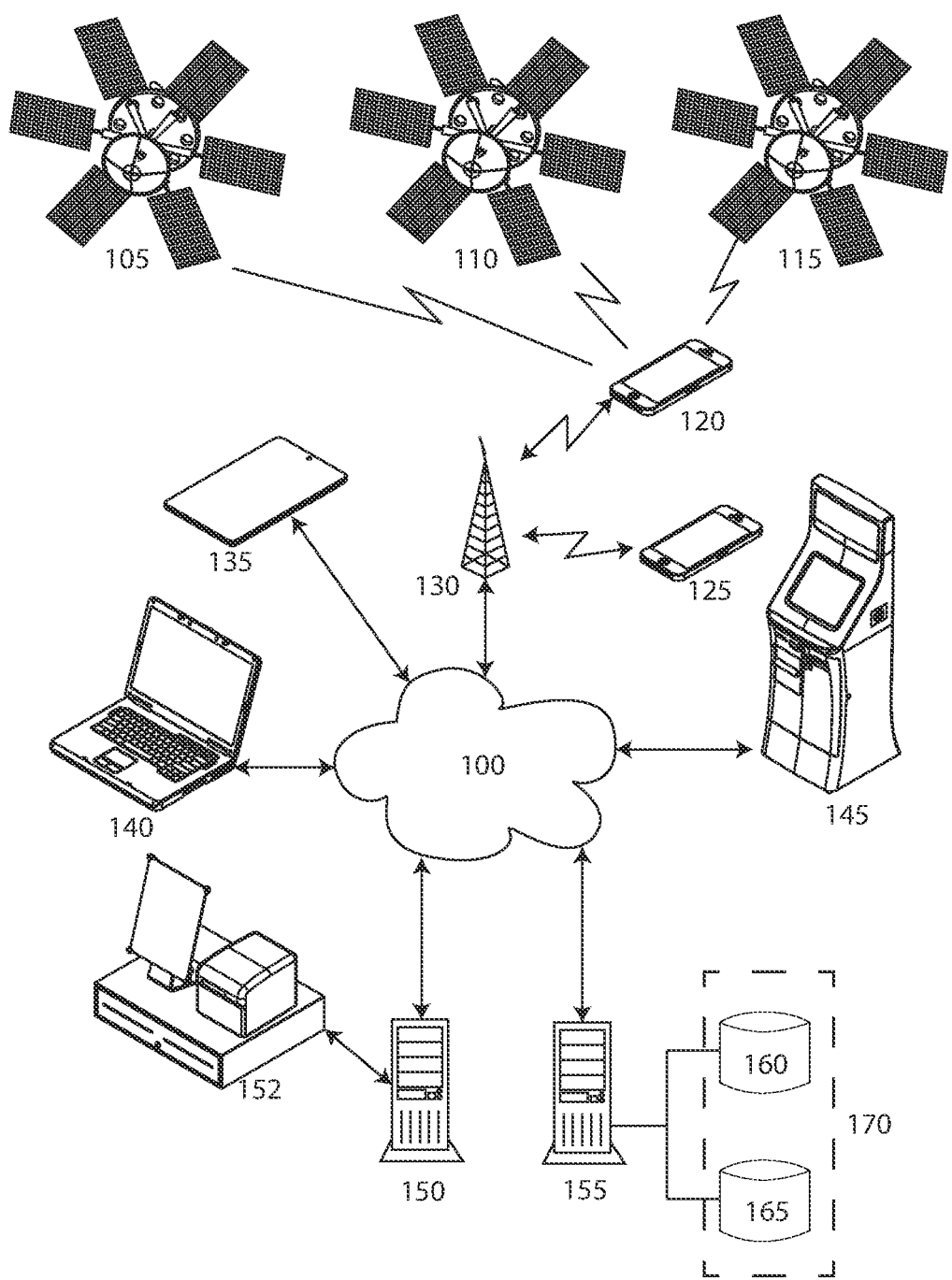
FIG. 1 is a high level block diagram of exemplary networked computing devices on which a method and system according to principles of the invention may be implemented.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary virtual repository method and system with robust item management automatically derives item data from accessed current and past transactions. The system interfaces with merchant systems to receive current and archived transaction data, scans emails for current and past transaction data, monitors browser data for online transaction data, and accepts manual input. The system establishes a communication channel with each remote disparate source. The system executes program instructions to harvest data from each local source. Data obtained from all sources is filtered, collated and stored in a cache, for user review, modification and approval, whereupon the data populates a virtual repository. The resulting virtual repository accurately reflects a user's real world acquisitions within a user-defined category, which facilitates managing (e.g., using, sharing, disposing of) and capitalizing on (e.g., selling, leasing, promoting, donating) acquired items.

An implementation of the present invention may be embodied in hardware and/or in software (including firmware, resident software, micro-code, etc.). Furthermore, the present invention may take the form of one or more computer program products on one or more computer-usable or computer-readable storage media having computer-usable or computer-readable program code embodied in the media for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific non-limiting examples (a non-exhaustive list) of a computer-readable medium include random access memory (RAM), a read-only memory (ROM), an erasable programmable read-only memory (EPROM or Flash memory), a hard disk drive, a solid state drive, and optical discs.

Computer program code or "code" for carrying out operations (e.g., steps) according to the present invention may be written in any programming language compatible with the corresponding computing devices and operating systems. Software embodiments of the present invention do not depend on implementation with a particular programming language.

The computer program code may be provided to a processor of a general-purpose computer, special purpose computer, or other programmable computing apparatus (e.g., a phone, personal digital assistant, tablet, laptop, personal computer, or computer server) as instructions, such that the instructions, which execute via the processor of the computer or other programmable data processing apparatus, create means for implementing the functions described herein. The computer code may be stored in a computer-readable memory that can direct a computer or other programmable data processing apparatus to function in a particular manner, such that the instructions stored in the computer-readable memory produce an article of manufacture including instruction means which implement the functions and perform the steps specified in the illustrations and described herein.

Referring now to FIG. 1, a high level block diagram of hardware components of a system according to principle of the invention is conceptually illustrated. Consistent with the present invention, users of the system use computing devices, such as a smartphones 120, 125, tablets 135, laptop computers 140, personal computers or a kiosk 145, desktop computers or servers 150, communicating in a wireless or wired mode via the Internet 100. The computing devices (i.e., clients or client devices) are equipped with software for inputting and displaying information in accordance with the methodologies described herein. Such software may comprise a web browser, a client application and/or a mobile device app. Some of the computing devices 120, 125 may be equipped with cellular wireless communication modules providing internet access via wireless cellular communication infrastructure 130. Some of the devices may be used by end users for creating and managing virtual repositories, while other devices (e.g., point of sale device 152 and server 150) may be used by merchants to supply data and provide rewards.

A virtual repository is an aggregation of data pertaining to items, which may be presented to a user in an easy to manage graphical user interface. The items of a virtual repository may fall within a category, such as clothing. The virtual repository may be shared by a user, allowing other users to access the virtual repository for viewing and other allowed actions (e.g., commenting and click-through purchasing). Specific items within a virtual repository may be shared, allowing other users to access data for those items for viewing and other allowed actions (e.g., commenting and click-through purchasing). The graphical user interface may present in data in lists, tables, navigable 2D or 3D models, or augmented reality displays. A user may create a plurality of virtual repositories, assign items to one or more virtual repositories. Advantageously, a system and method according to principles of the invention collates, in a cache (temporary storage), data received and/or extracted from multiple independent sources (described below). A user may review and verify the cached data, modify or delete the cached data, and assign it to one or more virtual repositories. A system and method according to principles of the invention also collates manual entries into the virtual repository.

Referring still to FIG. 1, one or more computers such as server 155 includes or has access to a database management system for managing product data. One or more databases may contain aggregations of data records or files, pertaining to virtual repositories. A communications network interconnects the server 155, directly or indirectly through one or more additional computers, with the Internet 100. Interconnected computers communicate with each other through mechanisms such as interprocess communication, remote procedure call, distributed object interfaces, and various other program interfaces. The databases may be stored on one or more storage devices 160, 165, collectively the data storage 170. The database may be queried using various database access means such as SQL (Structured Query Language), a standard language for interacting with a database; Open Database Connectivity (ODBC), an open standard API for accessing a database; DCOM (Distributed Component Object Model), a set of Microsoft tools and program interfaces for enabling client program objects to request services from server program objects on another networked computer; Common Object Request Broker Architecture (CORBA), an architecture and specification which allows programs at different locations and developed by different vendors to interact in a network through an interface broker. Illustratively, the clients 120, 125, 135-150 may execute one or more processes that interact server 155 to supply, access and manage data stored on the data storage 170. Each request received by the server 155 may be submitted as a TCP/IP communication packet including an IP address and socket number. In response to valid requests, the server 155 may provide data from the data storage 170, without compromising the integrity of the database.

In certain embodiments of a system and methodology according to the principles of the invention, a user's location may be specified. Location may be user input or automatically determined using GPS data, IP trace or triangulation information. Some of the computing devices may be equipped with Global Positioning System ("GPS") receivers for receiving signals from GPS satellites 105-115 to determine location of the device.

Certain clients 120-150 may not have access to a GPS service (for example, they may lack hardware necessary to support such a service); consequently, such GPS information may not be available for all clients 120-150. Also, certain GPS services do not operate or do not operate reliably in certain locations, such as indoors or other enclosed spaces. Thus, even if a client 120-150 does have the necessary hardware and software to support a GPS service, occasionally GPS information from the GPS service may not be available to a particular client 120-150.

IP trace information may include the public IP address of the client 120-150 and the set of IP addresses that data packets sent from the client 120-150 pass through to reach server 150. The public IP address of the client 120-150 may be determined by gathering the source IP address from the server socket receiving the client 120-150 connection. The list of hops through which the data packets sent from the client 120-150 go through may be determined by sending adaptive TTL (time to live) UDP packets to server 150 from the client 120-150. In order to determine if the client 120-150 is being an IP proxy, server 150 may correlate the list of hops with the public IP address of the client 120-150. In this way, server 150 may effectively discover the real public IP address of the client 120-150. The real public IP address of the client 120-150 is then matched against a database of Internet Service Providers (ISPs) which returns the probable address of the originating client 120-150 message. This probable address of the originating client 120-150 message may then be translated to a set of longitude and latitude coordinates.

Triangulation information for a client 120-150 may include a list of public Wi-Fi access points surrounding the client 120-150 as well as the signal strength of each Wi-Fi access point accessible by the client 120-150. The list of surrounding Wi-Fi access points, and their signal strength, may be formatted and correlated with a database of public Wi-Fi access points by server 150 to determine a probable set of longitude and latitude coordinates for the client 120-150. The database of public Wi-Fi access points employed by server 150 may be updated over time to reflect new information about available Wi-Fi access points.

The invention is not dependent upon location information. Certain implementations of the invention may not take location into consideration. In implementations that take location into consideration, certain types of location data may be more accurate or reliable than others. GPS information is more accurate and indicative of the correct physical location of a client 120-150; however, as explained above, GPS information for a particular client 120-150 may not always be available. Triangulation information, while not as accurate and reliable in identifying the correct physical location of a client 120-150 as GPS information, is more accurate and reliable than IP trace information. However, triangulation information also may not always be available, e.g., the client 120-150 may not be able to detect any nearby recognizable Wi-Fi access points. Additionally, while IP trace information is less accurate than either GPS information or triangulation information in determining the correct location of a client 120-150, it is always obtainable if the client 120-150 can communicate to server 150 over the Internet.

Additionally, a user may input location (e.g., an address) for a device, such as a personal computer, laptop 140 or tablet 135, that may not be equipped with a GPS receiver. For a device, such as a kiosk 145, at a fixed location, the location of the device may be known and associated with a unique identifier (e.g., MAC address) for the device.

The term "service provider" is used herein to mean any entity that provides a service using a system or methodology according to principles of the invention. The service provider may be, for example, an online service provider with a web-accessible system that receives, sends, stores and processes data and instructions for managing and sharing a virtual repository according to principles of the invention. The terms "consumer" or "client" is used herein to mean any individual or entity that uses the service provider's services to manage and share a virtual repository, whether for free or in exchange for compensation. The term "user" or "end user" is used herein to mean any individual or entity that uses the system for managing and sharing a virtual repository according to principles of the invention. In many cases, a user is a consumer. However, in some cases, a consumer may have an assistant or agent use the system on the consumer's behalf. A merchant is a commercial party (e.g., a vendor of goods or services, a credit card processor or another service provider), who may access the system for performing such actions as supplying data and rewarding consumers. A merchant may also be a consumer, client, and end user. Likewise, a consumer, client, and end user may also be a merchant.

Figure 2:
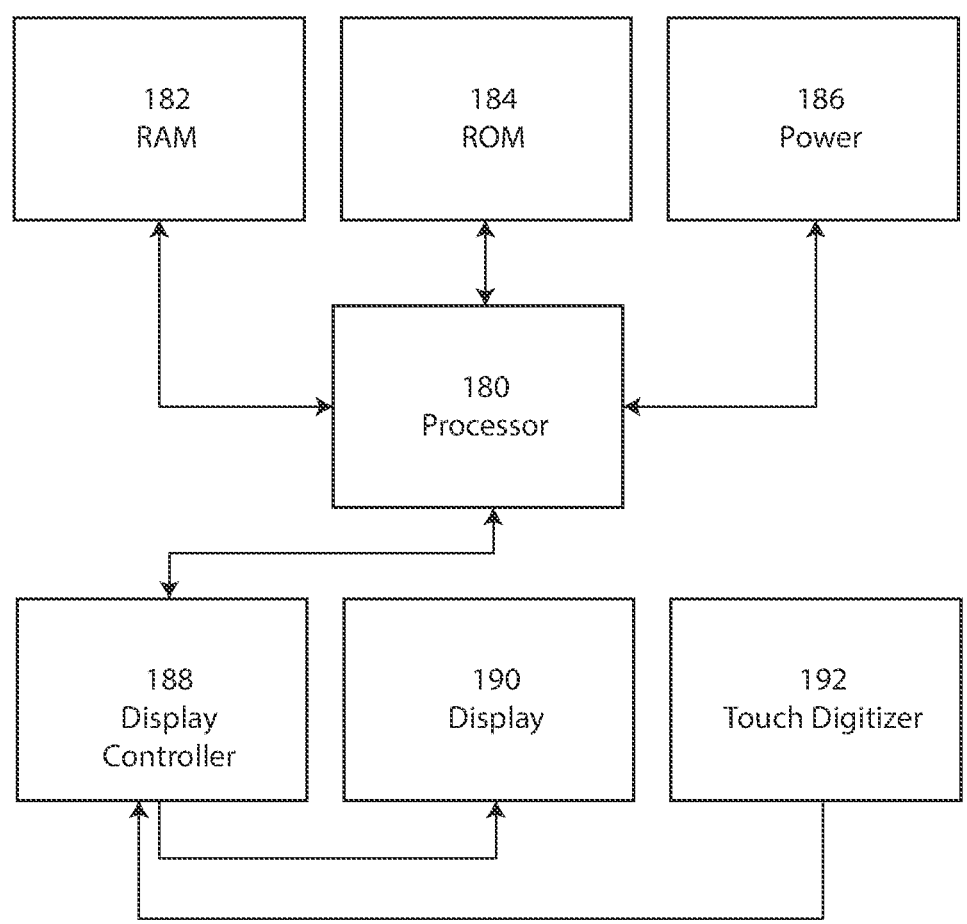
FIG. 2 is a high level block diagram of exemplary components of a computing device which may be used to implement and use a method and system according to principles of the invention.

Using the computing device 120-150 and client software ("client") such as a browser or app, a user may create, manage and share a virtual repository according to principles of the invention Each exemplary computing device for use in accordance with principles of the invention includes a processor, memory, power supply, display, storage and user input device. Other components include a communication bus, and network communication components, such as cellular, WiFi and LAN. By way of example, and not limitation, with reference to FIG. 2, a mobile device such as a smartphone 120, 125 may include one or more processing units (CPU's) 200, memory such as RAM 205 and ROM 210, and a power supply 215. Additionally, the device 120 may include a display controller 220, a display 225 and a touch digitizer 230. These may comprise merely a few of the components of the mobile device 120. Various components may be implemented in hardware, software, or a combination of both hardware and software, including one or more signal processing and/or application specific integrated circuits. The touch digitizer 230 comprises a touchscreen, an electronic visual display that the user can control through simple or multi-touch gestures by touching the screen with a special stylus/pen and-or one or more fingers. The touchscreen enables the user to interact directly with what is displayed, rather than using a mouse, touchpad, or any other intermediate device (other than a stylus, which is optional for most modern touchscreens). The touch digitizer 230 further comprises a transparent overlay covering the visual display. The overlay senses the touch of one or more fingers or a stylus. In response to a touch, the overlay produces a change in electrical properties (e.g., a change in current, voltage, capacitance or resistance). The touch digitizer interprets the commands that the changed electrical properties represent and communicates the commands to the appropriate applications. The touch digitizer 230 further comprises a display controller that receives and/or sends electrical signals from and to the visual display and overlay. Visual output may include graphics, text, icons, video, and any combination thereof (collectively termed "graphics"). In some embodiments, some or all of the visual output may correspond to user-interface objects. The display controller (along with any associated modules and/or sets of instructions in memory) detect contact (and any movement or breaking of the contact) on the overlay and converts the detected contact into interaction with user-interface objects (e.g., one or more soft keys, icons, web pages or images) that are displayed on touch-sensitive display. In an exemplary embodiment, a point of contact between touch digitizer 230 and the user corresponds to a finger of the user. The visual display may comprise LCD (liquid crystal display) technology, LPD (light emitting polymer display) technology, or LED (light emitting diode) technology, although other display technologies may be used in other embodiments. The overlay and display controller of the touch digitizer 230 may detect contact and any movement or breaking thereof, including speed (magnitude), velocity (magnitude and direction), and/or an acceleration (a change in magnitude and/or direction) of the point of contact, using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display. These operations may be applied to single contacts (e.g., one finger contacts) or to multiple simultaneous contacts (e.g., "multitouch"/multiple finger contacts). Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Figure 3:
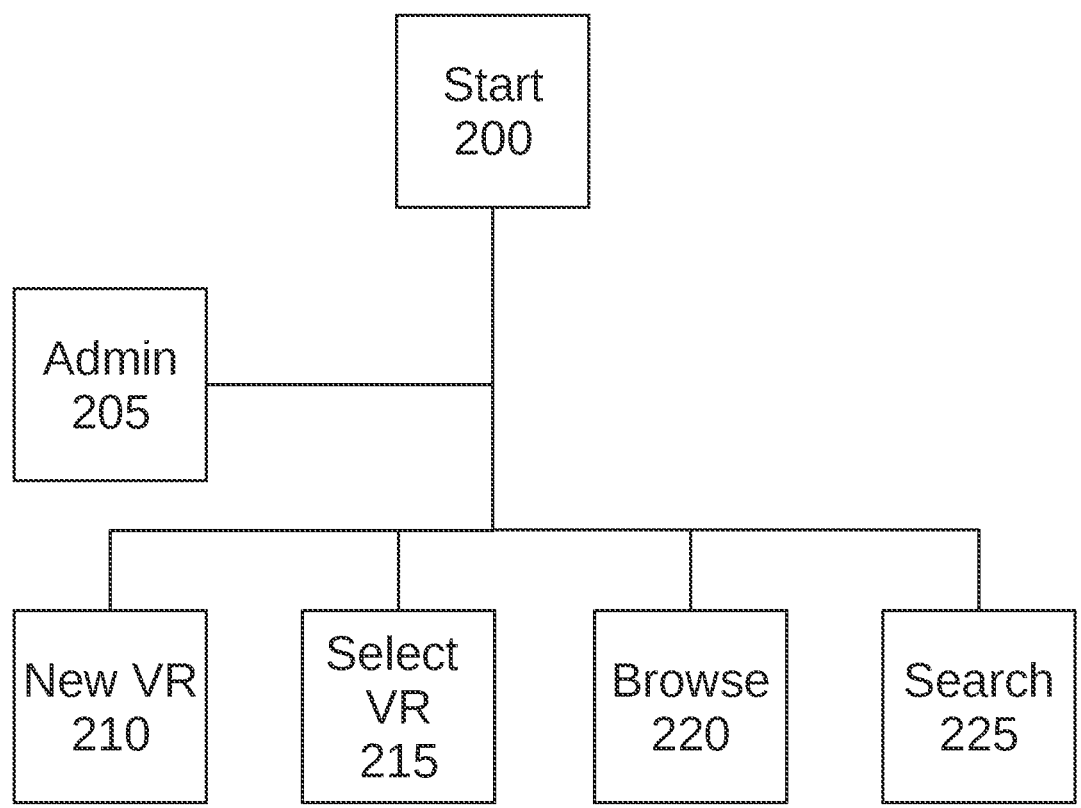
FIG. 3 is a high level flow chart of exemplary steps of using a method and system according to principles of the invention.
Figure 4:
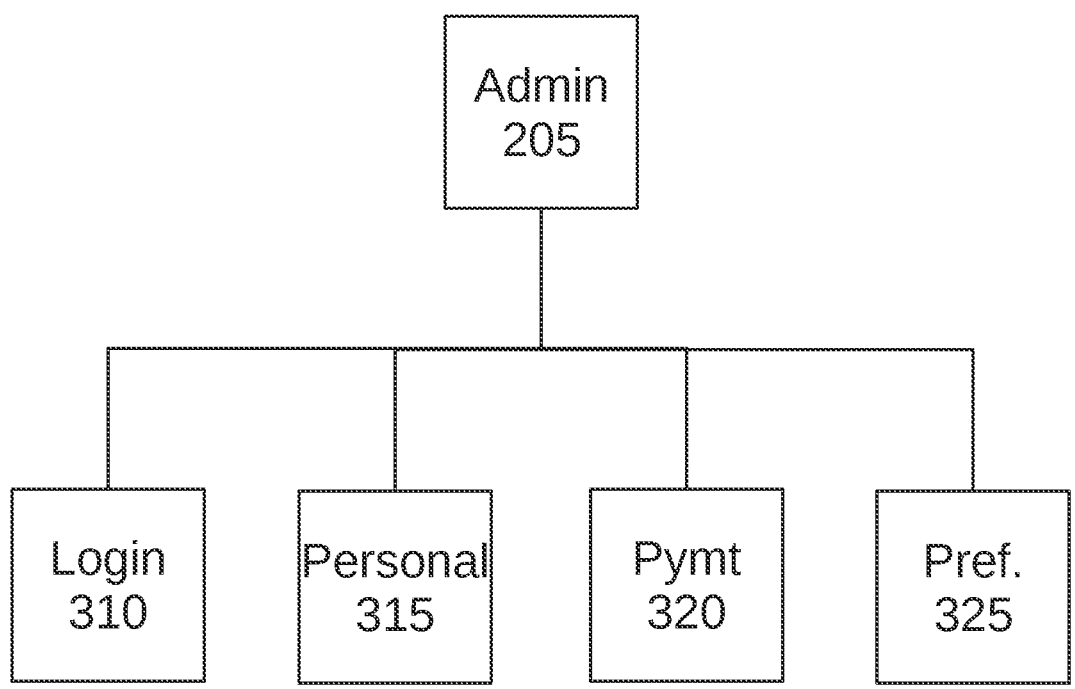
FIG. 4 is a high level flow chart of exemplary user administration steps for a method and system according to principles of the invention.

FIG. 3 provides a high level flow chart of exemplary steps of using a method and system according to principles of the invention. A user may start an application (i.e., software application) on a computing device, as in step 200. The application provides access to functions, including administrative functions 205, functions for creating a new virtual repository as in step 210, functions for selecting an existing virtual repository as in step 215, functions for browsing the user's and/or other users' shared virtual repositories as in step 220, and functions for searching for other users' shared virtual repositories as in step 225. A user may select a function With reference to FIG. 4, administration functions 205 include functions for setting information and preferences for a user. A user may establish a login, which may include a user name and password, as in step 310. For multifactor authentication, a user may also provide a smartphone number and/or email address. A user may input personal information, such as name, address, screen name, telephone number, email address, information regarding the user's profession, a photograph of the user, and links to other information about the user, as in step 315. A user may input payment information for any commercial transactions performed using the system, as is step 320. The information may include card information, a billing address, and a default shipping address, The user may also specify preferences, including security preferences related to privacy of the user's virtual repositories, display settings, notification settings, and sound settings, as in step 325.

Figure 5:
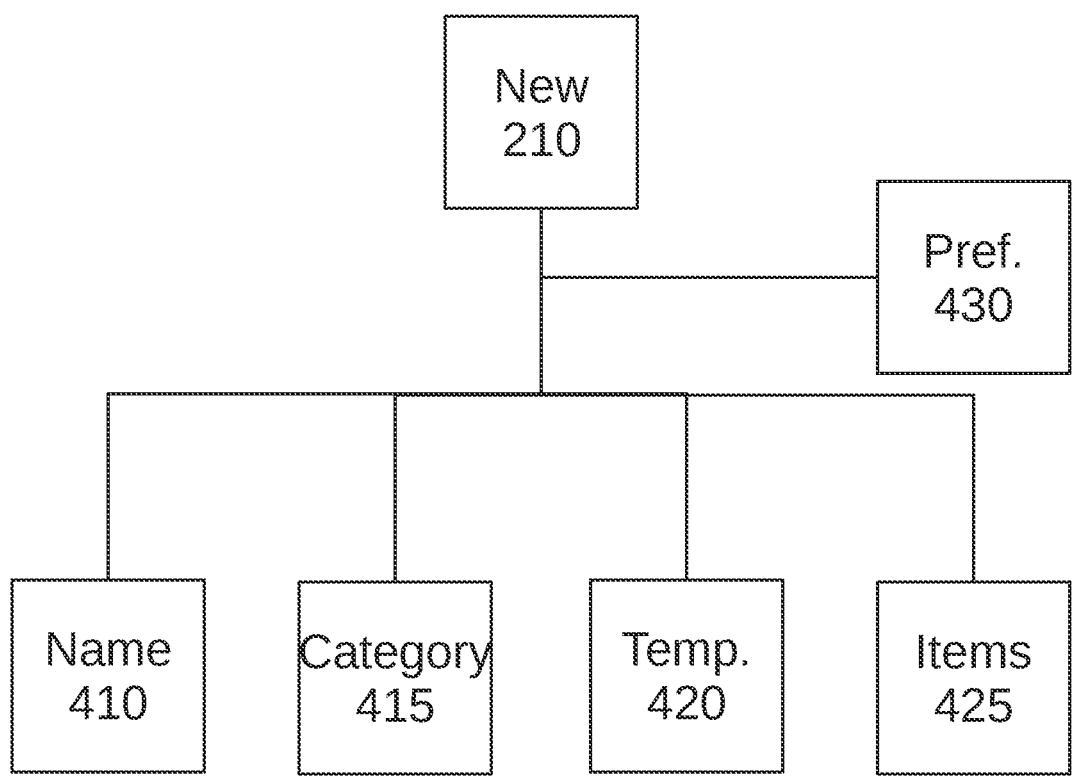
FIG. 5 is a high level flow chart of exemplary steps for creating a new virtual repository for a method and system according to principles of the invention.

FIG. 5 is a high level flow chart of exemplary steps for creating a new virtual repository for a method and system according to principles of the invention, as in step 210. A user may assign a name for the new virtual repository, as in step 410. A user may assign a category for the new virtual repository, as in step 415. A user may select a template for the presentation (display) of the virtual repository, as in step 420. Available templates may, by way of example, include a list, side-to-side scrolling presentations, top-to-bottom scrolling presentations, navigable 3D models of a space such as a closet, and even augmented reality displays of the user's actual closet. The scrolling presentations may include multiple levels (as discussed below), allowing a user to separately scroll through various subcategories of items within a virtual repository. By way of example, a three level scrolling display may allow a user to separately scroll through the user's shirts, pants and shoes. As another example, an augmented reality presentation may allow a user to walk through a closet while aiming a smartphone at the items in the closet, and receive information about each item on the display. A user may setup more than one template, for the user to select from when using the application.

Figure 6:
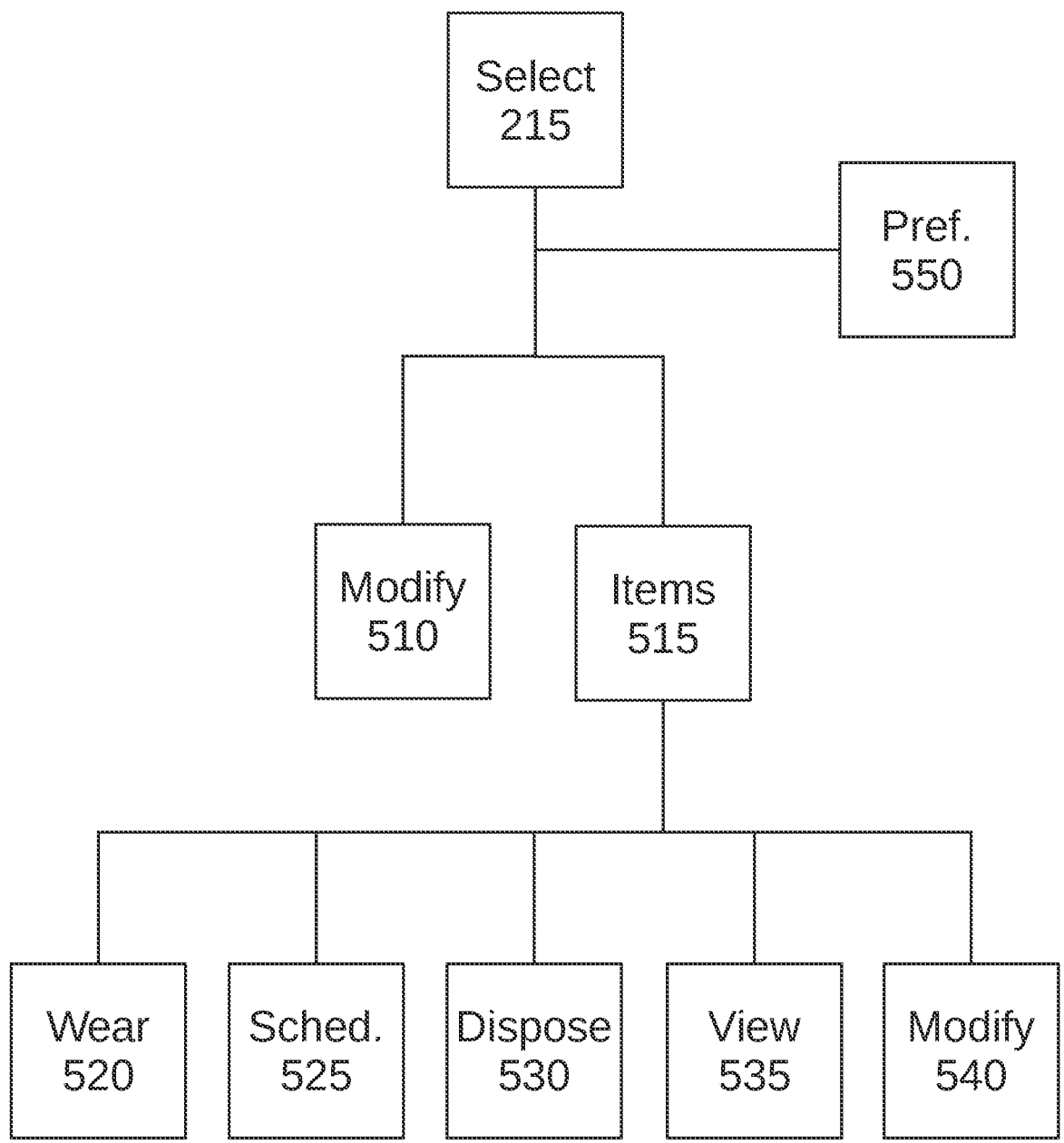
FIG. 6 is a high level flow chart of exemplary steps for managing items in a virtual repository for a method and system according to principles of the invention.

FIG. 6 is a high level flow chart of exemplary steps for managing a virtual repository for a method and system according to principles of the invention, as in step 215. Upon selecting a previously created virtual repository, the user may manage (e.g., review and edit) preferences as in step 550, modify the virtual repository's name or category as in step 510 or select or modify items, as in step 515. In the case of clothing items, an item may be selected for wearing, as in step 520. Alternatively, an item may be scheduled for wearing on a scheduled date and time, as in step 525. An item may be disposed of (e.g., sold, discarded, donated or given away) as in step 530. An item may be viewed, as in step 535. Viewing an item may display information about the item, including use-related information.

If a user enters into the system information about wearing (or otherwise using) each item, then the system may present a history and/or frequency of use. A system and method according to principles of the invention may save all entered dates of use, as in step 520. For example, a user may enter each date on which the user wore a particular garment. From such dates, the system may determine the last time an item was used and a frequency of use. Date of use data may alert a user to unused, infrequently use and frequently used items. A system according to principles of the invention may notify a user of items that the user did not use in a determined number of days (e.g., 100, 180 or 365 days). Knowing specific dates of use may also help a user determine if the same item should be used (e.g., worn) again. For example, a user may want to avoid wearing the same suit on a follow-up job interview, or the same dress at an upcoming event or party that will be attended by some folks who attended a previous party.

An item may be modified (i.e., stored information pertaining to the product may be modified) as in step 540. Modification may include adding comments about comfort, fit, and accessories. For example, a user may note that a garment fits loosely or tightly, or is best worn with a particular accessory. Some such notes may be accessible only by the user, and other notes may be shared with other users.

A system and method according to principles of the invention may incentivize users to input use dates for an item. Such use may be input by simply selecting the item and selecting a current use button or by selecting the item and providing a verbal command, or by entering a date. As described above, a user's location may be tracked through a device, such as a smartphone. Inputting use dates helps a user track which items are used and when, which, as discussed above, is beneficial. Additionally, use information may lead to rewards. Shared items are visible to other users. A worn item may be a shared item. Other users may search for an item worn by a user at an event, or on a certain date and time, and/or at a specific location. Upon finding the item, such other users may click through the item to purchase it from a merchant. Through an affiliate program, the merchant may reward the user who shared the item. Such reward may be a payment to an account of the user. To maximize such payments, users will want to regularly input use dates, share items and wear items well.

Disposing of an item, as in step 530, may entail selling, renting, donating, gifting or discarding an item, and thereupon removing the item from the virtual repository, or, in the case of renting, marking the item as unavailable during the rental term. These functions enable a user to capitalize on items.

For example, using the information about an item in the virtual repository, a selling price or auction bidding terms, and one or more current photographs of the item, the item may be marked for sale. Upon being marked for sale, the item is shared and may be searched and viewed by all other users of the system. Such other users may purchase or, in the case of an auction, bid on purchasing the item.

Similarly, a user may mark an item for donation, which may present a list of willing charitable organizations in the vicinity of the user who would be glad to receive the item. The user may select an organization from the list. A record of each completed donation may be generated for tax deduction purposes.

An item may be marked for renting. For example, a user may own a ball or bridal gown, tuxedo, a costume, skiing apparel, a wetsuit, or some other expensive and infrequently used item. The user may be receptive to renting the item to other users. By marking an item for rental, that item is searchable by all other users of the system. Such other users may rent the item.

By providing the sale, donation and rental functions, a system according to principles of the invention facilitates capitalizing on items. Items that a user does not use, or infrequently uses, may be sold, rented or donated. In each case, the user receives a benefit. In the case of sales or rentals, the user receives monetary compensation. In the case of donation, a tax reduction may be earned. In each case, the user gains the knowledge that an item has not gone to waste, but rather is put into good use.

While other systems for selling, leasing and donating items may exist, none is tied to an existing virtual repository. By tying the such systems to a virtual repository, a system and method in accordance with principles of the invention facilitates identifying unused or infrequently used items, and also facilitates posting such items for sale or rental, or donating such items to a worthy charity.

Figure 7:
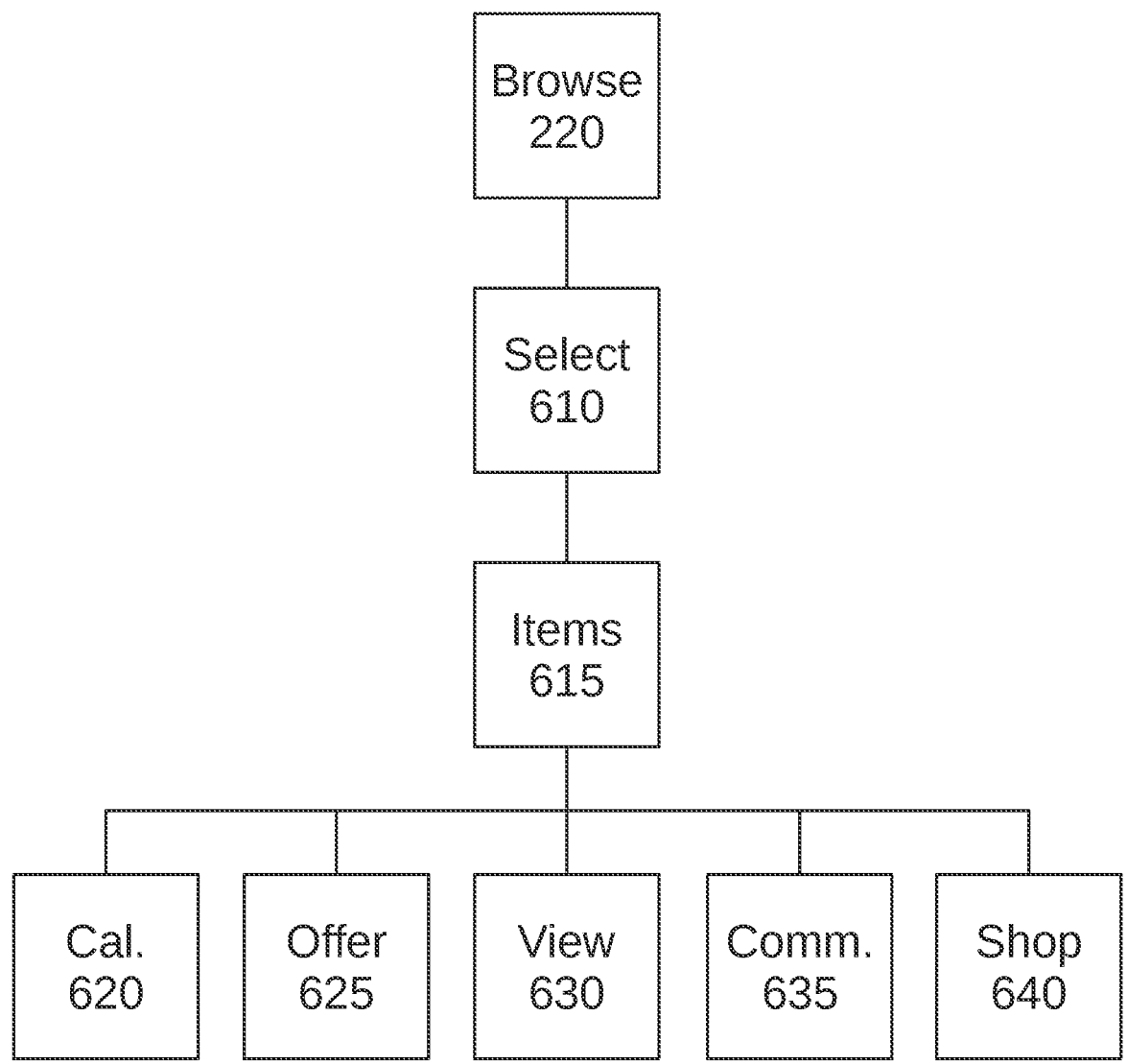
FIG. 7 is a high level flow chart of exemplary steps for performing actions relating to items in a virtual repository for a method and system according to principles of the invention.

FIG. 7 provides a high level flow chart of exemplary steps for performing actions relating to items in a virtual repository for a method and system according to principles of the invention. In particular a user may browse items in the user's virtual repositories, as in step 220. A user may select a virtual repository from a list of the user's virtual repositories, as in step 610. A user then may view and select an item in the virtual repository, as in step 615. The user may calendar the item, as in step 620. By calendaring the item, the user indicates a date on which the user intends to use (e.g., wear) the item. A user my offer to sell or rent the item, as in step 625. The terms of the sale or rental may be set by the user, within determined parameters of the system. The use may view the items, as in step 630. A photograph of each item may be stored as item data, as described above. The photograph may be user supplied or obtained from a vendor's online posting for the product. A user may enter comments about an item, as in step 635. For example, a user may describe the comfort, fit or feel of an item, or describe an event at which the item was used (e.g., worn), or enter other information (e.g., an endorsement) relating to the product. A user may locate the item in a retail establishment, as in step 640. By locating the item in an online or brick and mortar retailer, the user may shop for other similar or matching items and accessories.

The flow chart of FIG. 7 also applies to browsing shared virtual repositories and items of other users. A list of virtual repositories may be generated by a search from a search engine or from a directory. A user may search for a particular user's virtual repository, a celebrity's virtual repository, a virtual repository that contains certain items. A user may navigate through categories and subcategories of a directory to generate a list of repositories. Filters may be provided to narrow the list. A user may select a repository as in step 610. A list of shared items in the repository is presented, as in step 615. A user may select shared calendar information for a selected item, as in step 620. Such information reveals when the user used (e.g., wore) the item. A user may offer to purchase the item an item from such a list, as in step 610. A user may simply view the item, as in step 630. A user may enter comments about the shared item, as in step 635. A user may shop for the selected item, as in step 640. Purchase of the selected item may lead to a reward (e.g., compensation) for the user who shared the item.

An affiliate program may track click-throughs to merchant sites and enable payment of commissions to a user who shared the item and from which the purchase originated. To enable affiliate compensation, an affiliate link may be associated with each shared item. The affiliate link carries information that identifies the source of the click-through so commissions can be accurately payable. In one embodiment when an affiliate link is clicked, a cookie is deposited on the user's computing device. When a user completes a sale on the merchant's site, the merchant checks to see whether their cookie is present on the user's computing device. If it is, the merchant can access information from the cookie about the user that shared the item and generated the sale lead, and can then attribute the sales commission to that sharing user. Merchants can set the commission structure and cookie lifetime via the affiliate network. For instance, a merchant may decide to assign a cookie lifetime of 60 days, which means any sale made on the merchant's site by a user within 60 days of the user first visiting the merchant's site via the sharing user's repository, is commission-generating for the sharing user.

Figure 8:
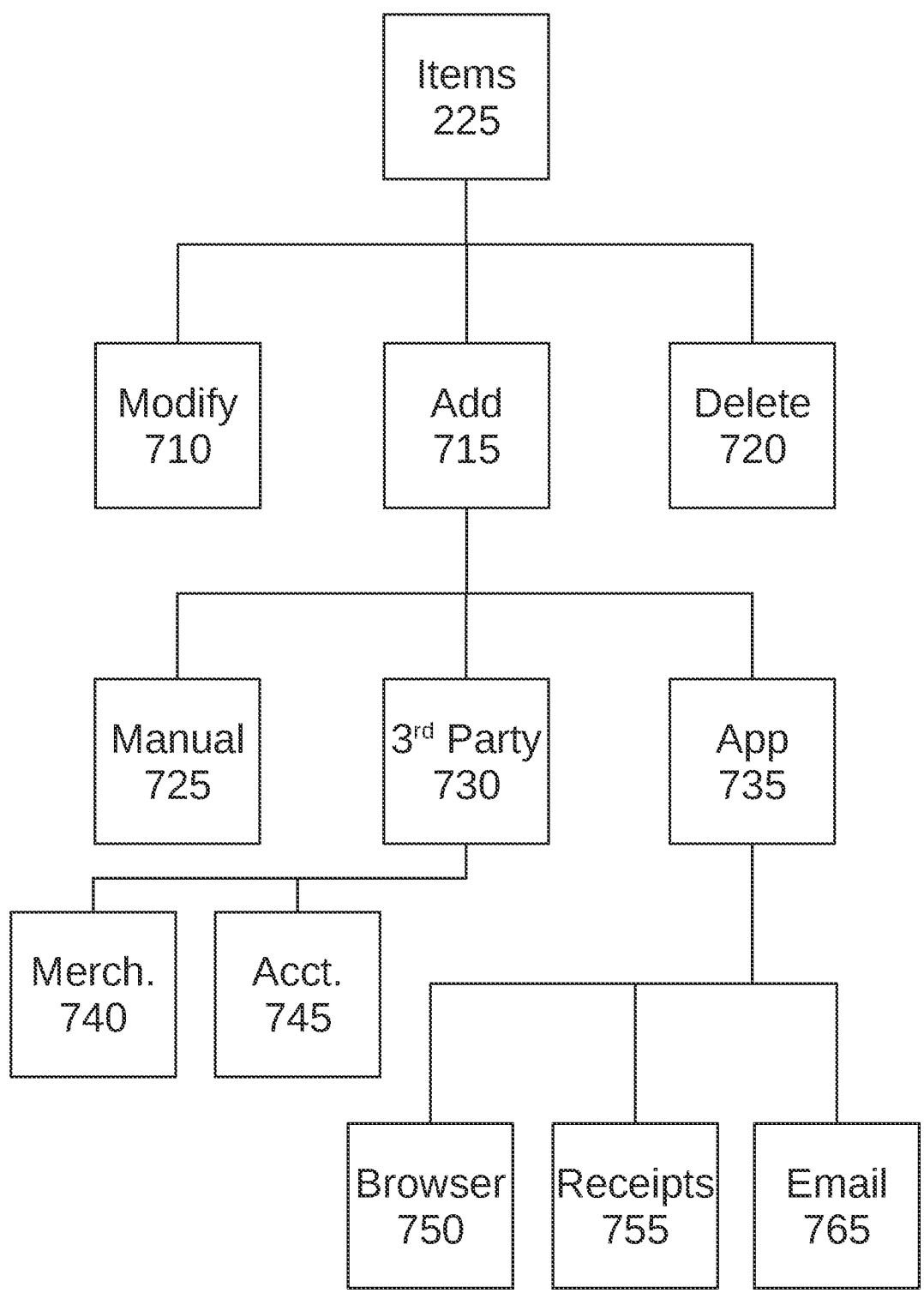
FIG. 8 is a high level flow chart of exemplary steps for adding items in a virtual repository for a method and system according to principles of the invention.

FIG. 8 is a high level flow chart of exemplary steps for modifying, adding and deleting items (step 225) in a virtual repository for a method and system according to principles of the invention. Selected items may be modified as in step 710. Modification may include editing entered content and photographs. Selected items may be deleted as in step 720. Items may be deleted automatically if sold or donated using the system. Items may also be deleted manually at any time by the user who owns the virtual repository.

Items may be added manually, by user input, as in step 725. Manual addition may entail typed user input, uploaded files, scanned documents, optical character recognition of documents, and verbal commands.

Items may be added from third party sources, as in step 730. Third party sources may include purchase histories from accounts accessible online. Such accounts may include online retailer and marketplace accounts (e.g., online Walmart, Amazon and Macy's accounts). Another third party source may be merchants' point of sale system data. Participating merchants may communicate purchase data for participating users to the system via an application programming interface. The purchase data may be pushed by a merchant from point of sale transactions by the user. Alternatively, purchase data may be pulled by a user from a merchant's point of sale system, via an application programming interface. Even purchase data for purchases at most brick and mortar establishments are stored on merchant servers connected to their point of sale systems.

Items may be added via applications (e.g., plugins and add-ons) that monitor a user's browser activity and emails for purchase data, as in step 735. A browser plugin may track online purchasing activity, as in step 750. Online purchases are detected via the website and user selections, including online shopping cart activity. Emails, as in step 765, may provide order confirmations, many of which may contain a hyperlink to an account on a remote server where details of the transaction are provided. Accessing a remote account may require a login (e.g., user name and password), which the user can supply to the system. Emails may also provide detailed receipts, as in step 755. Receipts may also be uploaded by a user for processing. Such processing may entail optical character recognition and determining purchase data.

Data from sources other than manual entry is stored in a cache or temporary storage until verified by a user. The cached data may be displayed to a user in a list comprised of records (rows) and fields (columns). Thus, a system and method according to principles of the invention merges (i.e., collates) data extracted for various sources, including remote (e.g., merchant systems) and local sources (e.g., mined emails) into a cached list for possible addition to a virtual repository. The user may verify each record for entry into the virtual repository. Data for a record may be modified by a user before verification. Records may be deleted by a user. For example, a user may determine that a record does not belong in the virtual repository, such as if the purchase is a gift for a friend.

Figure 9:
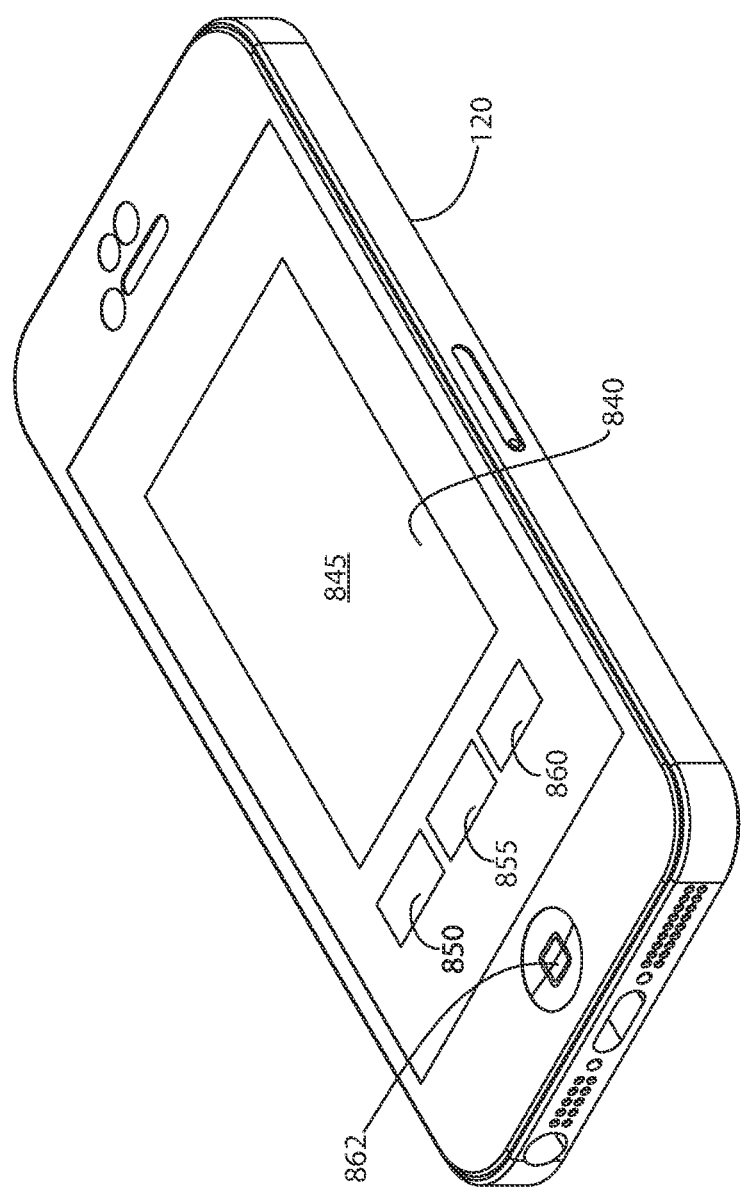
FIG. 9 conceptually illustrates an exemplary user device on which a method and system according to principles of the invention may be used.

FIG. 9 conceptually illustrates an exemplary user device 120 on which a method and system according to principles of the invention may be used. A graphical user interface 840 may be presented on a display 845. The user interface may present information and graphics pertaining to virtual repositories, items and user accounts. Various user-selectable controls 850-860 may be displayed for user control. A microphone 862 may accept voice commands 862. Modern operating systems include a voice-user interface that makes spoken human interaction with a device possible, using speech recognition to understand spoken commands and typically text to speech to play an audible reply.

Figure 10:
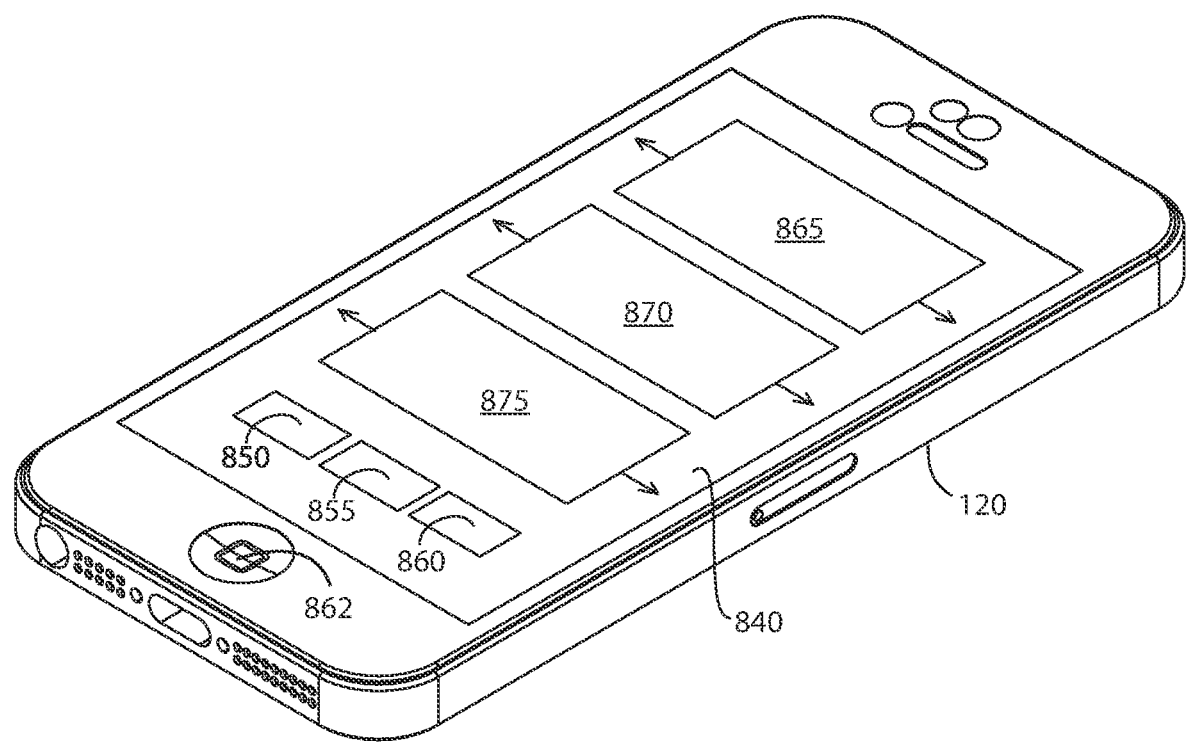
FIG. 10 conceptually illustrates an exemplary user interface on a user device on which a method and system according to principles of the invention may be used.

FIG. 10 conceptually illustrates another exemplary user interface on the user device 120 on which a method and system according to principles of the invention may be used. This graphical user interface may include three levels 865-875 of display. Different items may be displayed on each level. By way of example, data and images pertaining to shirts may be displayed on the top level 865; data and images pertaining to pants may be displayed on the middle level 870; and data and images pertaining to shoes may be displayed on the bottom level 875. The different levels may represent different virtual repositories, such as a repository for shirts, another repository for pants, and another repository for shoes. Alternatively, the different levels may represent different categories of items within a particular virtual repository.

A user assigns the number of levels and the virtual repository, category, or specific items to be displayed at each level. Such assignment may be made by a command or touch gesture relating to the level. For example, a swipe upwardly on a level or a voice command ("assign levels") may command the system that the user wishes to assign a virtual repository, category, or specific items to be displayed at the level. Upon receiving the command, the system presents controls for making the assignments.

Figure 11:
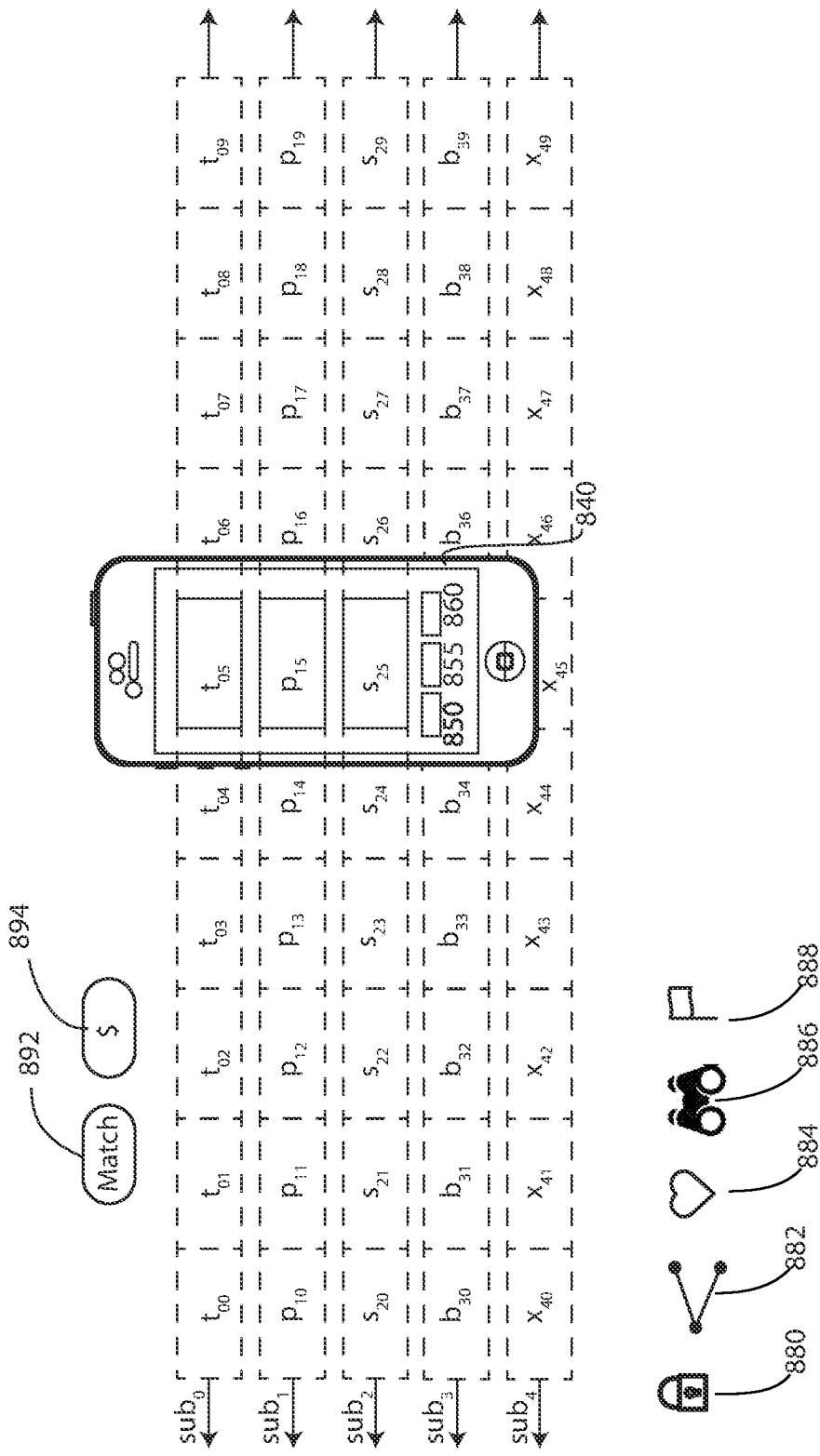
FIG. 11 conceptually illustrates an exemplary user interface on a user device on which a method and system according to principles of the invention may be used.

With reference to FIG. 11, each level of the user interface may present data pertaining to an item, which may include a pictogram of the item. Swiping to the left may load for display the next item to the left in a continuous list. The list is continuous, because swiping past the beginning presents the end of the list, and swiping past the end of the list presents the beginning of the list. Thus, the list behaves like a reel. Swiping to the right may load the next item to the right in the continuous list. In the displayed exemplary embodiment, the top list includes data for items $t_{oo}$ through $t_{o09}$, the middle list includes data for items $p_{oo}$ through $p_{o09}$; and the bottom list includes data for items $s_{oo}$ through $s_{o09}$. Selectable icons for various commands may be presented, including, by way of example and not limitation, a lock icon 880 for security options, a share icon 882 for sending a link or a pictogram to an intended recipient, a heart icon 884 for rating the item, a binocular icon 886 for focusing on the item (i.e., obtaining details) and a flag icon 888 to mark the item for further review. A match control 892 may command the system to match items, such as men's dress shirts, with dress pants and dress shoes from the available items. A $ control 894 may invoke financial functions, including selling, renting and purchasing functions. These are non-limiting examples of controls and logic of a user interface.

Figure 12:
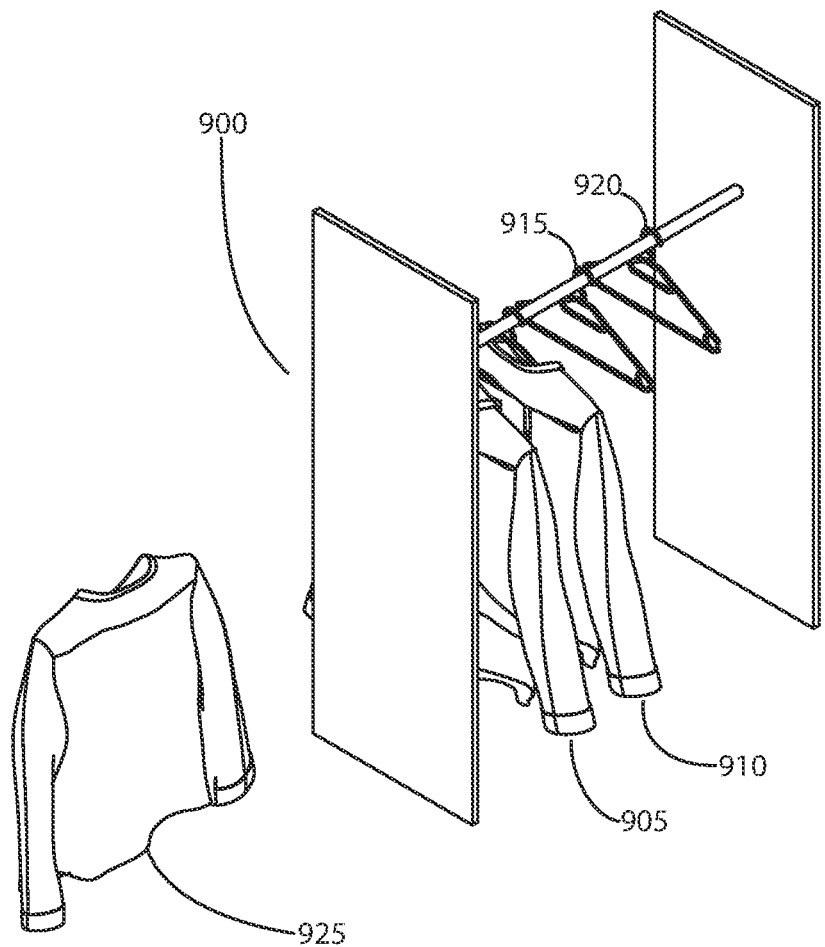
FIG. 12 conceptually illustrates an exemplary virtual display for a method and system according to principles of the invention.

FIG. 12 conceptually illustrates an exemplary 3D virtual display for a method and system according to principles of the invention. The exemplary virtual display resembles a closet 900 containing shirts 905, 910, 925. The closet includes hangers 915, 920 on a hanger rod. An empty hangar may represent a shirt that has been removed and not available for use, such as a shirt sent out for dry cleaning. Mousing over a shirt or hanger displays details about the item and a photo or pictogram. Clicking on the details displays editable details and controls for the item. Removing a shirt from the closet, such as shirt 925, may indicate that the shirt is or will be worn. Mousing over the removed shirt displays details about the item and a photo or pictogram. Clicking on the details displays editable details and controls for the item. The shirts may be colored to represent the color of the actual item. The shirt icons may come in several styles (e.g., polo, henley, t-shirt, dress shirt, etc. . . . ). The angle of viewing may be changed by touch gestures or voice commands.

Figure 13:
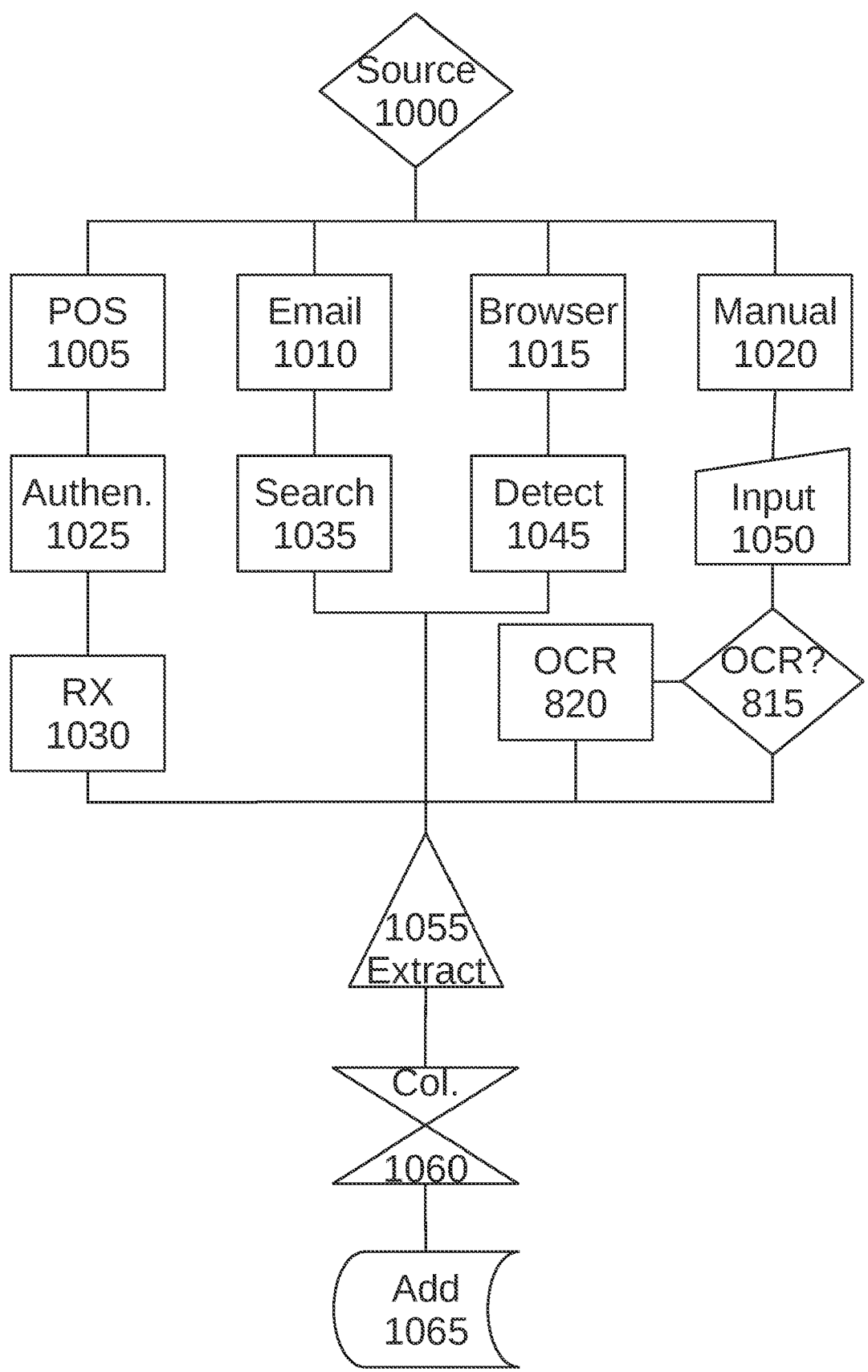
FIG. 13 is a high level flow chart that conceptually illustrates steps of an exemplary method of populating a virtual repository with item data according to principles of the invention.

FIG. 13 provides a high level flow chart that conceptually illustrates steps of an exemplary method of populating a virtual repository with item data according to principles of the invention. If a source is available for supplying data as in step 1000, then steps are undertaken to extract and collate the data. Data from a point of sale transaction may be supplied through a participating merchant's server, as in step 1005. As in step 1025, in the case of pushed data the merchant's server may authenticate the merchant and user for which the data is being supplied. Such authentication may comprise a unique login and user id. In the case of pulled data, the virtual repository system may provide authentication to the merchant's server. Then, the user's data is received, as in step 1030. After receipt, the relevant fields of data are extracted, as in step 1055 and the extracted data is collated into a record, as in step 1060. Thereafter, the record may be cached for user review, editing and validation before being incorporated into a virtual repository as in step 1065.

Similarly, data may be obtained through emails, as in step 1010. Emails may be periodically searched for receipts, order confirmations and the like. Data may be extracted from receipts attached to emails as in step 1055. Some emails may provide links to follow for details about an order. The system may follow the links, using the user's login information for the account on the merchant's system, to access the purchase data and extract the relevant data, as in step 1055. Again, the extracted data is collated into a record, as in step 1060. Thereafter, the record may be cached for user review, editing and validation before being incorporated into a virtual repository as in step 1065.

Similarly, data may be obtained from browser activity 1015. A browser plugin or add-on may monitor for purchase activity by identifying online shopping cart features or purchase controls, as in step 1045. Data may be extracted from scripts for displayed screens, as in step 1055. Again, the extracted data is collated into a record, as in step 1060. Thereafter, the record may be cached for user review, editing and validation before being incorporated into a virtual repository as in step 1065. As such browser activity may also result in an emailed receipt or confirmation order, care is taken to prevent duplicate entries to a virtual repository.

Data may also be obtained by manual entry 1020. Using an available input device, a user may enter and/or upload data, as in step 1050. If an image of a scanned or photographed receipt or purchase order is uploaded, optical character recognition may convert the image to text for extraction, as in steps 815 and 820. Data may be extracted from the processed upload, as in step 1055. Again, the extracted data is collated into a record, as in step 1060. Thereafter, the record may be cached for user review, editing and validation before being incorporated into a virtual repository as in step 1065.

Figure 15:
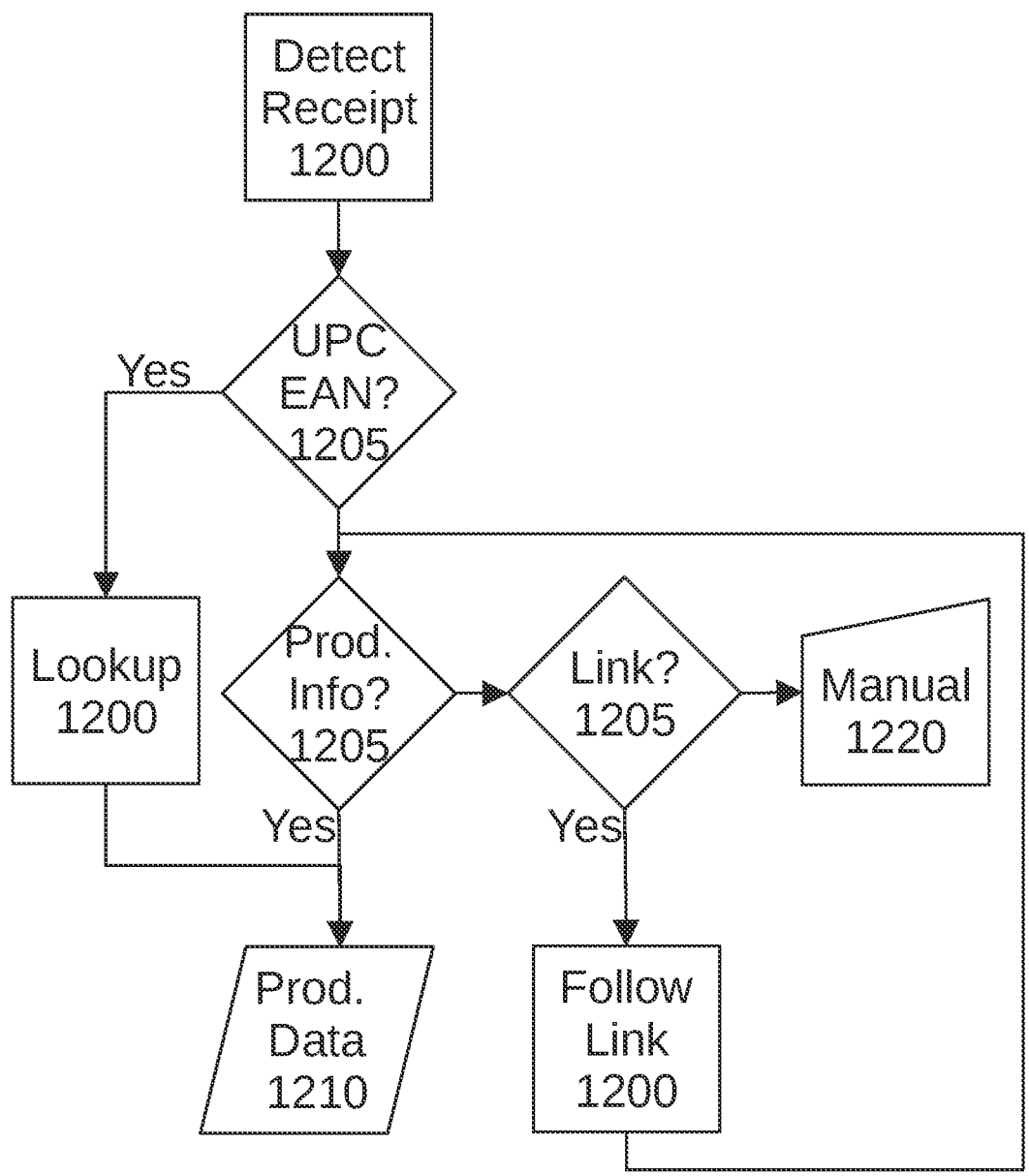
FIG. 15 is a high level flow chart of steps of determining product data, from a transaction, for use in a virtual repository according to principles of the invention.

FIG. 15 conceptually illustrates steps of processing receipts to extract relevant data for collation according to principles of the invention. A detected receipt 1200 may be a receipt attached to an email, an order confirmation in an email, or an uploaded receipt. The receipt may be a text document, or an image of a receipt, such as a scanned or photographed receipt. In the latter case, optical character recognition may be performed to make the data system readable. In step 1205 the receipt is reviewed for a standard industry code, such as a UPC or EAN code for the product. Such codes follow standard formatting. If either code is detected, then the product data may be looked up, as in step 1210 from a standard industry lookup database. Product data may then be obtained from the retrieved data, as in step 1230. If the receipt is devoid of such codes, then the receipt or email is reviewed for product data, such as a merchant name, product identifier, product name, price and date, as in step 1215. If such information is available and detectable in the receipt, then the information may be extracted for use in the system, as in step 1230. Extraction entails identifying the information using keyword and pattern recognition, and saving and associating the identified information with the type of information (e.g., saving a numerical value as a price, and saving a name as a merchant, and saving an alphanumeric code as a product id). In some cases, an email may not have an attached receipt and may not contain product information. Instead, the email may contain links directed to transaction information on a remote server, as in step 1220. In such cases, the link is followed, as in step1235. If the followed link leads to the product information, the product information is identified and extracted in steps 1215 and 1230. However, in some cases, the link for the order may lead to separate links for each product in the order. In such case, each product link is followed. If the followed link leads to the product information, the product information is identified and extracted in steps 1215 and 1230. Following links may require the user's login for an account on the remote server, which the user may supply to the system or enter as needed during the operation. A user may also manually enter data from a receipt as in step 1225.

Figure 14:
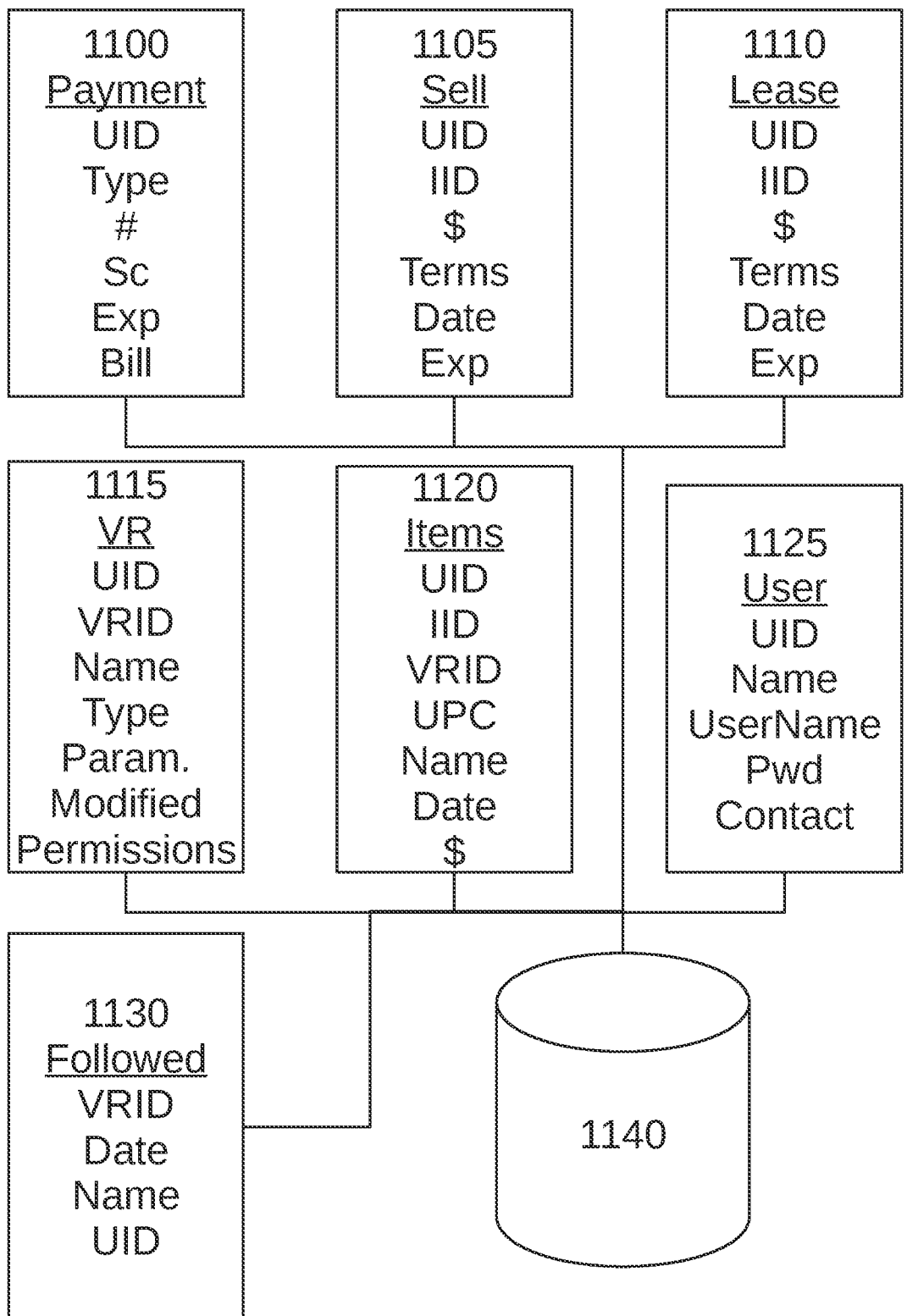
FIG. 14 is a high level data model that conceptually illustrates exemplary data for a virtual repository with item data according to principles of the invention.

FIG. 14 is a high level data model that conceptually illustrates exemplary data for a virtual repository with item data according to principles of the invention. The data is stored on a data storage device 1140, which may comprise one or more mass storage devices on a remote server, such as 160-170 in FIG. 1. The data may be stored as records in tables of a relational database. Identifications (id)s are unique uniform identifiers assigned to records in the system. Each of a user, virtual repository and item is assigned a unique uniform identifier. The unique uniform identifier may be used to retrieve records pertaining thereto.

Examples of categories (tables) of data include payment data 1100. By way of example and not limitation, the payment data includes a user id to associate the information with the particular user. The payment data includes a type, such as a credit or debit card or an ACH account. The payment data includes an account number. The payment data includes a security code and expiration in the case of cards. The payment data also includes an address such as an account holder or billing address. Such payment data may be used for a user to make purchase using the system. The payment data may be stored by a secure third party system, or securely by the virtual repository system.

As another example of categories of data, are selling records 1105. By way of example and not limitation, the selling records may include data pertaining to items sold by a user using the system, including the user id, item id, amount, terms of sale, date and expiration in the case of a pending offer to sell. Similarly, records of rentals 1110 may be kept, including such data as the user id, item id, amount, terms of rental, date and expiration in the case of a pending offer to rent.

As another example of categories of data, are virtual repository records 1115. By way of example and not limitation, the virtual repository records may include the user id, a virtual repository id, a name for the virtual repository, a type description for the virtual repository, data for parameters for the virtual repository, dates last modified, and permissions (e.g., sharing permissions) relating to the virtual repository.

As another example of categories of data, are item records 1120. By way of example and not limitation, the item records may include the user id, an item id, a virtual repository id, a product code such as a UPC code, a name for the item, and a date for the item, among other data. Such other data may include descriptions, comments, affiliate program links, photographs and pictograms for the item.

As another example of categories of data, are user data 1125. By way of example and not limitation, a user data record may include the user id, a name, a user name, a password and contact information, including a mailing address, email address, telephone numbers and the like. Other data may include biographical information, comments, and photographs.

A user may follow other shared virtual repositories and/or items. By way of example and not limitation, a celebrity user may share his or her virtual repository. Other users may follow the shared virtual repository. Following allows a user quick access to the shared virtual repository, by selecting it from a list of followed virtual repositories. The list may be sorted in order of frequency of visit, last visited, alphabetically, or chronologically. Followed records 1130 may include a virtual repository id, one or more dates (e.g., dates first followed, last visited dates, dates of each visit), a repository name, and the following user's id.

A trigger is an important aspect of an exemplary implementation of the invention. A trigger is a user command, a request, seeking data for a target. The target is another user. The item data sought may be item data for items in current use by the target, item data for items in use by the target at a specific event, or item data owned by the target. The item data includes only data shared by the target.

The trigger may be any of various types of user input. The trigger may be a control selection using a graphical user interface. The trigger may be typed data. The trigger may be a voice command or gesture input on a touch sensitive device. The trigger may be a photograph, a video, a voice recording uploaded to the system or created using the system. The trigger may be a scanned (e.g., photographed) product code or inputted product identification. The trigger is not limited to any particular format or means of input.

A trigger may be specific or contextual. A specific trigger identifies at least the target user. A specific trigger may also include additional information, such as a time and location. A contextual trigger indicates an occurrence from which a target may be selected or determined. By way of example and not limitation, such an occurrence may be an event, a location and time, a broadcast show or commercial, an advertisement.

In one nonlimiting example, the command is a selection of a target or a target's shared virtual repository or items. For example, a user may be interested in what items are included in a celebrity's shared virtual repository, or what shared items are currently in use by a celebrity. In such case, the user may select a link to the target's shared items or virtual repository. The link may have been included in search results, or previously saved (e.g., bookmarked) by the user, or found by navigating through an index, or found in some other manner that identifies the target.

In another example, a user may be interested in what items a person in the vicinity of the user is using (e.g., what a person is wearing). Illustratively, a target in the vicinity of a first user may be wearing attire or an item of apparel or accessory that interests the user. The first user may select a control for identification of all other users in the first user's vicinity who have shared items or shared virtual repositories. Location information (e.g., GPS data) from the first user's device may be used to determine the first user's location. The "vicinity" may comprise an area within a determined range of the location. The determined range may be set by default or set and/or adjustable by the first user. If there is more than one other user in the first user's vicinity, the first user may be presented with a list of links to shared user data, from which the first user can browse and/or select a target.

Alternatively, the first user may photograph or video a target. From the location information from the first user's device, and the photograph, the first user may be presented with a list of links to shared user information, from which the first user can select the target. An implementation using facial recognition may filter the list to shared user information for one or more users who match the photograph.

In some implementations, after a target is identified, the system determines if the identified target is a user. If the person is a user, then the system may provide one or more links to shared data of the targeted user. Such shared data may include shared personal information, shared item data and a shared virtual repository. In other implementations, it is clear that a target is a user, and, therefore, this determination is unnecessary. For example, a user may select a target from a search of other users.

As described above, a user may purchase items that are shared by a target. Also, as described above, the target may receive a reward, e.g., an affiliate fee, from a vendor for items purchased by a user. Thus, a system and method according to principles of the invention potentially rewards targets for sharing item and virtual repository data, improves sales by merchants who reward referral business from targets, and facilitate purchasing decisions by consumer-users who admire a target's items and/or virtual repository.

Referring again to FIG. 1, a device such as a tablet 135, smartphone 120, computer 140 or smart television 175, may display an image or a video (media) selected by a user. For example, in one implementation, the media may be an advertisement, commercial, a broadcast or streamed program, video or movie. An icon, link, button, and/or other similar selection mechanisms may be provided, as a trigger, to enable a user to select a scene or page, and/or to mark (e.g., with a cursor) a face of a person in the media. The selection device may be a remote control in the case of television, a paired smartphone, in the case of a smart TV, or any available input device in the case of a computer, tablet or smartphone.

A video may be a broadcast television program, a program streamed on demand or some other motion picture recording. An image or photo may be a photo taken with a user's device, or a photo accessed by a user from an accessible source (e.g., a photo obtained from the Internet) or a photo provided to the user's device by another person (e.g., a photo transmitted to the user by email or SMS).

Identifying information may facilitate identification of subjects of a video or photo. By way of example, in the case of a broadcast program, the broadcaster (e.g., ABC, CBS, NBC, FOX, etc. . . . ) locale and time of broadcast may be used to identify the program. Such information is available from broadcasters, guides (e.g., television program guides) and data aggregators such as GraceNote. The identification of all individuals appearing in an identified program may also be determined from information available for the program, from such sources. Similarly, in the case of a movie, the identification of all individuals appearing in an identified movie may be determined from information available for the movie, movie databases. Knowing the identity of individuals appearing in the video facilitates identification of the person of interest to the user, whether by facial or speaker recognition, or by user selection from a list of actors, actresses, performers, hosts, guests, news anchors, reporters, and the like.

In one embodiment, a database 170 includes temporal data for movies and television programs. Temporal data correlates time with appearing individuals. Thus, all appearing individuals are associated with time values indicating when the individuals appear in the video. The time value may be relative (e.g., relative to the start of the video at 0.0 hr, 0.0 min, 0.0 sec) or, for a broadcast program, actual time (e.g., at 3:45 pm EST). In this manner, determining the time of a scene of interest to a user reveals the individuals appearing in the scene. In this manner, the list of individuals may be greatly reduced from the full cast. Such reduction facilitates identifying a person of interest.

In the case of a photo, metadata may include location and time data. A database API may include event data, identifying an event, attendees, performers, locations, and times. The data may also include user location data, including historical location information and times. In this manner, a user appearing in the photo may be readily identified with or without facial recognition.

In one embodiment, information regarding a selected scene is provided to the user. By way of example and not limitation, a database of program information may contain the names of actors in each program. For a television program the time, location and channel may be used to determine the program. The time and location may be determined from a user's computing device. The tuned channel may be determined from a smart TV, smart cable box or smart satellite receiver via communication with a paired smart phone or other computing device, or by user input.

In another implementation, facial recognition may be applied to all faces in a selected scene or to a selected face in a scene. A copy of the scene or a copy of the image of the selected face may be communicated from the device (e.g., tablet 135, smartphone 120, computer 140 or smart television 175) to a server (e.g., server 155) for facial recognition processing using facial recognition software.

Facial recognition software may include facial recognition technologies used for verification and identification. Typical verification tasks may determine that people are who they claim to be before allowing entrance to a facility or access to data. In such cases, facial recognition software compares a current image to images in a database. Some facial recognition software may use one or more of four basic methods: appearance-based, rule-based, feature-based, and/or texture-based. Appearance-based methods measure the similarities of two or more images rather than attempting to extract facial features from the images. Rule-based methods analyze facial components (e.g., the eyes, nose and mouth) to measure their relationship between images. Feature-based methods analyze the characteristics of facial features (e.g., edge qualities, shape and skin color). Texture-based methods may examine the different texture patterns of faces. For each of these methods, facial recognition software may generate a data store using algorithms to define and store data. When an image is supplied for identification, the facial recognition software processes the image and compares it with the information from the data store. As a non-limiting example, Microsoft Azure's Face is an AI service that performs facial recognition and may be embedded into software in accordance with principles of the invention. Toshiba offers a facial recognition engine and development kit that may be used to perform the facial recognition function in accordance with principles of the invention. Amazon's Rekognition can perform facial recognition and much more, including object and scene recognition in accordance with principles of the invention. These and or other facial recognition technologies may be used to perform facial recognition of selected scenes and/or images of faces, in accordance with the principles of the invention.

In another embodiment, a user may play a sound recording or stream, which is another form of media. A speaker in the recording or stream may be identified by manual input from the user, or by speaker recognition.

In another implementation, voice recognition, and more particularly speaker recognition may be used to determine the identity of a speaker in a recording. An exemplary speaker recognition process compares a speech sample against previously created voice prints to determine the best match(es). Technologies used to process and store voice prints include frequency estimation, hidden Markov models, Gaussian mixture models, pattern matching algorithms, neural networks, matrix representation, vector quantization and decision trees. Noise reduction algorithms can be employed to improve accuracy. As a nonlimiting example, Microsoft Azure's Speaker Recognition is a speech service that verifies and identifies speakers and may be incorporated into software. Other non-limiting examples include GoVivace's Speaker Identification software and Oxford Wave Research Ltd.'s Vocalise speaker recognition software.

Figure 17:
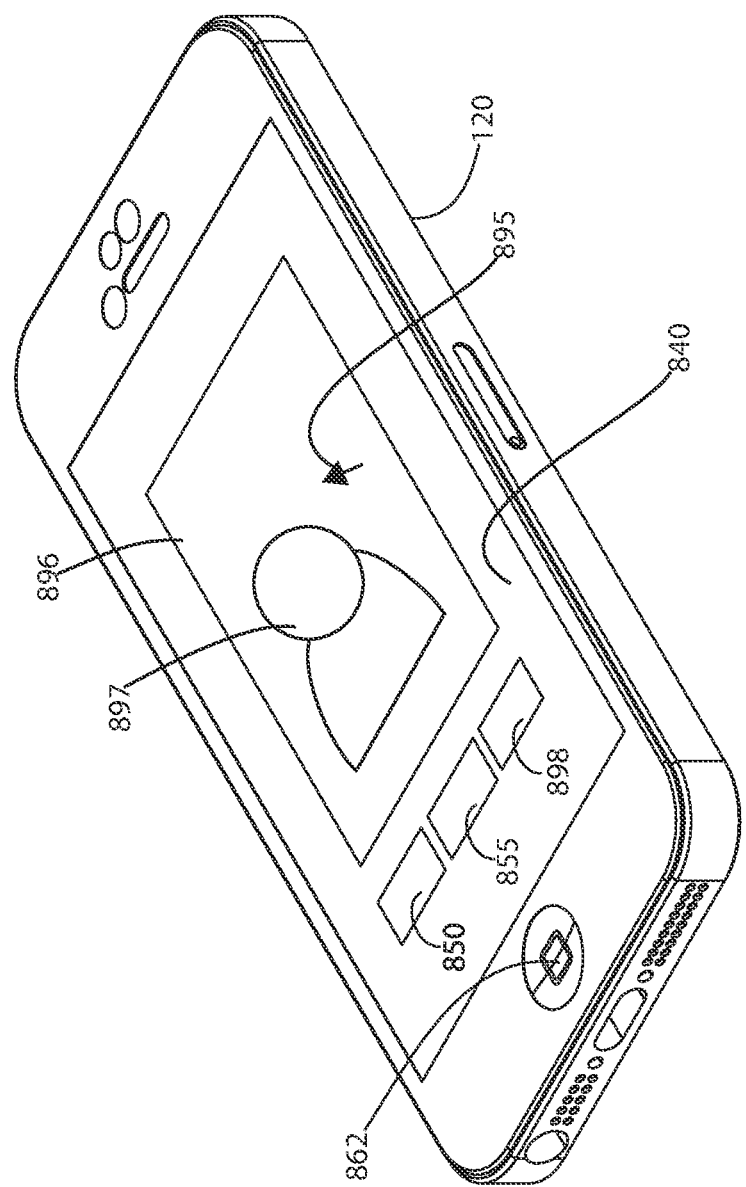
FIG. 17 conceptually illustrates a device (e.g., smart phone) with a displayed media (e.g., video or photo) showing a person and a control for initiating facial recognition to identify the person for use with a virtual repository according to principles of the invention.

Referring to FIG. 17, a display 840 of a device 120 may display image/video 896 or play a sound recording or stream. Display 840 may include mark face icon, link, button 898, and/or other similar selection mechanisms, which upon selection may enable a user to mark (e.g., in one implementation, with cursor 895) a portion of the face 897 of image/video 896. In the case of a sound recording or stream, the selection mechanism may mark a speaker. If the face is marked with cursor 895, facial recognition may be performed on the image/video 896. If a sound recording or stream is marked, speaker recognition may be performed. In one implementation, facial recognition may be performed on image/video 896 with facial recognition software provided in the device (e.g., via processing logic and storage of device 120). In another implementation, facial recognition may be performed on image/video 896 with facial recognition software provided on a device communicating with device 120 (e.g., a remote computing system 155 via network communication). Likewise, speaker recognition may be performed on the device 120 or on a remote device 155.

In lieu of facial or speaker recognition, a user may enter or select a name of the person in the image/video 896. If the user knows the name of the person, and/or the image/video 896 is poor resolution, and/or facial recognition is unavailable, user entry of the person's identity is a viable option.

Results of the facial recognition of image/video 896, or speaker recognition, or user entry, may be provided on display 840. Results may include a list of the person(s) matching the face shown in image/video 896 or identity entered by the user. For example, in one implementation, results may include a celebrity name and/or image and an indication of the closeness of the match of celebrity (e.g., a 98% chance that celebrity matches with image/video 896) to the processed image/video 896. The displayed name and/or image may be a link and/or pictogram, leading to the celebrity's shared virtual repository and/or shared items.

Results may be arranged in various ways. For example, in one implementation, the results may include a disambiguation list if an entered identity may correspond to more than one person. The disambiguation list may include a list of names and/or images, which may be links and/or pictograms. As another example, results may include a list of matching persons in descending order from the closest match to a person matching within a predetermined percentage (e.g., 50%). A user may select a person from results to display a shared virtual repository or shared items of the person.

In each example, the results list includes names of people who are users of a system according to principles of the invention. The results list omits non-users. Thus, a system according to principles of the invention may determine if a named person or facially or voice recognized person is a user.

An invitation for a non-user identified by user entry or facial or voice recognition may be generated by the system. The invitation is a message to the non-user, inviting and encouraging the non-user to become a user of the system. The invitation may be sent by the requesting user, and/or by the system. The invitation may be sent to the non-user's known email address and/or social media account(s).

A system according to principles of the invention may also determine if a named person, or facially or voice recognized person is a user with a shared virtual repository and items. If a named or recognized user lacks a shared virtual repository and items, the list may include a control (e.g., icon) to invite the user to share his/her virtual repository and items.

In another aspect of an exemplary implementation of the invention, a location-based trigger is used. A location based trigger uses location information from a user's device. Such location information is described above. The trigger may be activated by user command (e.g., selection of a control). The system determines if other users are at the same location, or in the vicinity. The determination is made using location information from each user's smart phone or similar device. If other users are at the same location, or in the vicinity, the system provides a results list or graphical display, for display on the user's device. In one implementation, the results include a list of users at the location and/or in the vicinity. The list may identify users by name and/or photo. The displayed name or photo may be a link or a pictogram that directs to the displayed user's shared virtual repository and/or items.

Illustratively, a user may be in a public space, such as a bar, a mall, a store, a street, a restaurant, a park or the like. The user may see another person who is wearing clothes that interest the user. The user may initiate (e.g., select) a location based trigger control. Upon receiving a location based trigger command, the system receives the user's location information from the user's device. The system then searches its location records for all other users at the location or in the vicinity of the location. As discussed above, the vicinity is a system or user-defined range, such as, for example, a 250 m radius. GPS-enabled smart phones are typically accurate to within about 4.9 m (16 ft.) radius under open sky. However, their accuracy worsens near buildings, bridges, and trees, and indoors.

As long as a user does not disable location tracking, the system receives location information from each user's device (e.g., each user's GPS-enabled smart phone). In one implementation, the system maintains location records for a user indefinitely or for a determined time and in determined time increments. Historical location records are useful for identifying a user who was present at or in the vicinity of a location, but recently left.

Upon determining the users at and in the vicinity of the location, at the current time and recently, e.g., up to five minutes earlier, the system generates results for display on the device of the triggering user. The results may be displayed in a list or graphically. A list may include user names and/or photos linked to each user's shared virtual repository and or items. Tools may be provided to sort and filter the list. By way of example and not limitation, sorting tools may sort the results according to spatial proximity (e.g., distance from location) of each identified user, and/or according to time, i.e., temporal proximity, and/or according to fame as described below, and/or according to another distinguishing category (e.g., gender, race, age range, height range, etc. . . . ).

Fame may be measured according to follower activity. The system may track each visit to a user's shared virtual repository and items by other users. The higher the number of such visits, the greater the popularity of the user's shared virtual repository. Such number of visits may be used as a measure of fame. Another measure of fame tracked by the system may be the number of unique users who visit the user's shared virtual repository and items. The higher the number of such unique visitors, the greater the popularity of the user's shared virtual repository. As another measure of fame, the system may track affiliate rewards (e.g., compensation) to a user. As discussed above, affiliate rewards are received by a user for click through purchases from the user's shared virtual repository and/or items. The higher the number of such purchases, the greater the fame. The measure of fame may also be a composite (combination) of visits, unique visits and affiliate rewards, which would not only indicate traffic to a virtual repository, but traffic that results in sales. The system may also track when such visits and/or affiliate awards are made, to distinguish among past popularity, current popularity and consistent popularity. Each measure of fame may be limited to recent visits, e.g., visits in the past 30, 90, 120 or 180 days. Celebrities will likely earn high levels of fame.

Categories for filtering and sorting results (e.g., a results list) may include gender, race, approximate age (e.g., range of ages such as 40-49), height (e.g., range of heights such as 6' or greater), proximity (e.g., outer limit such as within 100 m radius), fame (e.g., top 100) and other distinguishing categories. By way of example and not limitation if a user is interested in the clothing worn by a nearby Asian woman, who happens to be a user, and appears to be about 30 years old and about 5' 4", the interested user may filter all males, all non-Asians, all people 40 or over, and all people over 5' 10". If the woman was within 10 m of the user, the interested user may also filter all people more than 25 m away. Such filters allow a cushion for error in approximation. As another example, the user may be primarily interested in any famous users in the vicinity. Thus, the interested user may filter, from the result list, all users who have a determined level of fame or less, or all users but the top 5, 10, 50 or 100 most famous users, leaving only the most famous users in the results list.

In each case, a results list includes links (or pictograms) that direct to shared virtual repositories and/or items of a sharing user. A user who follows such a link (i.e., a following user), may purchase one or more shared items, provided that the shared items are available from linked merchants. Such purchases may be initiated by selecting purchase links associated with the items. The selection may direct to a merchant website where the item may be purchased. Via an affiliate program, as described above, the sharing user may be rewarded for the purchase. In this manner, sharing users are rewarded for promoting items, such as by including items in their shared virtual repository, and by wearing or using items in public where other users may acquire an interest upon witnessing the user and/or the items being worn or in use. The sharing user becomes a live advertisement for the items. Traffic to a merchant's website may appreciably increase due to such advertising. Sales of the shared items are also likely to increase.

Another type of trigger is a product trigger. Upon selecting a product trigger control, a user may input identifying information for a product. The information may be a brand and product code, a universal product code (UPC), a European article number (EAN), or other identifying information for a product. The system database 170 may include, for each user, item identifying information. The prospects of affiliate rewards from product triggers and earning fame encourage users to supply such identification information. Upon receiving the identifying information for a product from the triggering user, the system references records in the database 170 to determine users associated with shared items that are the same as the identified product. The system then returns, to the device of the triggering user, a results list and related data. The results list identifies other users who possess the product and have shared item information for the product. The results list may be sorted and filtered by the triggering user. In this manner, the user may determine if many users possess the product, if celebrity users possess the product, what other products such users possess, where such users are located, what are their age, gender, race, and other information relating thereto. The user may also purchase the product through another user's shared virtual repository, to give the other user an affiliate reward. Users may develop reciprocal relationships to foster affiliate rewards among the users.

In another aspect of a method and system according to principles of the invention, a user may research one or more other users. Such research may entail querying (e.g., searching) database records or exploring through indices. Such results in a list may be sorted and filtered to focus interest, as described above. A user interested in researching footwear popular among other like users would likely find that young men in a rural farming community favor different footwear than young men in a major metropolitan area. Illustratively, a user may search for users who possess Adidas Yeezy sneakers. The user may filter the search results by locale, user age, and any other filtering criteria. The results will show how popular such sneakers are among the listed users, after filtering.

In another aspect of a method and system according to principles of the invention, a user may enter information for an event, appearance, show, or program (collectively, an "event") into the database 170. By way of example, a celebrity user may appear at an event. Information about the event may be entered after the event is scheduled. The information may include a name for the event, a location for the event, a date and time for the event, and any other information to describe and distinguish the event. Such user may also specify items in the user's shared virtual repository that the user will wear or use during the event. Such user may also specify that the event information be immediately shared, but that information regarding items used/worn by the user at the event not be shared until the event occurs. In this manner, other users may research the event and the participating user, and that user's shared virtual repository and items. Illustratively, a celebrity may appear as a guest on a talk show, an event. The celebrity, or an assistant for the celebrity, may input information about the event and specify the attire worn by the celebrity during the event, with the attire being items from the celebrity's shared virtual repository. Using a system according to principles of the invention, fans of the celebrity may follow the celebrity's shared virtual repository, and consider purchasing one or more of the items worn by the celebrity during the event.

In another aspect of a method and system according to principles of the invention, a user may enter a directive. A directive may identify another user (e.g., a celebrity), a virtual repository, an item or other identifiable classificatory division of subject matter that is of interest or desired by the user providing the directive. The directive identifies the user, the subject matter of interest and provides an instruction. The instruction may request notification when another user's (e.g., a specific celebrity's) virtual repository is changed, or when another user (e.g., a celebrity) schedules an event, or when some other condition is satisfied. A directive may be persistent, valid until canceled. Thus, for example, a user may request notification whenever a celebrity schedules an event or changes her virtual repository.

Figure 16:
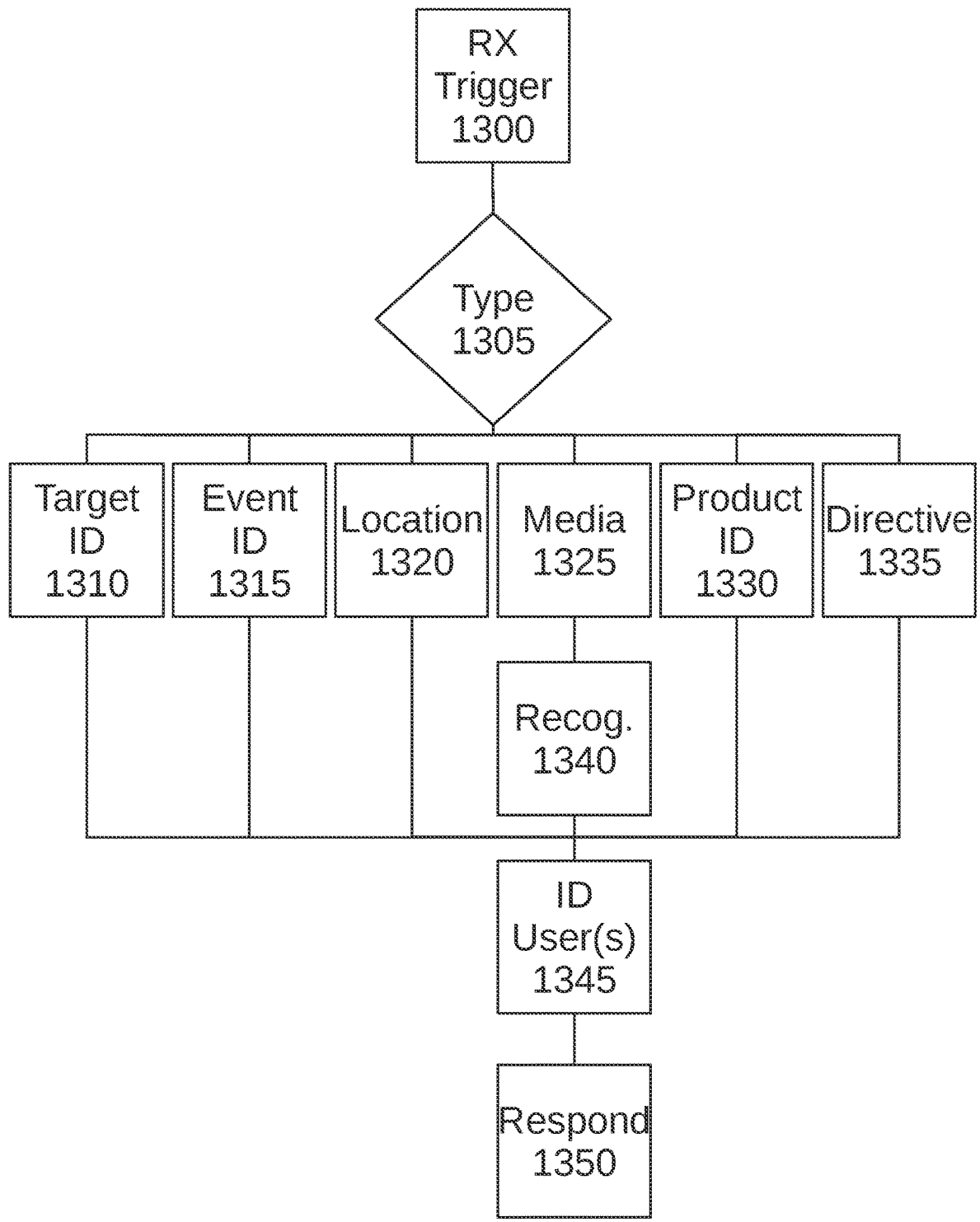
FIG. 16 is a high level flow chart of steps of an exemplary triggering process for use with a virtual repository according to principles of the invention.

Referring to FIG. 16, a high level flow chart is provided for an exemplary triggering process according to principles of the invention. The process entails receiving a trigger, as in step 1300. The type of trigger is determined in step 1305. A target trigger provides a target identification, which is the identification of a user of interest, as in step 1310. An event trigger identifies an event attended by a user, as in step 1315. A location trigger identifies a location of a user, seeking identification of other users in the area, as in step 1320. A media trigger provides media (e.g., an image such as a photo, a video or a sound recording) from which a displayed or speaking person is to be identified, as in step 1325. A product trigger provides an item identification, which is of interest to the requesting user, as in step 1330. A directive, identifies the user, the subject matter of interest and provides an instruction, as in step 1335. In the case of a media trigger, as in step 1325, facial or speaker recognition may be performed, as in step 1340. In each case a one or more users may be identified in response to the trigger, as in step 1345. In response to the triggering user, a results list is provided, as in step 1350. The results list may list one or more other users.

Implementations consistent with principles of the invention may identify media based on facial and/or voice recognition results for the media, and may display identification information based on the facial and/or voice recognition results. By using media identification (e.g., facial recognition technology to identify a person(s) in images and/or video, and/or voice recognition technology to identify a person(s) in audio, e.g., a sound byte from a recording), a person(s) may be identified and shared virtual repository data may be displayed on a device.

In turning first to FIGS. 18-24 and 27-29, seen are various systems, methods, and device for random product generation and display as well as the matching logic for a Slot Machine auto-match (rotation) Mode, a slide-by reel, strips, and a nine-flop, among other arrangements.

Figure 33:
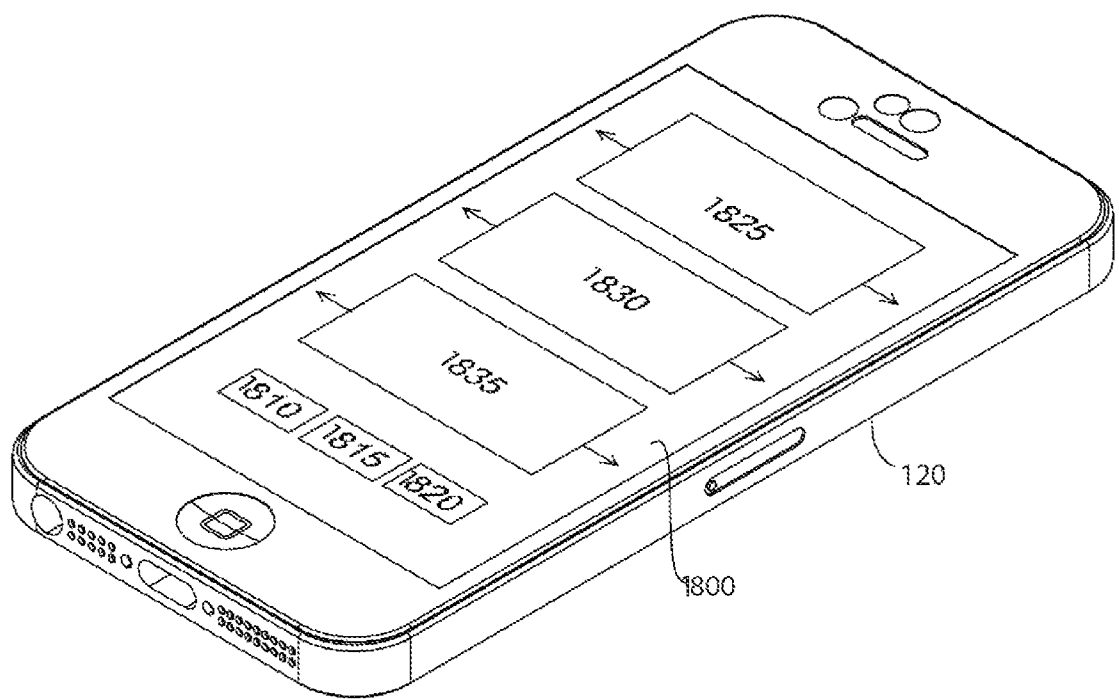
FIG. 33 is an exemplary conceptual illustration of a smartphone user interface for a method according to principles of the invention.

Seen in FIG. 33 is one example of a user interface 800 for random product generation. One such user interface 800 may comprise random product generation for a female. In such an embodiment, the first window 1825 may display an upper-body clothing item such as, but not limited to, a woman's top, shirt, t-shirt, or dress shirt. Other clothing options may be displayed in the first window 1825. The first window clothing item may be selected by the user or may be randomly generated by the system as described herein. For example, when the first window 1825 clothing item is selected by the user, the user may choose an item from a user's online closet associated with the system. Alternatively, the user may select an item for sale online or at a local brick-and-mortar location for entry into the first window 1825. When the first window 1825 clothing item is randomly generated, the system may randomly display one of a woman's top, shirt, t-shirt, or dress shirt for display in the first window 1825.

Regardless of the way that the clothing item in the first window 1825 is placed into the first window 1825, it is contemplated that the second window 1830 may display a middle-body clothing item. One such middle-body clothing item may comprise a skirt, a pair of shorts, pants, jeans, or dress pants. Other middle-body clothing items are contemplated. It is contemplated that the second window 1830 clothing item may be generated in a similar manner that the first window 1825 clothing item is generated—either via user selection from a virtual closet, etc., or system generated using the parameters as described herein.

Regardless of the way that the clothing items in the first window 1825 and second window 1830 are generated, in the third Window 1835 will be displayed a lower-body clothing item. One such lower-body clothing item may comprise shoes such as, but not limited to, heels, wedges, sandals, pumps, and sneakers, It is contemplated that the second window 1835 clothing item may be generated in a similar manner that the first window 1825 and second window 1830 clothing items are generated—either via user selection from a virtual closet, etc., or system generated using the parameters as described herein.

When a user desires to display women sports clothing items in the FIG. 33 user interface 1800, it is contemplated that the first window 1825 may comprise tops, t-shirts, and/or dri-fit shirts. These items and the other women's sports clothing items may be selected from athletic brands. In such a women's sports clothing items user interface 1800, the second window may comprise clothing items such as, but not limited to, tights, shorts, skirts, and/or sweatpants. The third window's clothing items may comprise running shoes, training shoes, basketball shoes and/or sneakers. One such user interface 1800 may comprise a soft button to select brands for display such as, but not limited to Nike, Adidas, Reebok, Under Armor, Converse, and/or New Balance.

One user interface 1800 may comprise only two of the three windows 1825, 1830, 1835. For example, a user may select a full-body item such as, but not limited to, a dress, jumpsuit or a romper in the first window 1825. One such first window 1825 selection may enable the ability to select any dress, (evening, day, summer, wedding, etc), a jumpsuit, or a romper. The third window 1835 or second window 1830 may then display a lower body item such as, but not limited to, heels, wedges, sandals, and/or pumps.

For male clothing items, the first window 1825 may display a top, shirt, t-shirt, or dress shirt. The second window 1830 may comprise a pair of shorts, pants, jeans, dress pants, or slacks. The third window 1835 may comprise shoes such as, but not limited to, basketball, sneakers, or dress shoes. For male sports clothing items, the first window 1825 may display athletic-branded tops, t-shirts, and dri-fit shirts, the second window 1830 may display athletic branded tights, shorts, or sweatpants and the third window 1835 may display shoes such as, but not limited to, running, training, basketball, and tennis shoes. There may also be a soft button to choose one or more bands to display such as, but not limited to, Nike, Adidas, Reebok, Under Armor, Converse, and/or New Balance.

The user interface 1800 may display the windows 1825, 1830, 1835 with or without borders. Additionally, it is contemplated that a user can select new clothing items in each window 1825, 1830, 1835. For example, a user may "swipe" each of the windows 1825, 1830, 1835 in a direction to display another clothing item in the swiped window. Such directions may be swiping towards the left or towards the right or up or down and may swipe in an opposing direction to see prior-viewed items.

In generating clothing options for display in the windows 1825, 1830, 1835, it is contemplated that matching logic may be used in association with a database of multiple color shades and primary colors to determine the color of the clothing options for display. Such matching logic may be applied to various user interface 1800 modes such as, but not limited to, a regular search engine mode (e.g., displayed by the search engine Google LLC, located at 1600 Amphitheater Parkway, Mountain View, Calif. 94043), a slot machine mode, a slide-by strips mode, a 9 flop strip mode, or reel mode. Matching logic can be performed using a graph database such as, but not limited to, the Neptune Database from Amazon Web Services ("AWS"). AWS is a subsidiary of Amazon.com, Inc. located at 410 Terry Ave. North, Seattle, Wash., 98109.

In one such matching logic, as applied to, for example, the regular search engine mode, all displayed clothing items may comprise the same color. It is further contemplated that the database may comprise a list of colors that may be associated with any single color such as, but not limited to, a primary color. For example, a first window product 1825 may comprise a primary color product. When a user searches for an item in the second window 1830, the color of the products displayed in the second window 1830 may comprise any of the colors listed as matching colors in the database for the primary color of the first window 1825 product. When a user finds a product in a color he/she likes or is looking for and the user selects the product in the second window 1830 (a similar/same method/operation is applicable to products selected in the other windows 1825, 1835), the product may display an identifier to signify the product as a chosen product to match with a prior product or as a base product for other products to match to. One such identifier may comprise a "check mark". In one such embodiment, a matching algorithm may access color name data from a detailed description of the product on the system the product is displayed on. Such color name data may be identified as keywords associated with the product. Once the user has "check marked" the product and the algorithm obtains the color(s) from the product description, a user may select a "match it" button on a website within an application utilized to access the product. Upon selecting the "match it" button, the system, via a color keyword algorithm, may display products in the colors associated in the database with the color of the original product. For example, the "ivory" keyword associated with a shirt may display pants having the "baby blue" keyword associated with the pants and/or shorts having the "copper" keyword associated with the shorts. In displaying the colors associated with the new products, users are better able to obtain the name and any other identifying information (e.g., color codes) for a color of a product. It is further contemplated that a user may first select a specific color for matching, such as, but not limited to, a primary color. Upon making such a selection, the system may display products having a color keyword that comprises the selected color.

In one embodiment, if the first window 1825 displays a product comprising the color keywords Rose-Red, Maroon, and Cherry-Red in a product detail file, the matching logic may display a product with the same color in the second window 1830 or third window 1835. It is also contemplated that, under the matching rules below, the system does not always display products having the exact same color. The matching logic ensures that a second window 1830 or third window 1835 product will not be displayed if the product comprises a color which does not complement the color of the first window 1825 product (e.g., the two colors have too similar of a shade). For example, the matching logic identifies that a maroon color product will not be displayed in a second window 1830 or third window 1835 when the first window 1825 product comprises a product having a regular red keyword code since Maroon and red are not complementing colors. Such rules may also be based on product type. For example, there may be exceptions to display specified products in specified colors only with other specified colors/products.

In one embodiment the matching engine comprises the following Shades of White: White (1); Pearl (3); Off White (3); Ivory (1); Cream (2); Vanilla (2); Seashell (3); Snow (1); and Splashed white (1). The matching engine may also comprise the following Shades of Black: Black (4); Ebony (5); Onyx Black (5); and Jet (5). The matching engine may also comprise the following Shades of Gray: Grey (6); Gray (6); Cadet Gray (7); Cool Gray (7); Silver (9); Platinum (10); Ash gray (7); Gun Metal Gray (12); Taupe gray (6); Timberwolf (10); Slate gray (7); Battleship Gray (6); and Charcoal (8).

The matching engine may comprise the following Shades of Blue: Blue (13); Baby Blue (14); Powder Blue (14); Air Force Blue (22); Sea Blue (14); Blueberry (21); Carolina Blue (14); Dodger Blue (20); Duke Blue (13); Cyan (16); Electric Blue (16); Teal (17); Light Blue (14); Midnight Blue; Navy Blue (13); Oxford Blue; Royal Blue (20); Dark Blue (13); Sapphire (15); Sky Blue (14); Turquoise (16); UCLA Blue (15); Yale Blue (19); True Blue(15); Palatinate blue (13); Marine Blue (14); Aqua Blue (14); Denim(18); and Jeans(18).

Shades of Brown included in the matching engine may comprise Brown (23); Beige (25); Tan (25); Bronze (24); Rust (24); Buffalo (26); Wheat (27); Sand (25); Khaki (25); Coffee (26); and Copper (24). Matching engine Shades of Red may comprise Candy Apple (28); Red (28); Crimson Red; Carmine (29); Burgundy (29); Maroon (29); Oxblood (29); Raspberry (28); Cherry (29); Tomato (29); Wine (30); Cardinal (28); Ruby (28); Scarlet (28); Redwood; Rosewood (29); Dark red (29); and Venetian Red (28). Shades of Violet in the matching engine may comprise Purple (32); Light Purple (36); Lavendar Floral (32); Red-Violet (35); Violet (31); Indigo (31); Plum (32); Fandango (35); Tyrian (32); Thistle (33); Amethyst (32); Orchid (36); Dark-Purple (31); Mauve (33); Fuchsia (34); Magenta (34); and Rose (34).

Shades of Yellow in the matching engine may comprise: Yellow (37); Amber (39); School Bus Yellow (39); Gold (40); Selective Yellow (39); Maize (41); Naples Yellow (41); Mustard (38); Mikado yellow (39). Shades of Orange in the matching system may comprise: Orange (42); Orange-red (44); Orange Peel (42); Carrot (42); Tangerine (42); Pumpkin (42); Rust (43); Burnt Orange (43); Dark Orange (43). Shades of Green in the matching engine may comprise Green (45); Light Green (45); Dark Green (49); Apple Green (45); Bright Green (45); Lime (50); Emerald (51); Hunter (48); Fern Green (48); Lawn Green (45); Olive Green (52); Neon Green (45); Shamrock Green (46); Mint (46); Sea Green (46); Jungle green (46); Forest Green (49); Moss (47); and Jade (53).

Shades of Pink in the matching engine may comprise Pink (54); Salmon Pink (54); Dark Pink (55); Carnation Pink (54); Brink Pink (55); Ultra Pink (55); Hot Pink (55); Rose Pink (55); Deep Pink (55); Mexican Pink; Magenta (55); and Fuchsia (55). Shades of Denim in the matching engine may comprise Denim (56) and Jeans (56).

When a product comprises more than two shades of any color in the product details, then both group numbers will be sued. For example, if Red and Black are in the details of a requested clothing article, then group numbers 28 and 4 should be used to locate the desired article.

In situations where the user has not identified a specific product to match in the first window 1825, the matching engine may process a default script. Once such default script may comprise a default script for a male user. One male default script may comprise displaying in the first window 1825 a t-shirt or a sports t-shirt from an athletic brand such as, but not limited to, Nike, Under Armor, Reebok, or Adidas. The middle window 1830 may display shorts or Sports Shorts; The bottom window 1835 may display sneakers, running shoes, training shoes, or basketball shoes.

A default script for a female user may comprise a first window 1825 displaying a top or shirt, a second window 1830 displaying shorts or skirts that do not comprise sports brands like Adidas, Nike, Reebok or Adidas, and a third window 1835 displaying Sandals, Heels, Pumps, or Wedges.

System matching logic may determine what products to search and display based upon a product category the user is currently searching. For example, if a user is searching for products related to women, men, boys, girls, or sports, then the products displayed in the windows will similarly comprise women, men, boys, girls, or sports-related products. Furthermore, if searching for sports-related products, it still needs to determine whether the products are related to women, men, girls, or boys. In one embodiment, a soft-button in the user interface 1800 may be utilized to initiate a default matching script. It is contemplated that the matching logic or rules may be adapted to match products and/or services within locked or unlocked windows 1825, 1830, 1835 (also referred to herein as strips and/or reels) by category, sub-category, brand, price, discount/sale, matching parts (e.g., color), recommendations, reminders (e.g. a user device 120 calendar entry displays a "wedding" and the matching logic may display products for the "wedding"), financial obligations or any other identified product or service. Products may be randomly displayed in the windows 1825, 1830, 1835 in slot machine mode, 9-flop mode or any other mode. In slot machine mode, the windows 1825,830, 1835 may move across the user interface 1800 in the direction of the arrows while the matching logic finds a product to display in the windows 1825, 1830, 1835. It is contemplated that the matching logic may be adapted for use by or within any search engine such as, but not limited to, Google. It is further contemplated that the matching logic may utilize a graphical database such as, but not limited to, the AWS Neptune database (reference FIGS. 1-7 and FIGS. 9 and 10,11,12.)

In one slot machine mode, all 3 windows 1825, 1830, 1835 will initially spin simultaneously. Under one default script, the matching logic may be adapted to select and display any color or style of shirt in the first window 1825, regardless of whether the shirt color comprises a striped pattern, a multi-color shirt, or a solid color and regardless of whether the shirt style comprises a t-shirt, a button-up shirt, or a collared/polo shirt, etc.

It is contemplated that the top window 1825 may be the first window to stop spinning and display a product during slot machine mode. After the first window stops spinning, the matching logic may be comprised to access the color(s) and brand of the product displayed in the first window. For example, the matching logic may be adapted to access a keyword file or another file having product identifiers and in one such file the color keyword may comprise a "multi-color" identifier, a "stripe" identifier, or a "solid" color identifier.

In one embodiment, when the first window 1825, also referred to herein as a top window, displays a stripe or a multi-color shirt when the window 1825 stops spinning, the matching logic may be adapted to only search for solid products to display in the second window 1830, also referred to herein as a middle window 1830. Furthermore, upon the matching logic selecting a product for display in the first window 1825, the matching logic will conduct a search for a product to display in the second window 1830. Such products may comprise solid shorts, jeans, skirts, and pants, for the gender/age identified: women, men, girls, or boys. The matching logic may identify products for display in the second window 1830 that comprise the same color as the color associated with the product in the first window 1825.

In one embodiment, if a sports t-shirt having a brand such as, but not limited to, Nike, Adidas, Reebok, and Under Armor is displayed in the first window 1825, then the matching logic may be adapted to display a product in the middle window 1830 with a similar or the same brand. Similarly, if the first window 1825 displays a top or a dress shirt and the product is not associated with a sports brand such as those listed above, then then the matching logic may be adapted to not display a product in the middle window 1830 associated with any of the brands. Furthermore, if the first window 1825 displays a solid-colored shirt of one color with no additional colors, then the matching logic may automatically default to only search for solid or a multi-colored product for display in the middle window 1830. It is contemplated that the color of the product displayed in the middle window 1830 may not comprise the exact color of the product displayed in the first window if first window lands on solid color product.

After the first two windows 1825, 1830 stop spinning and products are displayed in the windows 1825, 1830, the bottom window 1835 may access the details associated with the product displayed in the first window 1825. If the details comprise a product identified as a dress shirt, a shirt, or a top, then the matching logic may search for dress shoes or dress boots in any of the colors in the details of the product displayed in window one 1825. It is also contemplated that all black dress shoes, shoes from the tan color group (group number 25), and all brown dress shoes may also be displayed in the third window 1835 when the first window 1825 product details comprise a product identified as a dress shirt, a shirt, or a top. Similarly, if a sports-related brand is read in the product details, then the matching logic may default to display in Window three 1835 sneakers, running shoes, training shoes, and/or basketball shoes in (a) any one of the colors that is in the details of the shirt in first window, (b) black color shoes, and/or (c) white color shoes. The matching logic may also be adapted to display brand name products in bottom window 1835 if similar brand name products are displayed in the first window. As shown, the matching logic may be adapted to match black shoes in the third window 1835 with any color product in the first and/or second windows 1825, 1830.

In a 9-flop mode nine windows are utilized to display matching products. For this process, the windows, strips, or reels during the auto-match will stop one at a time very similar to the slot machine mode except windows can flip flop in order. Any Window, Strip or Reels can stop first and the rest of the windows, strips, or reels will use the matching logic and color code rules one after the other until all windows, reels, or strips have stopped for a complete match (random display generator matching). Each window will have a specific product to match for each stop or every time the match it button is triggered. One will match just shirts top, etc. . . . , one just pants, shorts, skirts, one just shoes, heels, one just hats, one just glasses, one just jewelry, one just beauty, one just Fragrance, one just jackets, coats.

When a user desires to obtain matches to a product not initially associated with the system as described herein, upon associating such a product and product details (e.g., keywords) with the system (reference FIGS. 1-7 and FIGS. 9 and 10,11,12), a default matching logic script may be utilized. One such default matching logic for men or boys may comprise displaying in window one 1825 an uploaded product when the product comprises one of a t-shirt, a sports t-shirt from a sports brand, a jacket, a coat, a dress shirt, and a collared. It is further contemplated that uploaded shorts, sports shorts, jeans, pants, and sports sweatpants may be displayed in the middle window 1830 and uploaded sneakers, running shoes, training shoes, basketball shoes, and dress shoes may be displayed in the bottom window 1835. It is contemplated that identified products such as, but not limited to, belts, hats, and jewelry may be unable to be added to the system for matching. In such an embodiment, an error message may be provided to the user that the uploaded product is unable to be added. However, it is also contemplated that any such restricted product can be added to the 9 window (also referred to herein as the 9-slot) and 6 window (operating similar to the 9-slot) matching system when applicable. Similarly, uploaded products identified as a woman or a girl product may be displayed in the following manner: tops, shirts and jackets chosen may be displayed to the first window 1825 for matching, shorts, skirts, pants, jeans chosen may be displayed in the middle window 1830 for matching and sandals, heels, pumps, wedges, sneakers, and shoes may be sent and displayed in the bottom window 1835. It is further contemplated that when a dress is uploaded to the system, the first window 1825 may be removed, the dress may be displayed in the second window 1830 and the third window 1835 may be used to match up heels, sandals, wedges, pumps, and shoes, among other potential products, with the uploaded dress. Belts, hats, scarves, and jewelry may also comprise restricted female goods.

It is contemplated that a user may lock a product within one or more of the windows 1825, 1830, 1835. In such an embodiment, a user may enable an auto-matching button for the remainder of the windows 1825, 1830, 1835. Gender determination in the auto-matching may depend upon the gender associated with the user profile or the gender associated with a first product to match. (reference FIGS. 1-7 and FIG. 9, 10,11,12)

In one embodiment, a user may lock a product in the first window 1825. In such an embodiment, matching logic may be utilized to match products in the middle window 1830 and bottom window 1835 with the locked product. Such products may be matched according to the matching rules mentioned above. Similarly, if a user locks a product in the middle window 1830, matching logic may be utilized to match products in the first 1825 and bottom windows 1835. In such an embodiment, the matching logic may determine whether the middle window 1830 product comprises a sports brand and may determine the color of the middle window 1830 product. Matches may then be conducted according to the matching rules mentioned above. If the user locks a product in the bottom window 1835, the matching logic may determine, by reading the details associated with the product, if the product comprises dress shoes, boots, sneakers, running shoes, training shoes, basketball shoes, heels, wedges, sandals, or pumps and may determine the color of the product. The matching logic may then display a shirt in the first window 1825 according to the matching rules. If the user locks more than one window, then match according to the matching rules mentioned above.

It is contemplated that a user may obtain matches for a product or service by selecting a "match it" icon located within an application or a website displaying a product. Similarly, matches may be obtained by locking a specific product to the system from a website of multiple products. In such embodiments, the system may match the selected product with other products from one or more vendors or storefronts. It is further contemplated that a filter may be implemented so the matching logic provides matches from prior purchases of the user or archived products from, for example a user's fashion closet. FIGS. 9 and 10.

The matching logic may incorporate a budget filter (FIGS. 10 and 11). One such budget filter may be adapted to match products to conform to an identified overall budget. Such matching may occur either with or without locking the product according to the matching rules described herein. A budget limit may can be set for an aggregation of products from the same or different storefronts, websites, data feeds, etc., with without matching of the products. For example, if a user's budget comprises $1200.00, the user can utilize the system to display a shirt, pants, shoes, television (e.g. a Samsung TV), concert ticket, and plane ticket within the identified budget. If the user likes one or more of the products and does not like a remainder of the products, the user could then lock the liked products and select the "match it" icon and/or use voice command to instruct the system to search for additional matches in the same budget. The process can be repeated until all products are locked. It is contemplated that the budget feature may be integrated into the slot machine mode (also referred to herein as a slide-by mode or reel mode) and/or any search engine. All features described herein can be integrated into the slide-by or reel mode.

Turning first to FIG. 1, seen is one embodiment of an application also referred to herein as an app, having features as described herein. For example, such features may comprise the features described above with respect to FIG. 33. Such an application may be utilized by a handheld computing device such as, but not limited to, the user device 120 seen in FIG. 33. Other computing devices known in the art and as described herein are also contemplated. The features described herein related to the app may also be utilized by a website. It is further contemplated that location features on the device may be enabled for use with the application One feature in the application may comprise a consumer-based advertiser feature, also referred to herein as an influencer, a fashion advertising model, or simply, an advertiser user or advertiser. In one embodiment, FIG. 24, a consumer-based advertiser comprises a human fashion model that advertises, in the application products the advertiser purchase from various retailers such as, but not limited to, retail stores and designers. The advertiser may then receive monetary payments via a commission or otherwise by wearing the products and displaying the products on the application For example, turning now to FIG. 25, seen is a user interface for one such fashion advertising model. Displayed are various products available for purchase. The information (e.g., images, brands, pricing) associated with the products displayed in the user interface or elsewhere in the app may be received from third-party systems. For example, the application may communicate with an application server, also referred to herein as a centralized product e-commerce platform, adapted to provide the information to the app. The application server may communicate with one or more third-party systems to obtain the information. Such third-party systems may comprise systems related to a product retailer. The product retailer may provide the information for display in the application The application may enable an advertiser to purchase the products displayed in the application from the product retailer. It is further contemplated that products may be purchased directly from the product retailer through a product retailer application, website, or brick-and-mortar establishment.

However the products are purchased by the advertising model 805, it is contemplated that the advertising model can associate those purchases with the centralized product e-commerce platform and a profile within the application that is associated with the model 805. Though such association, purchased products may be archived and saved in a database of products associated with the model. Such products may comprise clothing, household goods such as, but not limited to, furniture, tools, or any other product. Such products may be displayed in the application via a virtual closet user. Upon associating an item with a virtual closet, a fashion advertising model, also referred to herein as an influencer, may identify in the virtual closet which items the influencer is wearing for the present day. Upon selecting one or more items, the selection may be associated with a time period. One such default time period may comprise period running form the time the item was selected until 4:00 am the following date in the same time zone. Any follower of the influencer, as described herein, that accesses the influencer's profile in the application during the time period and chooses to view what items 1606 the influencer has identified as wearing will see the items selected by the user. The default time period may be set to any particular time. Additionally, the default time period may display other items if the influencer changes outfits and/or otherwise updates the application to display other items as being worn by the influencer.

Figure 26:
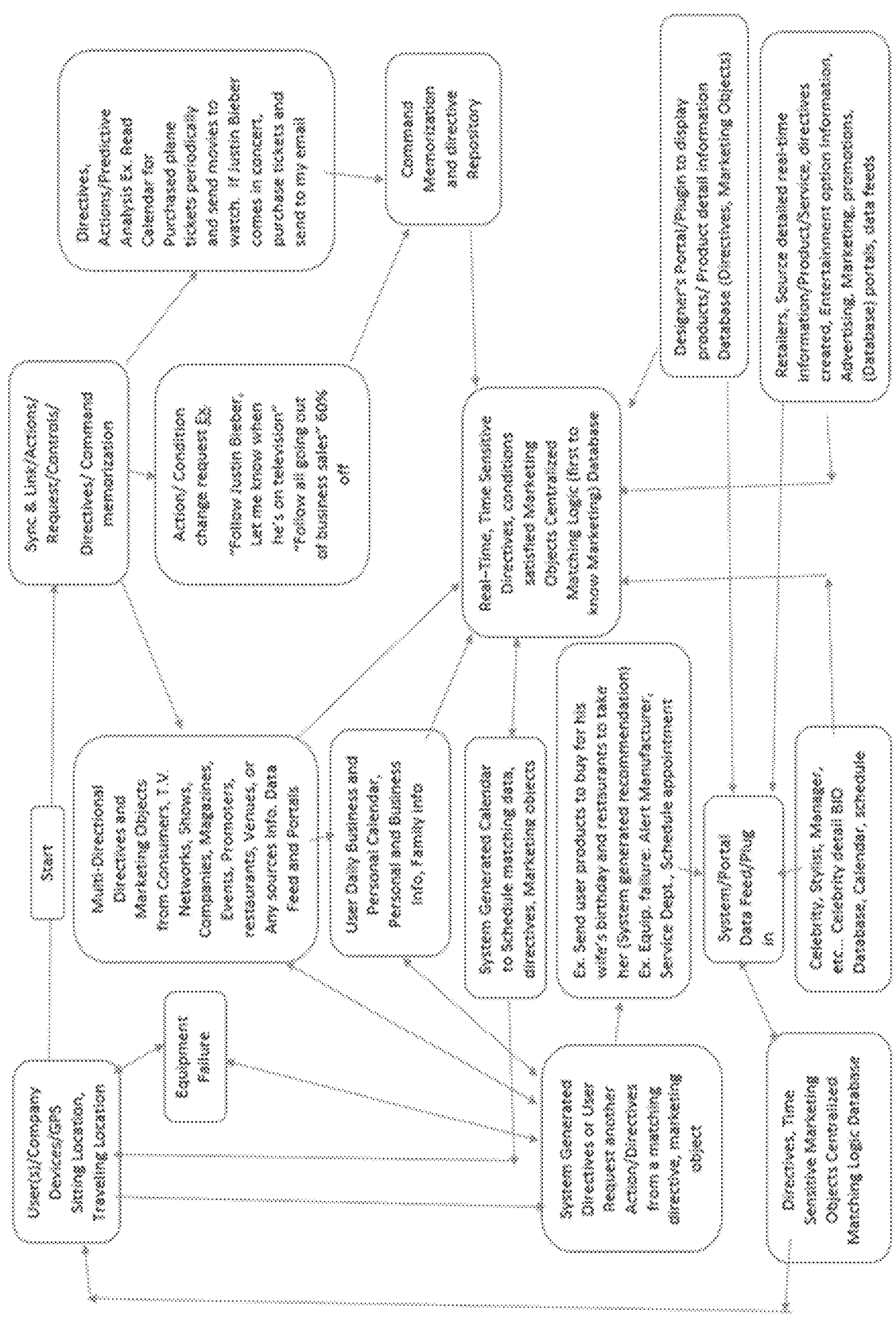
FIG. 26 is an exemplary nonlimiting flowchart for steps of a method according to principles of the invention.

Upon identifying what clothing items the influencer is wearing or other products the influencer is associated with, as seen in FIG. 26, the influencer may access a camera feature on the application and take a photograph (e.g., a "selfie") of the influencer wearing the selected item(s).

Figure 27:
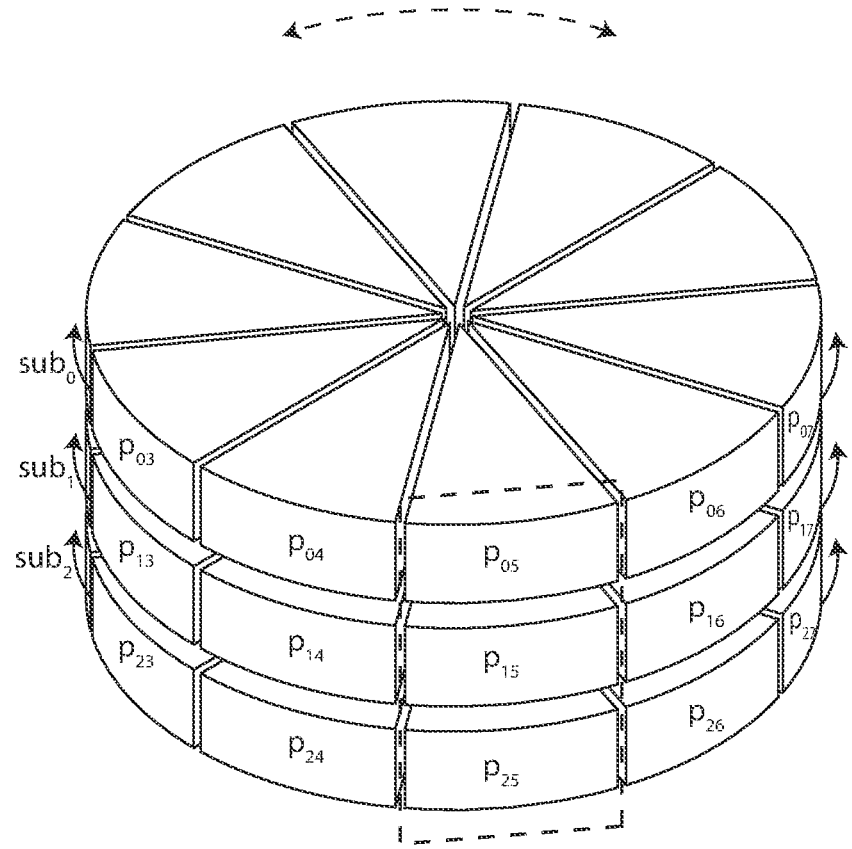
FIG. 27 is an exemplary nonlimiting high-level schematic for a user interface for a system according to principles of the invention.
Figure 28:
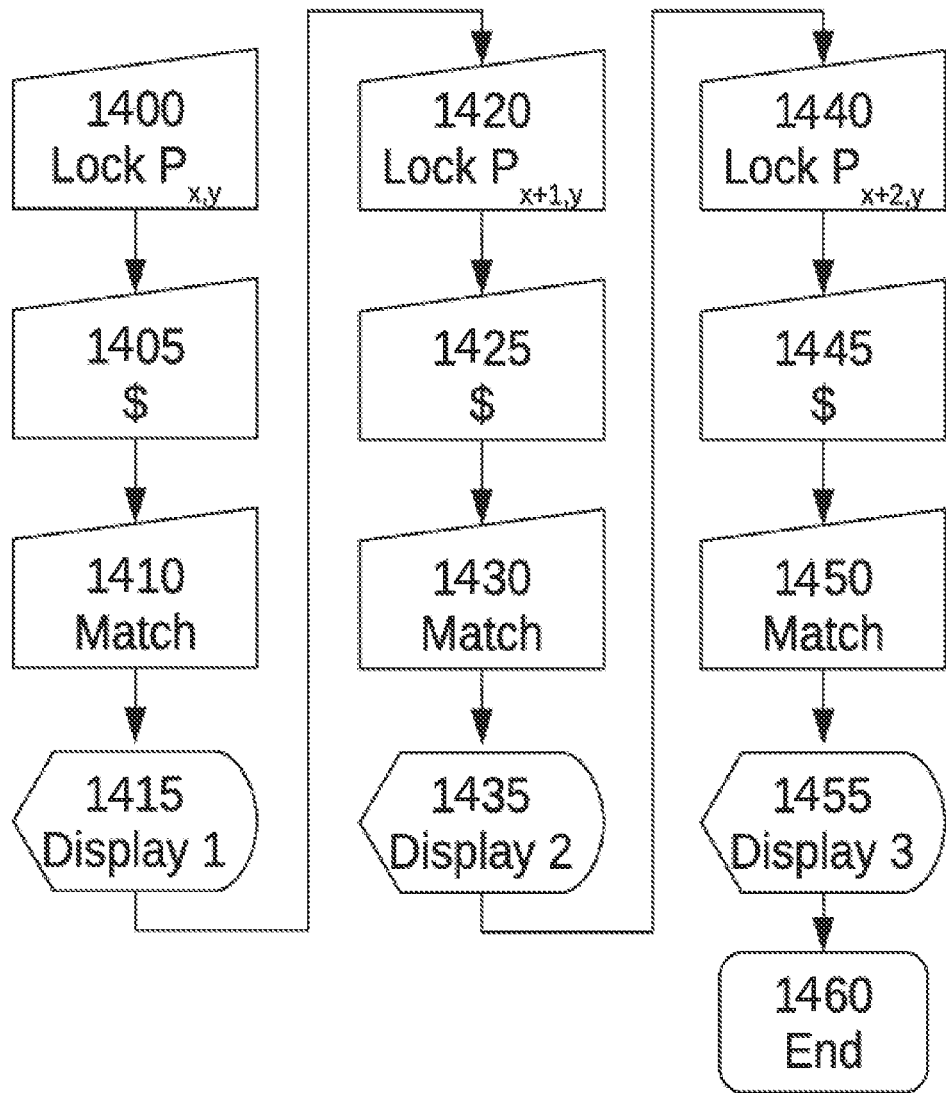
FIG. 28 is an exemplary nonlimiting flowchart for steps of a method according to principles of the invention.

Turning now to FIG. 27, seen is a publish screen 1012. In the publish screen 1012, the influencer may select to display the items 906 associated with the influencer immediately 1014 or may select to display the items at a time scheduled 1016 in the future. When choosing to publish immediately, 1014, the influencer may designate a location associated with the publication. Such location may be updated by the influencer as the influencer changes locations throughout the day. Such locations may be broad (e.g., "Los Angeles") or narrow (e.g., "Tropicana at the Roosevelt"). Broader or narrower locations and locations/areas in between, are also contemplated.

Figure 29:
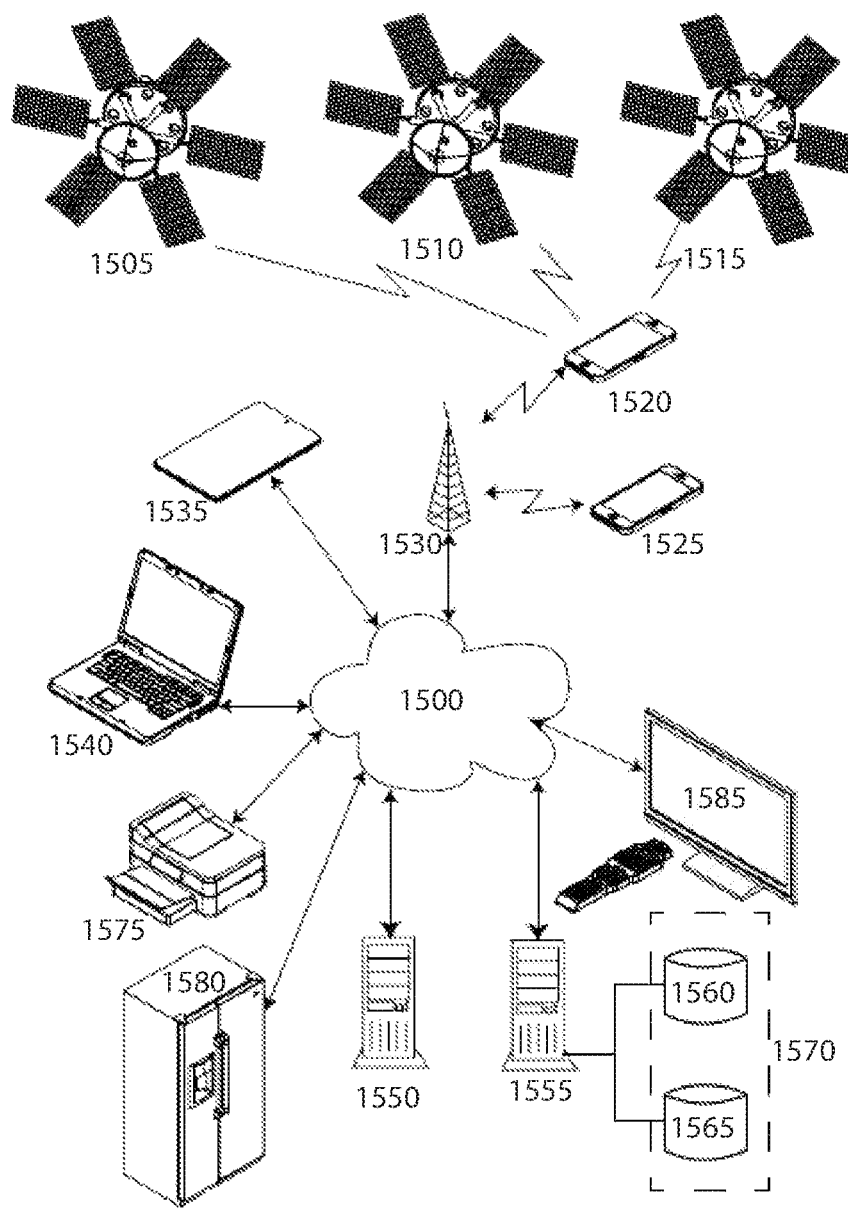
FIG. 29 is an exemplary nonlimiting block diagram for a system according to principles of the invention.
Figure 30:
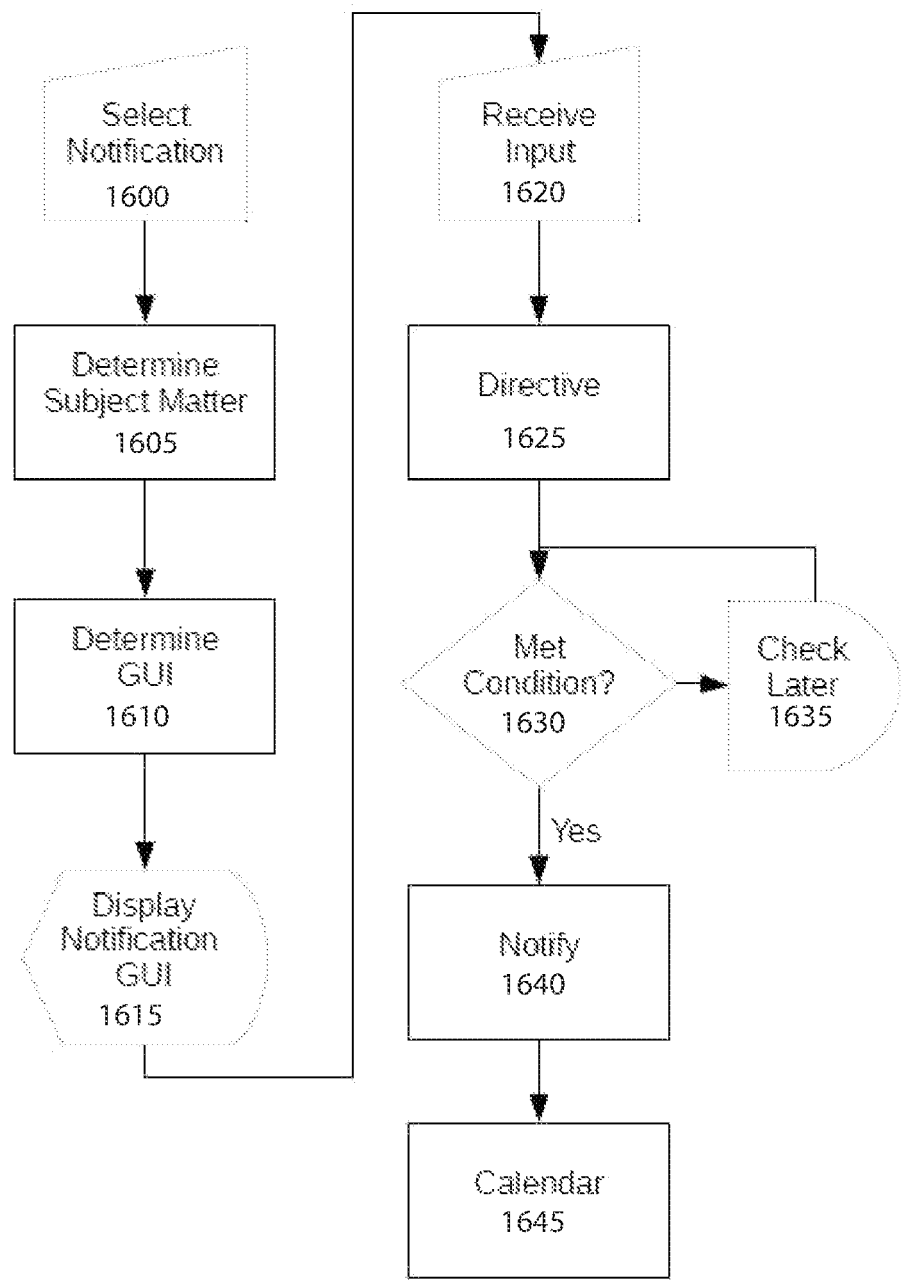
FIG. 30 is an exemplary nonlimiting flowchart for steps of a method according to principles of the invention.
Figure 31:
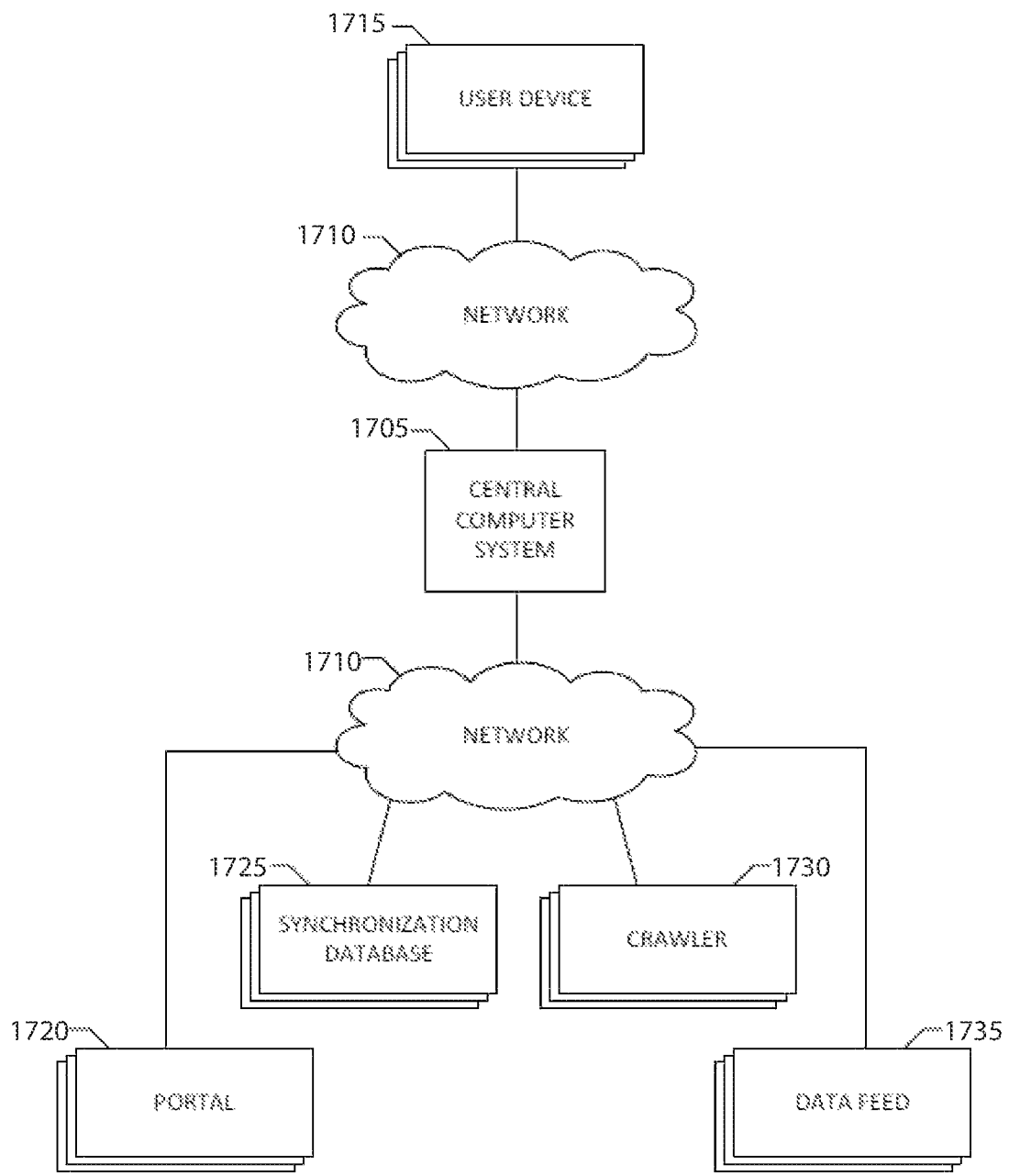
FIG. 31 is an exemplary nonlimiting flowchart for steps of a method according to principles of the invention.

When a post is scheduled 1016, it is contemplated that the scheduled post screen 1118 may be displayed. As seen, various selections may be chosen by the influencer, such as broadcast media networks (e.g., TV/Radio Network) and shows (e.g., TV/Radio Show). Also contemplated along these lines are other media types such as, but not limited to, print media (newspapers, magazines), internet (YouTube, Facebook, Podcasts), and Out of Home media types. Additionally, or alternatively, live appearances at identified city, states, and event locations may be chosen, as well as a date and time of such live/media appearances. Upon selecting this information, an additional scheduled post screen 1222 to provide additional information related to the scheduled appearance may be displayed, as seen in FIG. 29. As seen in FIG. 30, upon providing the necessary information related to the publication, the influencer may choose to display the information in a calendar associated with the system, such as, but not limited to, a fashion calendar. FIG. 31 displays one example of a fashion calendar. It is further contemplated that, upon publishing the items, a user searching for an identified media publication may access the items associated with the influencers that have uploaded items into the system and associated for the media publication. Time settings associated with the publication may enable/disable users to access the items at appropriate times (e.g., only during/after a TV show has aired). The fashion calendar may display one or more photos or selfies the influencer chooses take of themselves wearing the same outfit or clothes in the same day. The fashion calendar may also allow influencers to publish one or more photos and selfies of themselves wearing different attire or clothes worn during a single day. All photos or selfies the influencer takes of themselves and products they have chosen to wear in the virtual closet during the same timestamp may be populated and published to the fashion calendar automatically or manually. The fashion calendar operates like a regular daily and monthly calendar with days, months, years, dates, and times except the fashion calendar populates products, attires, or clothes the influencer wears every day. The fashion calendar tracks or timestamps the place the influencer was located when they took the photo or selfie even if postponed, the time the influencer took the selfie or photo even if postponed, and the day the influencer took the photo or selfie. The fashion calendar is also used for the follower to view and purchase products worn by the influencer and follow the styles of their favorite influencer.

Turning now to FIG. 24, seen is a user interface 700 comprising a trigger soft button 724, also referred to herein as a trigger button and a trigger. It is contemplated that upon an influencer selecting the trigger 724, the application may initiate a location-based feature on the computing device associated with the app. For example, a GPS sensor or other similar device may obtain a latitude and longitude location of the device. Other, or additional location information may also be obtained. For example, it is contemplated that a location name may also be obtained. For example, upon obtaining a latitude and longitude for the computing device location, a database may be accessed to determine whether the obtained latitude and longitude are associated with a location name. If so, that name may also be provided to the application and displayed as described herein.

After the influencer is associated with a location, it is contemplated that the influencer's location may be displayed in other users' applications. For example, returning to FIG. 18, seen is a menu trigger button 124', that, upon selection, may obtain a location of the user's device similar to the location of the influencer's device described able. Upon selection of an enabling trigger button 124", the application may display all influencers (also referred to herein as SlideBuy Fashion Models) within a predefined radius (e.g., 100 feet in FIG. 18) of the user's device. Other application users within the radius that are not influencers may also be displayed, depending on a user selection. It is contemplated that all displayed users and/or influencers may be in communication with a universal centralized system and may comprise user profiles having a virtual closet and/or other archived purchase system within the universal centralized system.

Figure 18:
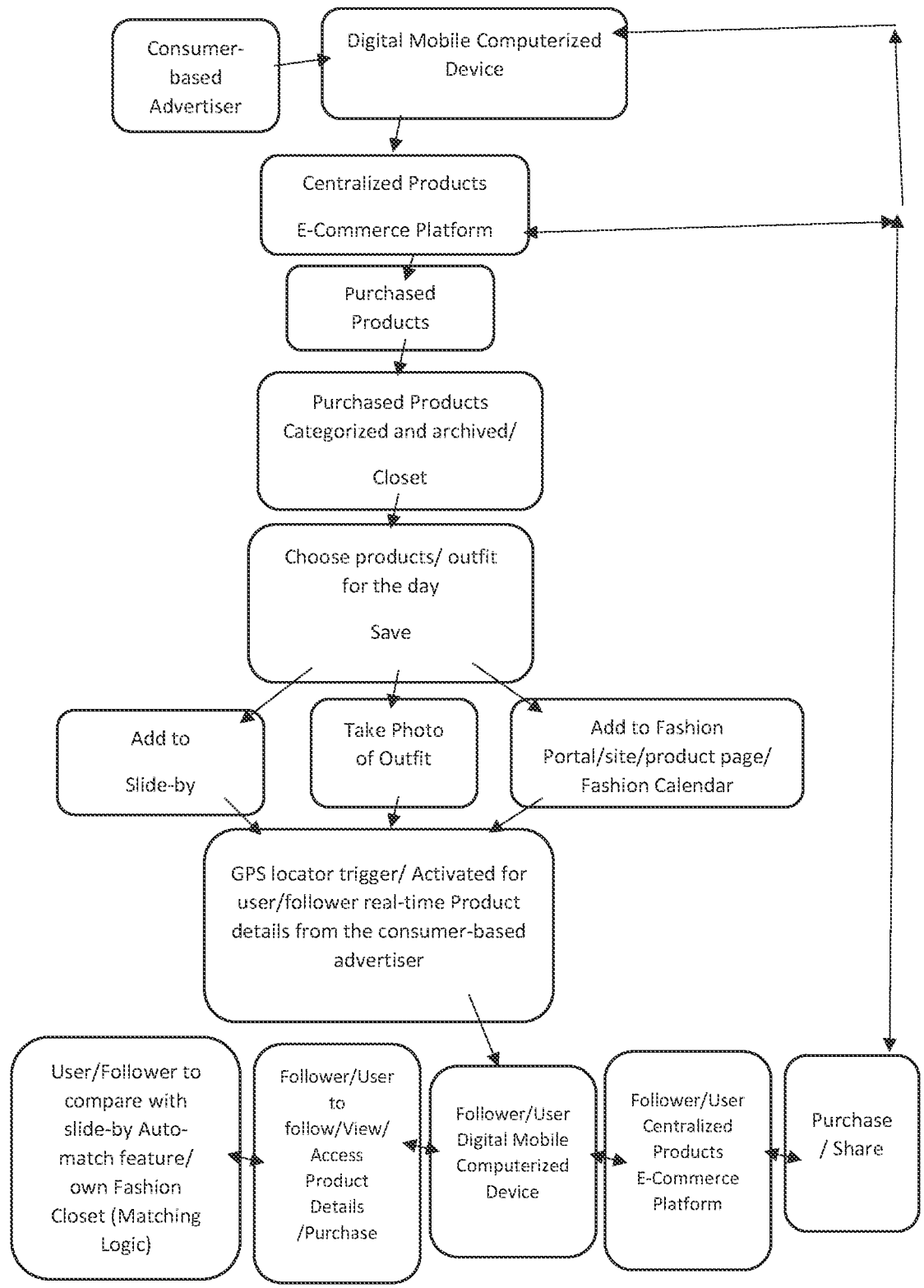
FIG. 18 is an exemplary nonlimiting flowchart for steps of a method according to principles of the invention.
Figure 19:
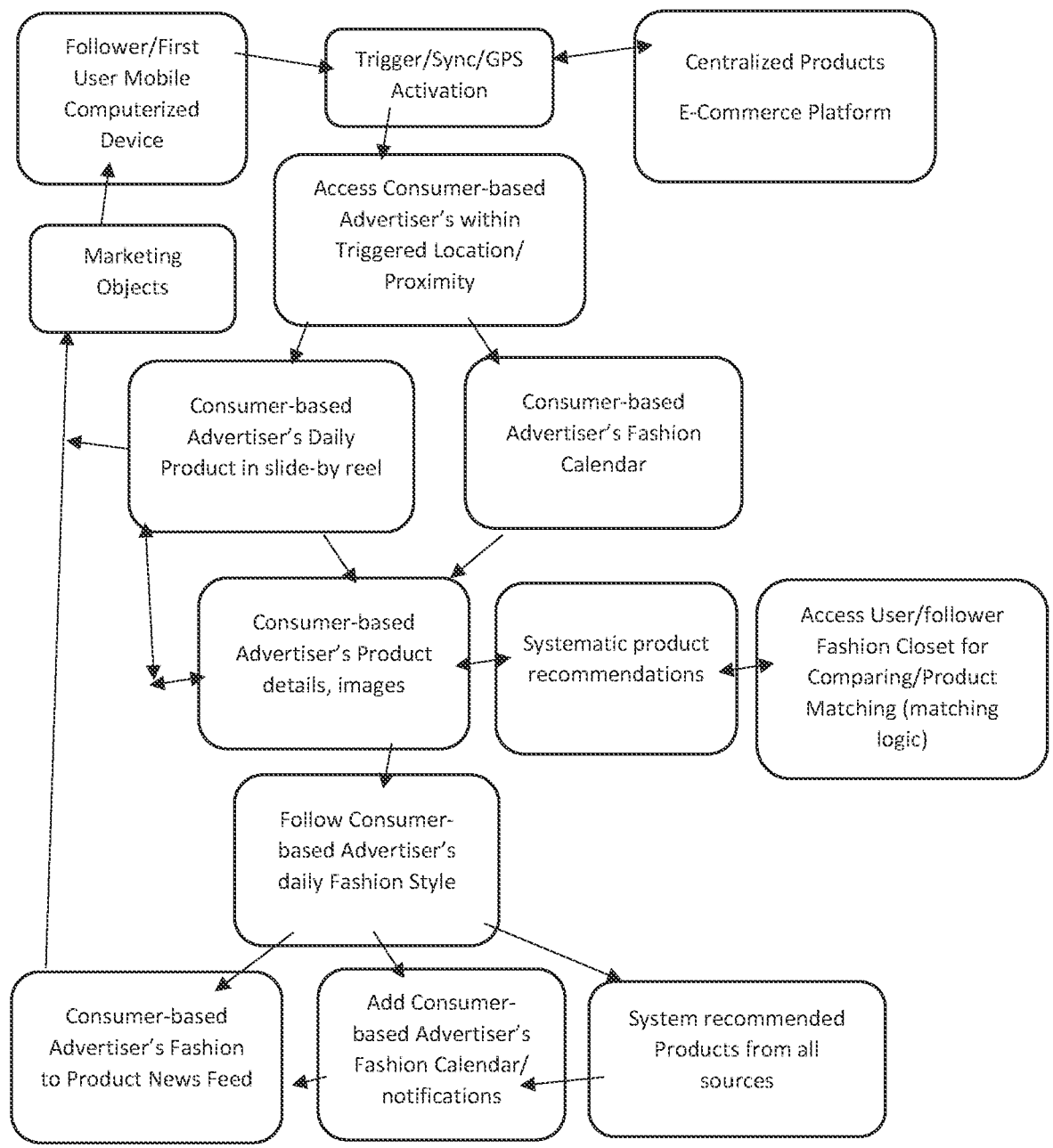
FIG. 19 is an exemplary nonlimiting flowchart for steps of a method according to principles of the invention.

Turning now to FIG. 19, seen is a user interface 200 that may be displayed after a user selects the enabling trigger button 124" from FIG. 18. As seen, profile summaries 226 of influencers located within the identified radius may be displayed. It is contemplated that the displayed profile summaries 226 may also be filtered by gender, age, and/or clothing size(s), among other qualities associated with the influencer. As seen, a date and timestamp associated with the trigger may be displayed. A photograph 228 associated with each displayed profile summary 226 may comprise an image of the influencer wearing the clothing attire identified by the influencer in the app as being worn that day by the influencer, as defined by the timestamp associated with the uploaded image and the time associated with the trigger, as described herein. Upon selecting to follow 232 one or more of the influencers, the system may enable a display of an influencer profile on the "follower" device.

Figure 20:
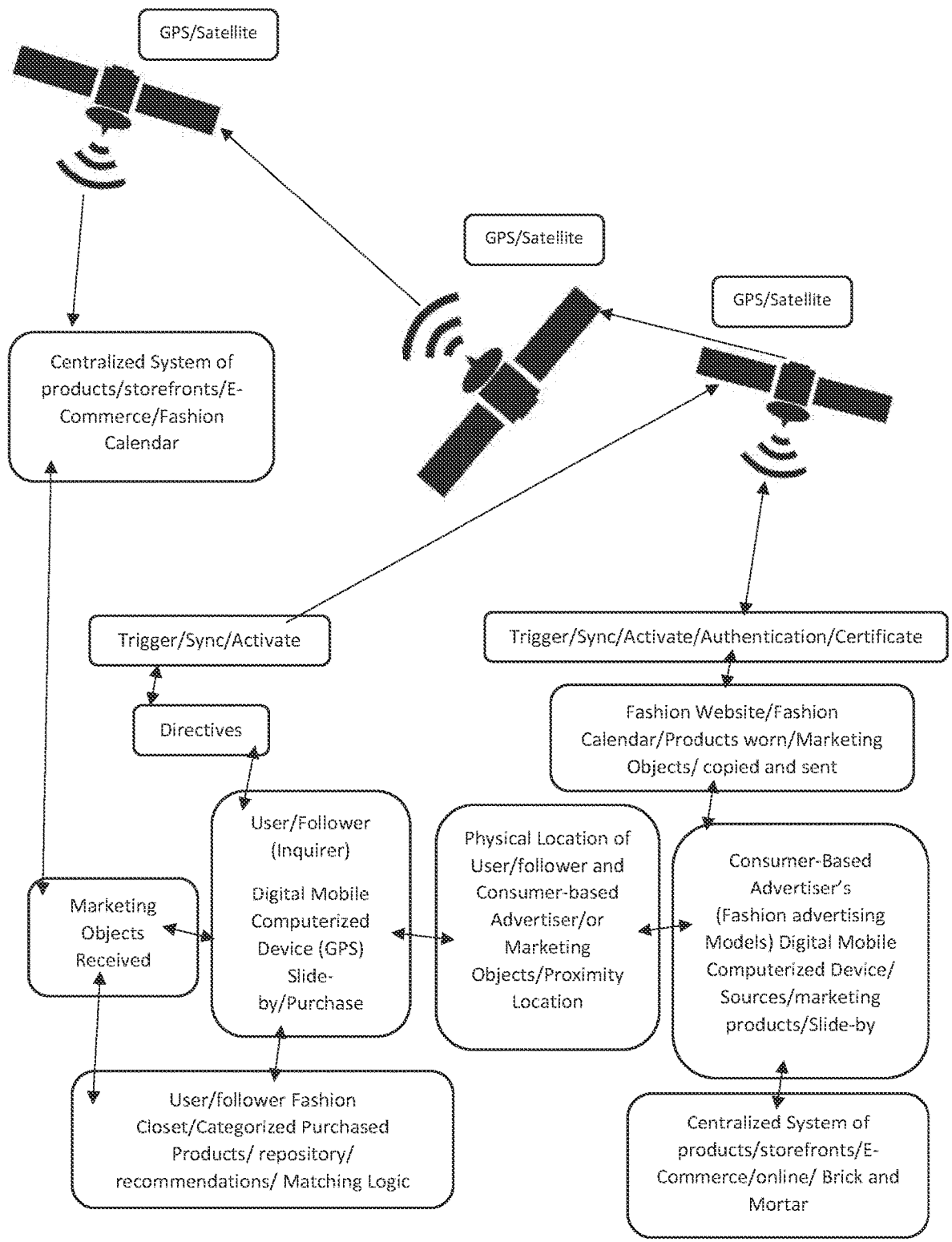
FIG. 20 is an exemplary nonlimiting flowchart for steps of a method according to principles of the invention.
Figure 21:
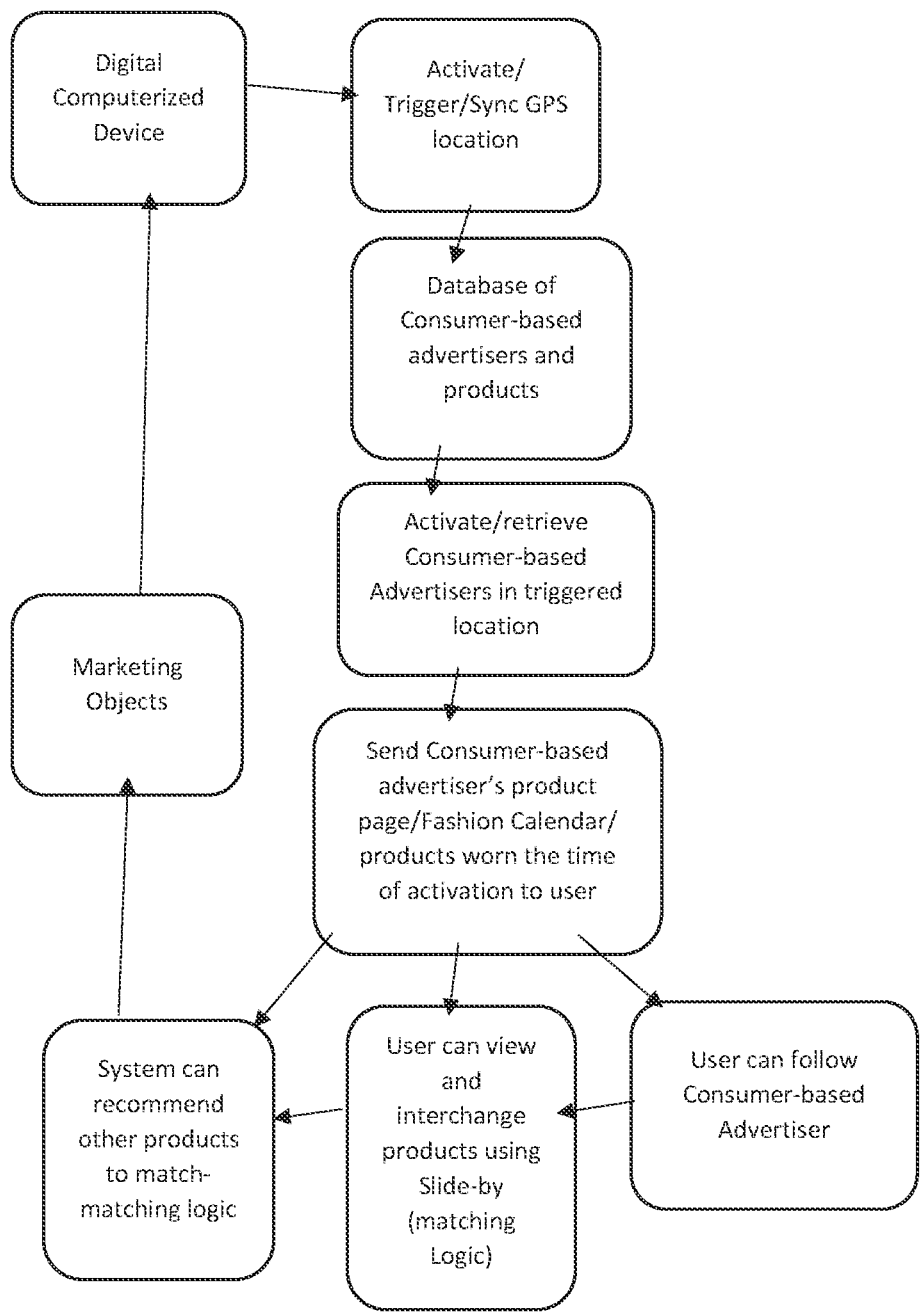
FIG. 21 is an exemplary nonlimiting flowchart for steps of a method according to principles of the invention.
Figure 22:
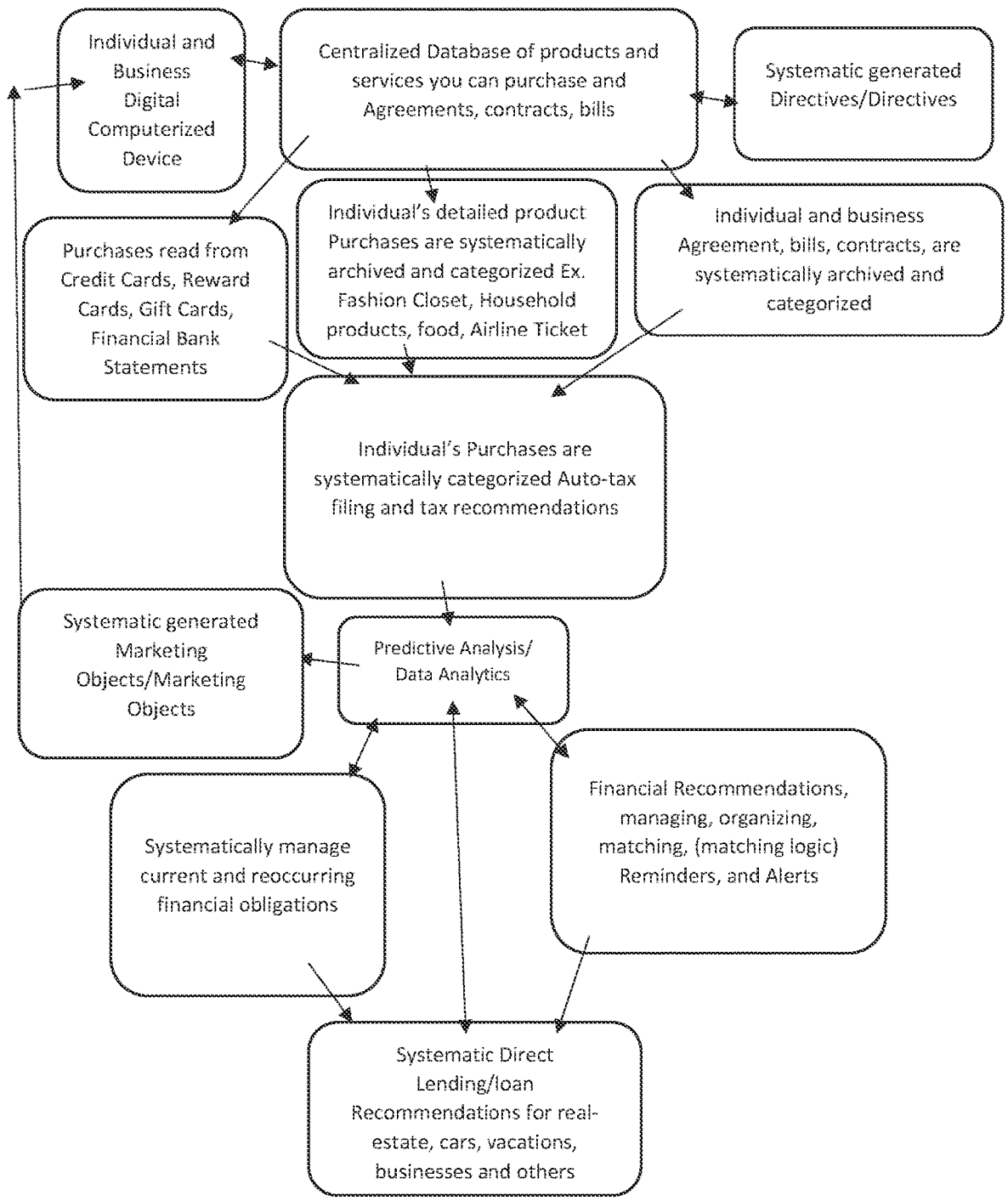
FIG. 22 is an exemplary nonlimiting flowchart for steps of a method according to principles of the invention.
Figure 23:
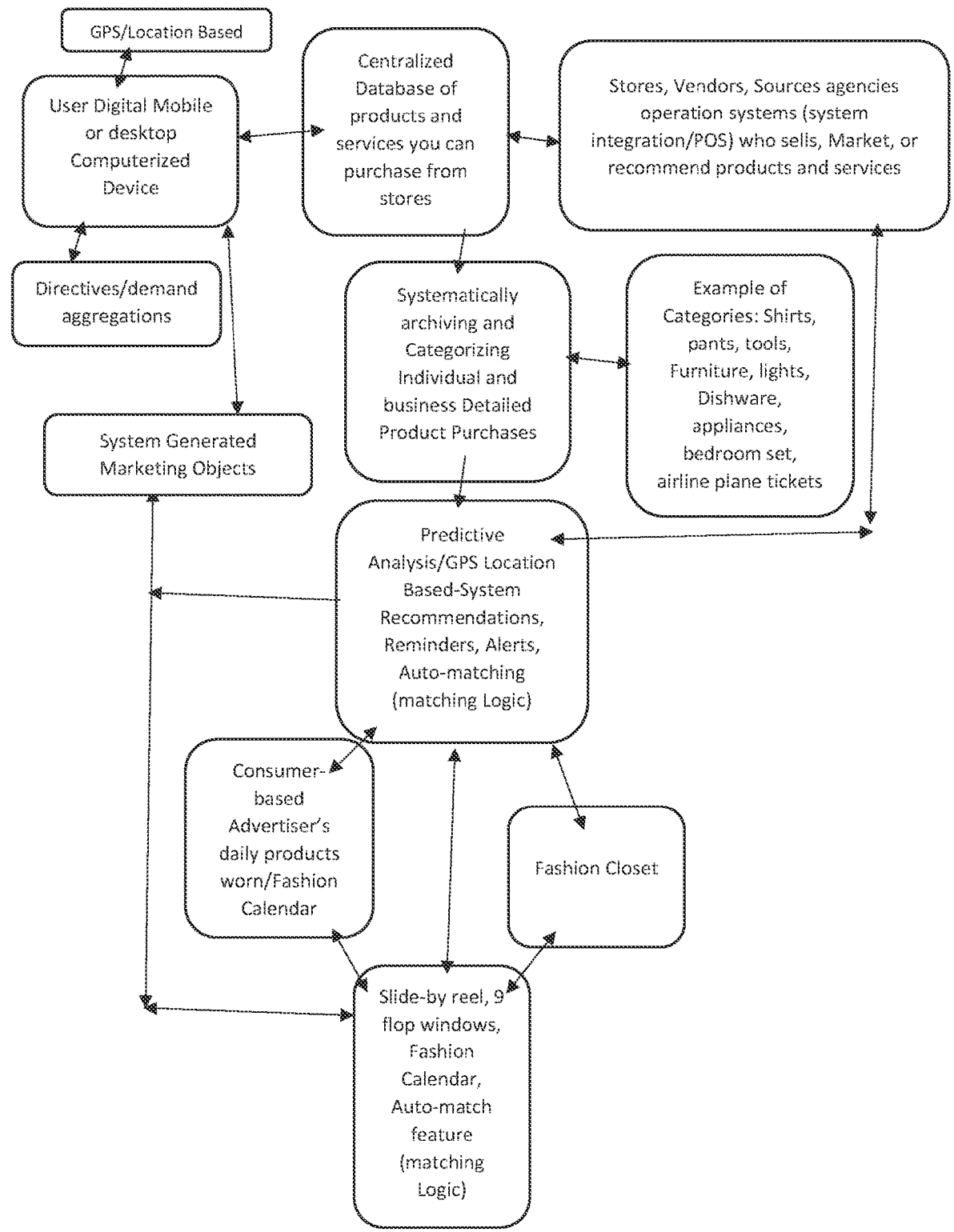
FIG. 23 is an exemplary nonlimiting flowchart for steps of a method according to principles of the invention.

For example, a display such as, but not limited to, the user profile display 310 seen in FIG. 20 may be shown on the follower (also referred to herein as a "user", where appropriate) device upon choosing to follow 232 an influencer. Seen is the photograph 328 associated with the influencer as well as the products 315 chosen by the influencer as being worn by the influencer at the time associated with the trigger request. Pricing details and/or store locations (physical and/or online) may also be displayed for each product 315. Upon clicking on a specific product 315 additional product and/or purchase information may also be displayed. For example, seen in FIG. 22 is a product display 534 that may be shown by the user upon selecting a product shown in the FIG. 20 user profile display 310. The photograph 328 may be used by the follower to ensure the follower can locate the influencer by identifying the influencer's clothes and/or other influencer physical features. If a "Match It!" button 338 is selected, as seen in FIG. 20 and elsewhere, a display such as, but not limited to, the Closet Match display 640 seen in FIG. 23 may be shown. The Closet Match display 640 may display the product 615' associated with the "Match It!" button 338 as well as additional products 636 obtained from the follower's virtual closet. The additional products 636 comprise products identified in the follower's virtual closet that the matching logic identifies as matching the product 615' associated with the Match It! Button 338.

As described herein, once the enabling trigger button 124" or other similar feature is selected, the system will display the products 315 worn by the Fashion Model at the particular time and day as the triggering event on the follower's device. The products 315 identified by the influencer may be adapted for display on a follower's device until another time or day is selected by the follower (i.e, via the fashion calendar), until the follower or influencer user selects another product or outfit for display, or until the influencer selects a "Stop wearing clothes" soft-button, for example. The Displayed products 315 may be shown as a selfie and/or a picture and/or products displayed in a random or a specified order such as, but not limited to the matching system described herein with respect to FIG. 33. As described herein fashion model may enable a soft-button to enable sharing of products 315 to other users who triggers their location and/or to other users who wants to know what they are wearing.

It is contemplated that an advertiser user can obtain matches to/from products owned by the advertiser user (e.g., located within an advertiser user's home) and/or located within an advertiser user's virtual closet. It is contemplated, and as described herein, a third-party user separate from the advertiser user may use the system to view what an advertiser user is wearing in real-time. The system may be adapted to enable the third-party user to (a) automatically or manually associate the advertiser user's products with multiple categories, (b) match products 315 worn by the consumer-based advertiser to products saved in the third-party user's archive of purchased products and/or personal fashion closet, and (c) compare or match the third-party user's personal virtual fashion closet or archive of purchased products or services with products shown on entertainment and media programs and products worn by or otherwise associated with celebrities, as described herein.

As described herein, a third-party user may activate a trigger function, also referred to herein as an enabling trigger button 124" of simply, a trigger, where appropriate, to receive area-specific information on a product associated with the consumer-based advertiser (e.g. clothes the advertiser is wearing or if the advertiser is promoting products). Upon activation, the system may initiate a Global Positioning System ("GPS") sensor or other location sensor on the computing device 120. The system may then identify all Consumer-based Advertiser and Fashion Advertising Model system profiles associated with an identified area (e.g. a radius to the third-party user or a zip code, etc.) and display one or more of the profiles in the user interface 800, also referred to herein as a UI 800. Also displayed may be products associated with the Fashion advertising Model/Advertiser. For example, clothing selected as being worn by the Fashion Advertising Model at the timestamp associated with the trigger function activation may also be displayed. Upon display of the Model/Advertiser profile in the third-party user's UI 800, the third-party may select to follow the Model/Advertiser's profile on the system or otherwise continually or sporadically receive information related to the Model/Advertiser. For example, upon selecting to follow the Model/Advertiser, the third-party user's UI 800 may display information related to future products associated with the Model/Advertiser (e.g., a message or other display will be provided to the third-party user informing the third-party user of clothing presently being worn by the Model/Advertiser or clothing to be worn at a specific event, details of the clothing/products, pricing of the same, and/or store info providing such clothing/products). A consumer-base advertiser user profile may be adapted to give automatic or manual permission to any user follow request and/or any inquiry related to advertiser products.

Figure 32:
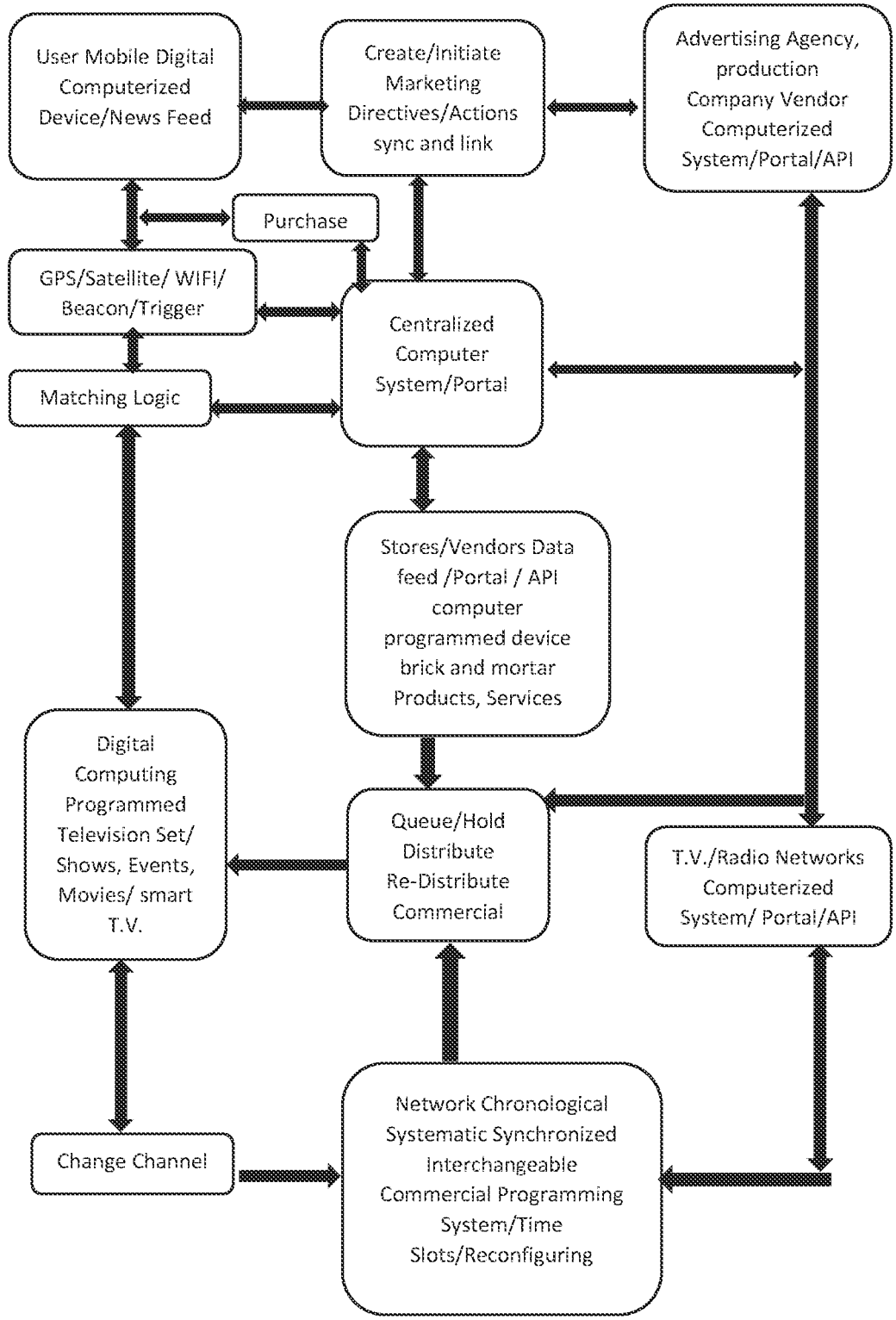
FIG. 32 is an exemplary nonlimiting flowchart for steps of a method according to principles of the invention.

Third-party users, also hereinafter referred to as users, may also be able to utilize the trigger function to receive matching recommendations from nearby stores to products associated with the user's profile in the system. For example, a user's profile may comprise a virtual closet having prior-purchased products associated with the system and/or uploaded items into the system from a user's home closet. One such prior-purchased product 1515' may be seen in FIG. 32. Matching recommendations may comprise notifications alerting the user to nearby stores containing matching products. Such recommendations may be provided with a user device location (which may be obtained from a geolocation device such as, but not limited to, a Global Positioning System ("GPS") device) is within an identified area. One such identified area may comprise a predefined radius (e.g., 0.5 mile) from a store containing matching products. Other identified areas are contemplated. Upon entering an identified area, a notification may be provided to the user. One such notification may comprise a matching product 1515" that match the prior-purchased product 1515' in the virtual closet. Matches may be determined from the matching algorithm.

Matching products 1515" may be provided to the system as disclosed herein by the system communicating with a device associated with a nearby store retailer. For example, upon a user device entering the identified area, a first communication may be sent to a nearby store retailer device ("NSRD"), informing the NSRD of the user in the identified area. Such a communication may include information related to the user such as, but not limited to, a user's desired clothing size, and/or color information for the prior-purchased product 1515'. The NSRD may receive the first communication and provide the system a second communication comprising information associated with the matching products 1515". The system may then display the matching products 1515" on the user device, alerting the user to nearby matching products at a nearby store.

An example of a user interface 1700 is provided in FIG. 33. Displayed in the user interface 1700 are products 1715 displayed from the closet of a friend 1742 of the user. In one embodiment a friend 1742 may comprise another user associated with the user—for example, an follower of the user or an influencer the user is following, or there may be a different feature enabling a connection to a friend 1742 to enable viewing the friend's virtual closet, among other features. Upon accessing the friend's 1742 closet and/or selecting a product 1715, the product 1715 may be displayed in the user interface 1700 of the user, also displaying the friend's photograph/profile picture. It is contemplated that when viewing the friend's virtual closet, selecting a matching soft-button 1744, the product will be placed in the user's tri-slide feature (as shown in FIG. 27) and will initiate auto-matching of the product from products located in (a) an online store, (b) a friend's virtual closet (also referred to herein as a fashion closet) and/or (c) the user's virtual closet.

In addition to the invention: Like a regular coupon notification when you are in proximity of a store that sells products or services, instead of sending a coupon, the system may send or display a product in the store for sale to compare or match with other products the user has archived or categorized in their virtual closet. Products can come with a discount. User can also get recommendations on products in the store if they retrieve clothes or products from their own closet. The process can be systematically or manual. Matching notifications can be based on exact location, Proximity of location, traveling location or destination based of calendar or GPS. System can read locations off google maps, navigation, and Uber-like technology, for example. Products can be mix and matched in the Slide-by feature or 9 flop. Recommended products will be pushed to the consumer based on but not limited to the algorithm reading the color, size, category, and product details of purchased products by the consumer and matching them with other products that are a great fit or similar to the product they purchased. The system also allow the consumer to request to see products that match a certain size dimension. For example, the user or consumer could record the measurements of a wall in their house and ask the system to find sectionals or couches that will fit the dimensions. This could be by color etc. . . . . In another example, the user or consumer could request to see Televisions that are similar dimensions to a certain TV, stand they purchased in their closet or a T.V. stand that they are about to purchase.

Users may also identify a product as a "favorite" or other similar designation. Upon such a designation, the user may be able to request the system to display favorite products or similar products in a user's "news feed". Such a news feed may comprise advertisers who are wearing the favorite product or similar products and may enable the user to purchase the favorite or similar products.

It is contemplated that users could take a photograph (also referred to herein as a picture) of an outfit and the user could save the picture to the system. As disclosed herein, each product in the picture can be utilized in a matching display, such as but not limited to the auto-match, slide-by or 9 flop display for matching with other products. It is contemplated that products displayed in the picture may be purchased separately by a user. The system may be adapted to view and purchase the products via the slide-by, auto-match, 9 flop displays or via a cart.

One 9 flop matching feature comprises a 9-window auto-match technology. The 9-window auto-match technology comprises similar matching logic as the slide-by matching feature. In the 9 flop matching feature, a product displayed in each of the nine windows may switch between different products before stopping and displaying a matching product. FIGS. 1-6 and FIGS. 9-11 describe and/or are related to such a feature.

FIGS. 1-4, 6, 10 and 11 also describe features related to obtaining location-based product information in real-time. For example, the system may be adapted to enable a user to find out the price of a product (which may comprise a physical item, a service, or a combination of both) by initiating a price trigger. Such a price trigger may identify one or more products at one or more locations within an identified area related to a user's device location. In one such embodiment, a seller or provider of such products may display one or more categories of products for sale at a specific location. One such display may comprise a website. If the specific location is in the identified area and the user initiates a price trigger for the identified area, then the products for purchase in that specific location will be display on the user's device. Users may be adapted to save the products to a virtual closet, the system may be adapted to (i) archive all purchases in predefined categories such as but not limited to "household" and (ii) organize purchase by location, and (iii) match products via the slide-by feature. It is contemplated that products from additional locations may also be accessed.

It is contemplated that a user can be both a user/follower and an influencer. The following comprise a list of system features provided to an influencer and/or a user accessing an influencer's profile: 1. Displaying purchases via a user page; 2. Accessing a product types/genres via an application soft-button (e.g., clothing, jewelry, shoes); 3. Adding products to a virtual closet or household repository upon purchase; 4. Taking a picture and saving it to a page, dated for the day picture was taken; 5. Displaying a fashion calendar for every day products were worn from purchases from stores which includes cost, address, directions and personal selfie or picture that was taken for each day of the month of products worn; 6. Displaying products worn by an advertiser for any specific day upon accessing that day; 7. Displaying the number of followers for an influencer; 8. Displaying the number of users that have shared a profile; 9. Displaying the number of views, "clicks", and purchases associated with a user has received for products or clothes associated with a calendar day; 10. Displaying user compensation amounts for clicks and purchases; 11. Enabling a "pay me" feature that sends payment (e.g., U.S. dollars) to a user, upon reaching a minimum (e.g., $600) in a user account; 12. Providing an influencer an option to display purchased products to the public, enabling a user to view products from their daily purchases. Purchases worn that day may comprise have a soft-button to display that the advertiser will be wearing the outfit; 13. Display showing users seeking to follow influencer; 14. A soft-button to accept follower requests; 15. A display of all likes and views on all products and/or outfits; 16. A feature enabling comments or a blog page for each outfit; 17. A feature for automatic acceptance of a public profile; 18. Features to enable profiles and/or products to be displayed in a public and/or a private manner. A follower's functions may comprise one or more of the following: 1. A trigger button, as described herein, to display all influencers in the predefined region. Such a feature may enable the display all advertiser photos and/or photos of advertised products (e.g., from a selfie photo) in a SlideBuy format, upon viewing and/or accessing an advertiser's profile. Products that are advertised for the accessed day may be displayed to followers first. Upon selecting a photo of an advertised product or outfit, display of the product for viewing and locations of stores to purchase the product may be provided, in addition to directions for brick-and-mortar locations; 2. A follower button to enable following of an influencer and be notified of public products purchased by the influencer. A follow request may be required to be accepted before a follower may view an influencer's page; 3. Enabling automatic categorizing of purchased products a follower's virtual closet; 4. Follow button from "slynk page or button"; 5. Accessing an advertiser's calendar page; 6. Viewing products worn that specific day from the advertisers without getting accepted as a follower, 7. Enabling the addition of an advertiser's purchases—for example, an individual product, or an entire outfit, or everything worn on an identified day/time period, to (a) a follower's cart for purchase or (b) a follower's "favorite outfits" page; 8. An ability to share information with contacts or friends (e.g, via Facebook, Instagram, contacts from phone); 9. Tying purchases into a referral program; 10. Providing a like button on all outfits and products; 11. Enabling outfit user comments; 12. Requiring follower acceptance before product purchase; and 13. Enabling automatic influencer following upon purchasing an influencer-associated product (e.g., receiving a prompt stating "You are now following "Lola"").

When a follower identifies a Fashion Advertising Model from a news feed (like Instagram and Facebook), the system may be adapted to (1) recognize products worn by the influencer and (2) display the identified products in a follower's slide-by matching technology. The system may be adapted to enable a follower to then access his or her own virtual closet to match virtual closet products with the Fashion Model products matches or looks side by side with products from his or her own virtual closet.

Trigger Demand: Trigger demand can be initiated or created with any directive. This happens when marketing objects are released to users when a certain level demand or any level of demand is met from the condition of the singular or aggregated marketing directive. All Marketing objects and system generated marketing directives from any user which includes the company and the consumer, can be anonymous. Anonymously companies can give price reductions to only those who created the demand on a marketing object, other than making it public. The rest of the public will get it at regular price, these people will never know that it was on sale.

In another embodiment, users could text other users in real-time. Very similar to the consumer-based advertiser method to trigger or bing other users inside of an establishment to see whose is participating in advertising fashion products, users could also trigger or bing users in a location or establishment to see who is open for texting in real-time anonymously. All users have the right to give permission to other users to contact them. Once a user triggers the location, the user will see a list of all other users who are in the location that are members of the same invention or computer-based platform. Once the list appears, the user could anonymously have a conversation with any other user in the establishment or location. This is for shy users who hate to confront people who they may really want to get to know.

Businesses satisfying conditions and bi-directional system (Reference FIG. 9). Business users, Merchants or Vendors directives can be created systematically for Marketing Object condition change awareness based on consumer marketing directives and marketing objects can be distributed manually or automatically once the directives are matched or based on the user's time-sensitive need.

In these claims, the company can create marketing directives to trigger when a specific condition is satisfied. A satisfied conditions for the business for example will be if a consumer selected a marketing directive to be notified when a specific product was 60% off. When the consumer or consumers associate this condition of 60% off with a marketing directive, then the businesses' condition is satisfied. Since both the business and the consumer are both looking for certain conditions to exist, this is called bi-directional marketing directives. This process can be done systematically or automatically. For Example, The business could have a "Shirt" that has been in inventory for 60 days and is considered "not selling". If the business decides to issue a marketing directive to systematically send a marketing object to any consumer or consumers that also issues a marketing directive to be notified if that same "shirt" is 60% off, then this will be considered bi-directional marketing directives. Mutual matching satisfied directives! This matching directive can also come with an automatic purchase from the consumer if the consumer directive is met. It can also come with directions or shipping instructions on whom to send it to. Similar products alike "color or style" or similar price to the marketing object sent to the consumer can also be delivered to the consumer. A specific size of a product can be issued to those consumers with the same size in inventory. For the Business, a counter proposal from the consumer can be issued.

A user may specify or select a time and/or date on when they need to receive any satisfied marketing object. Multiple price points can be set by the business. A specific shirt style even with different color and styles can be set a directives for marketing objects to go out to the right consumer marketing directive that matches. For example, the business could have 150 shirts total for sale to anonymous customer. 50 shirts set at 40% off and 50 set at 30% off, with 20 of the 150 being white shirts, 50 being black shirts, and 80 being blue shirts and with the same percentage of shirts divided up to small shirts, medium shirts, and large shirts. The marketing objects can be set to go out to those consumers who selected marketing directives any of the percentage discounts or price points. The merchant, business, or company can limit the amount of discounts or promos distributed.

Bi-directional directives can also systematically for entertainment options, television or any other industry or subject matter. All bi-directional directives and matching of all directives to the user, consumer, marketing object, subject matter, company, vendor, source or purchasing system can also be systematically generated, distributed, or satisfied using a graphical (Graph) database such as the AWS Neptune database.

New Search within Slide-by: Any new searches within the Slide-by will find all similar products and match according to the matching rules. May use a graphical database.

Capturing images and product details for systematic matching purposes and financial planning, advising, virtual fashion closet, archived purchased products and recommendation: Reference FIGS. 1-10,11.

System captures and saves products and services from the centralized system and repository of a family of vendors and file them into categories for the user. It is contemplated one such repository may comprises a computing device database. Example: if the user purchases a shirt, pants, bike, airline ticket, concert ticket and hammer, the system will save images, product and service details and file it away in the user's personal closet, tax filing, and financial planner and just the category for which it belongs for tax purposes, financial recommendations, financial advising, matching purposes, recognizing saving or spending habits amongst a unlimited of other things. Features will be a part of artificial and semantic intelligence and machine learning with the current invention. All features can be systematic and automatic with or without user intervention. Our vision is to create a centralized world where business marketing and consumer's needs and wants not limited to products, services, and entertainment options from all industries will be learned and managed for timely pin point systematic recommendations, reminders, and purchases based on priority and popularity with little or no user intervention. The assistance of such a system will significantly reduce marketing cost of businesses while significantly increasing B2C and C2B awareness of timely mutual interaction.

System can periodically read calendars of the user to look up Flight info to determine the city, state, and country the user has scheduled a flight. System will also determine the location of the hotel the user will be staying. System determining flight information and hotel information from user can also be read without reading the calendar. Since the user will be purchasing airline tickets and hotel stay from a centralized system of all products and services from multiple industries, the system will record information of these purchases to determine where the user is going or staying. System can also record information, dates and times of other purchases for that particular day or any particular day to determine everything that user will be doing. For example: the user may purchase a concert ticket in advance, make reservations for a restaurant, go to a night club, Wedding, etc. . . . . Depending where the user is going, what tickets they purchase on those days through the system, night club they may be going to, the system will perform predictive analysis and recommendations to send options of clothes the user might want to purchase on that trip. For example: Las Vegas, the system could send different bikini or swimwear if the trip was determined to be in the summer time. The system can also send matching outfits, shoes etc. . . . to the user to match up clothes or shoes they previously purchased from the Slidebuy system that was in their virtual closet with other clothes from one or more merchants or retail stores. The system could also just systematically select outfits for the user directly from their closet. The system could send movies the user might like for their flight to Las Vegas during the boredom gap from the flight time of the trip. All without the intervention of the user which includes the consumer and the company or source. System can also know where the user is traveling, determine weather, and then start recommending clothes to wear during the duration of the trip. Basically packing the user's suitcase based on known intelligence within the system. For example, events purchased and scheduled within the centralized system, weather etc. . . . . The system will know the route they might be traveling to get to their hotel to notify them of things that are interesting to them or they need to do along the route based of directives the user selects or voice commands. System generated recommendations and predictive analysis based off purchases, calendar info, schedules. AI and machine learning. Recommendations, reminders can be based off any topic, information, industry, product and services from the centralized system.

Also, when someone makes a purchase at the stores physical location, the system may either transfer, record, retrieve or migrate data currently purchased using the stores reward system or loyalty system (phone number or email address of customer) which is linked to our internal system within the invention to recognize customer and products purchased (via product code) to add products purchased to their virtual closet or household repository. Once the phone number or email is entered and the product code is scanned, the system will recognize the product details online within the invention or in the rewards system or loyalty program of the merchant or vendor and give the customer the option to add the product(s) to his or her own virtual closet or repository of archived previous purchases or send them to a family or friend who is recorded in the mannequin system.

System within the invention, household repository, virtual closet and other features can integrate with the websites, rewards system, loyalty program, point system, check out systems, or point of sales systems of vendors and other companies. For example: If a user purchased a product from a vendor's website or stores or within the centralized system within the invention, the product that was purchased can be sent as an image and product details to the user who bought the product or to the person's virtual closet who the user wants the purchased product to populate and categorize. User will have option "button" for the product purchased to categorize into their own virtual closet or archived household purchases or a friends or family's virtual closet or archived purchases by prompting the contact list of friends and push a button that allows that product purchase to go to the friend's or contact's virtual closet or repository of archived purchases. The button will also come with a snooze button that tells the system to delay the message, push the product(s) to their friends or family member's own virtual closet or repository of archived purchases and options to give the distribution or notification of the product purchased at least for example 5, 10, 20, 30 days before alerting the friend or family member about the product. Then the user who for example, If the user is buying a product for his girlfriend's birthday a month from now, the user will have the option to delay the response for 30 days that will ask his girlfriend if she would allow this product to be categorized in her own virtual closet. The girlfriend or recipient will have a button "accept" that allows her to accept or reject. (prompting message sent with product) user's product or service info may be categorized in the financial system or tax organizing system within the invention for correct and accurate categorization. Product detail information, images may also be access by the household repository of purchased products or virtual closet by integrating with the credit card system, point of sales device, merchants services, phone number, email addresses, gift cards, reward cards, rewards system, loyalty program and/or coupons systems of the vendors, stores, or merchants within the invention. When integrating with the Merchant's or vendor's rewards system or loyalty program using a Software Development Kit (SDK), credit card information, reward card information, phone numbers or/and email addresses may also allow the system within the invention to access the purchasing history of every member or buyer of the merchant or vendor. The integration of the rewards system or loyalty program of the merchant or vendor may allow the system within the invention to access the purchasing history of each member or buyer and add or populate those product details including the image that was purchased to the household repository or virtual closet of each user, influencer, or member within the invention by matching email addresses and phone numbers to populate the product details to the correct household repository or virtual closet of each user. The integration of the rewards system, loyalty program or point of sales system of the merchant or vendor allows the system within the invention to also populate and categorize the current purchases to the member's or user's household repository or virtual closet by primary and subcategories by accessing and product details including image and price by identifying the user and product details by credit card, rewards card, email address, and phone number that matches the phone number and email address with the system of the invention. Product codes will be used to recognize the product detail from the merchants rewards system, loyalty program and matching it in our internal system within the invention. In this invention, Repository of household purchased products, Repository of Archived previous purchases, Household Product Repository, universal repository of purchased products, household repository of purchased products, universal household repository, universal household repository of previous purchased products, household repository, archived purchases, archive purchases, archived system, purchasing history are all one is the same or can be treated as equal meaning. In this invention, user, member, customer, consumer, influencer, follower, fashion model, fashion advertising model, advertiser, consumer advertiser may be one is the same or the names may have equal meaning in this invention. Rewards system, rewards program, Loyalty program are one in the same and may have equal meaning in this invention.

System or platform can use inventory information and data feed to promote or market products and services automatically to consumers without user intervention. If the company has an overstock of any product or have a product that has not sold after a certain period of time for example 60 days, system can be set through triggers to set out product details to the right target market who issued a directive to get that product at the condition they requested. If the company set in our system or theirs to automatically discount one or more products a certain percentage after 60 days, the system could systematically distribute these products or services to the correct target market based on if the user(s) chooses a system generated directive or action to be notified when a product or service drops a certain price point, or when an directive or action of the product or service conditions changes to satisfy the user, or when the condition requested by the user change is private or public knowledge within a certain time or for the very first time, or if the condition of the product requested already exist. For example, if a user chooses to select or create a directive or action to be notified when a specific shirt price point drop at a certain price, if that product from that specific retail company that has that specific shirt in their inventory or any company that has that shirt in their inventory selects to systematically have filters or triggers set to drop the price a certain percentage based on an aggregation or singular demand to have that price dropped to a certain percentage by the user(s) or based on expiration date and trigger date to automatically have that product or service price dropped, the system or platform will systematically send the notification to the user(s) who have selected the action or created the directive to be notified. The system or platform will systematically schedule events like concerts, comedies, movies tickets, or any entertainment options in the user's calendar and can purchase these items at the same time. User's credit card information will be saved in the system for purchases. User chooses directive to have system automatically purchase product or service on demand or when it's first available for purchase.

System can also send the product that is reduced in price or in stock to the user's auto-matching Slot Machine Mode feature or product reels with the correct product size and color for product matching recommendations from the centralized repository of vendors or from the user's virtual closet or any other product categorized for the user.

Data Metrics are systematically, analyzed, and constantly read for both the consumer and the company to produce bi-directional, multi-directional real-time systematic recommendation, purchasing, marketing, awareness and managing using artificial intelligence, semantic intelligence, and machine learning. The system can then create directives and perform an actions based on a single personal data metrics or an aggregation of data metrics to be sent to any user both company and consumer. System can also deliver marketing objects based on data metrics. The system can systematically put together itinerary for the user and determine exactly where the user is spending the most money and the least money. The system could systematically evaluate the consumer's or user's spending habits and show them how to manage their money or determine how much money to save for a vacation of one or more people based of predictive analysis and also determine or recommend which products, services or vacation packages fit their budget based off how much money they make or based off how much they spend all to save money by a certain timeframe when such event or vacation is set to begin.

Proposed itinerary based on historical purchase/preferences for vacation or other travel purposes, business or personal.

Manual calendar entries can include entering the date your child starts school and the system auto recommends/reminds school clothes and supplies need to be purchased, birthdays and anniversaries.

Mannequin system, Virtual Closet and Universal virtual closet and archived repository of purchases. Mannequin system will save clothing or shoe sizes, favorite fashion styles, birthdays, anniversaries, height, weight, or any other personal information for the user and any of their friends and family and integrate with the entirety of the existing invention. In one example, the Mannequin system can allow a user to search for pair of jeans or shirt in their exact size and tell the system to find every person in the system with their exact weight, height, pants size or any other dimensions that has taken a picture wearing those exact same jeans. This will give the user an opportunity to see what those specific pair of pants in this example looks like on another user with their exact same body dimensions. Each user will have the opportunity to take a selfie or take a picture to showcase everything that they said they were wearing that particular time duration or times, morning, day or evening when they select each product they are wearing from their virtual closet. System will capture product details image including and save it to the database. In another example, the mannequin system can be used with the entirety of the invention for a user to shop for family member's or friend's exact sizes of clothes or any other product and tell the system or through an action via the digital device to send it to the family member's or friend's personal virtual closet or archived purchases once the product is purchased by the first user. Once the product is sent, the user has the opportunity to accept or reject. If the family or friend accepts, the product will be automatically categorized into their own virtual closet or archive system for all purchases. The virtual closet or archived repository for purchased products can all be universal. This system can work across all stores. Once a user makes a purchase at the point of sale device, the system can recognize the user via payment system, rewards system, loyalty program, product code, reward card, phone number, email addresses, visa, mastercard, Samsung pay, apple pay, american express etc and the products they purchased. Purchases made from a credit card can trigger the digital device or smartphone of the purchaser, find the image and product details of the product purchased in the specific brick and mortar department store for example or online store for example in our database and send it and display it to the user's digital device or smartphone in a list or queue. The system then gives the user the opportunity to save those products in its own virtual closet or send them to a family member or friend in which the purchased product was intended for so they can accept or reject it from their own virtual closet. Credit card or payment system can be linked to the bank and can send a notification to the user, which then sends trigger to the user's smartphone to display products. Our system can also be linked to the company's reward system, loyalty system or point of sales. The rewards system or loyalty program of the merchants or vendor can find a user via his or her phone number or email address and use that phone number or email address to trigger the user's smartphone to display products purchased to save into their own virtual closet or send it to the virtual closet or archive repository of purchases of the family member or friend. Reward system will trigger the first purchaser's phone number to trigger the first user's smartphone to capture, find, and display product details to the first purchaser.

All Marketing Objects from conditions satisfied from its source or company can be delivered public or private. Viewership by synchronizing or linking the topic or subject matter you want. The system will search/identify topic and schedule it in your calendar. Fashion Closet is a closet systematically set up, saved and categorized for the user based on purchases, email addresses or phone numbers and a username. All purchases are archived and categorized. Clothing, shoes, beauty, jewelry product can make up the fashion closet.

System generated Recommendations can pull clothes from a user's fashion closet or an of archived repository of household purchased products from each user and match it up with currently viewed products or products on sale from one of more vendor or retail stores at anytime and anywhere. These recommendation can come prior to a wedding, vacation, or any event that is schedule from the user or the system can just recommend products randomly based on newly stocked products, products that are discounted, previous purchases (purchase history), matching brands, etc. . . . user can also manually match up products. Product can be matched using the matching logic in the invention.

System can also just send the user system generated clothes and shoes (products) from wholesalers, vendor, or retail stores only. Companies can use this system to dress mannequin inside the establishments or department stores.

Virtual closet and in-store and out of store recommendations: Within the invention, any product that a user purchases is saved and categorized within the user's virtual closet or household repository of archived purchases. All products details and attributes including the images are saved and categorized. Using Geo location technology, latitude and longitude coordinates, as soon as a user enters the store location, the system can immediate recognize the user via the digital computing device. The system may also recognize all the products details and attributes. The system may also via the online store may recognize products in the store that matches (color, sizes, and dimensions) the products previously purchased inside the user's virtual closet or virtual repository of archived purchases or previous purchases. The system will then collect one or more outfits (Top, Shirt, Pants, Skirt, Shorts, Shoes, Heels etc. . . . ) by grabbing the image and product detail within the user's virtual closet or virtual repository of household purchased products with products within the online store of the brick and mortar location via the matching logic and send the products to the user via the slide-by matching system, tri-slide, 9 flop or any other form in a form of a notification for the user to click on. Once the user clicks or access the notification by touch, the user's personal slide-by matching system, auto-match system, or tri-slide technology will appear or be accessed with all of the matching products from the store and virtual closet or repository of archived purchases. The user can now interchange those products recommended to them based off product within their virtual closet or repository of archived purchases via the matching logic, auto-match system, tri-slide or slide-by technology. The matching logic may also use a graphical database.

For Military Veterans within the invention: FIGS. 1-10. For those in the Military can request products and services through immediate directives or forecasted directives creating actions through voice command or manual input to deliver time sensitive results for when they need them. Whether these deliverables come from habits, likes, or from personal and business calendars, each action can be picked up from different advertisers, brands or other people on the system to pay for the product or service at need.

In another Example, the users can share on a gift card or rewards card adding money for a gift limit. Example: If the system knows the veterans birthday, their child's birthday, anniversary or any personal information for example, it can systematically initiate an action, directive or command and through multi-directional predictive analysis automatically issue a credit card, gift card or reward card and aggregate demand for other people on the system or the company or brands itself to add money to the gift card for the veteran to purchase a gift for his child for example. Companies can also send gifts. The system can automatically generate things that the child may like based on habits, likes, favorites through multi-directional predictive analysis or directives and display these products for the Veterans to view on the interface and then the veteran can choose the product he or she wants for their child. The users who want to provide for the veterans can be notified systematically about the veteran's needs or family members needs or personal or business special events by for example, veterans from their city or state, specific needs, specific special events, birthday months, specific stores, or on demand.

All through Semantic and Artificial Intelligence. In another example of multi-Directional Directives and Command memorization, if a company is looking for the perfect candidate for the perfect position.

It is further contemplated that the Candidate may be looking for the perfect career, FIG. 9 (the system through a digital process, digital resume or digital job description) the company can ask the system to notify them as soon as the resume that matches their job description is available or notify them as soon as the perfect candidate quits his or her job. And as soon as they quit, the system will automatically send them an email, request for interview, send information on the company, or automatically read their personally calendar, read the company's personal calendar, and schedule an interview time that meets both calendars availability. The user will have an indicator alerting the public that his or her resume is now open for hire or an indicator that notifies the public (companies) that he or she just resigned from their current position. Once the indicator is triggered, the resume of the candidate open for automatic synchronization or asynchronous or linking to the perfect Job description from many companies and placing them in ranking of the most compatible. The system can work vice versa, allowing candidates to find the perfect company. The directive is set, whether manually or by voice command, and system will wait on the condition to change or exist and perform an action(s) or multiple actions in accordance to the directive. If the directive or condition is available right away, then the system will deliver the results. This system also works the same if the candidate is trying to find the perfect Job Description or Career. As soon as the position is available, the candidate will be notified. The system is centralized.

SlideBuy Virtual Financial Assistant. FIG. 5. Virtual Financial Assistant Summary. App and software program that uses predictive analysis technology by collecting financial information to help users plan and manage both short-term and long-term *financial goals and events; systematically file their income taxes, manage current financial obligation, bills, and make financial decisions/recommendations based on multiple financial inputs as well as future financial goals.

*Financial Events=Retirement, Wedding, College, Vacation, Buying a Home etc. Automatic Tax Filing and Tax Recommendation. Individual income taxes considering investment portfolio, buys, sells, trades, purchases relevant to tax credits, deductions and other itemizations. (i.e. medical, payments to student loans, books, property taxes etc.) and automatically tracks and send them to an electronic tax file throughout the year. Correctly categorize and file each purchase in real-time for each person in a online tax form or system and reconfigure each time for real-time tax gains, tax losses, tax liability, tax risk and much more. At the end of the year the system will automatically piece all relevant tax information from file into a draft filing pending user approval/sign off, will electronically file both federal and state taxes for the user. Validation will include a tax summary of potential filing scenarios highlighting the best financial recommendation from the assistant and why, but the user will have the option to override and pick to filing of their choice.

Programmed with tax laws and setup to automatically seek updates to laws periodically. Produces the best possible financial filing for the users' individual unique filing situation which can include small business and managing investment portfolios.

Example: Managing Current and Reoccurring Financial Obligations. Bill pay services that automatically read invoices/bill statements, agreements, contracts, to pay financial obligations automatically, reads pay statements to budget expenses. System will categorize which bills are to be paid first based on dates, priority due date, and priority. Time sensitive process. Manages the payment process for the user and recommends selection based on priority. Connects to users other accounts for optimal financial recommendations such as credit cards, bank cards, investment accounts etc.

Designated email specifically for financial assistant that requires validation from the user (mitigating risk of spam and potential external fraud via hacking) in order pull through the email box that they technology will read, includes; mortgage bill, electric bill, credit card bills, and all other financial obligations that the user wants to include. Learns due dates and automatically reads statements and bills. Categorizes all spending real-time so the user can get a snapshot at the click of a button to see financial pie chart of their concentration of spending at any given time. The system will highlight categories that have been overspent based on planned financial goals that have been previously identified.

Example: Financial Recommendations, Reminders and Alerts. Evaluates credit card interest rates, outstanding balances, tax code/laws against purchases, payment priority (based on due date as well as type such as water etc) and tax bracket to make the best financial recommendation possible.

Collects information about users spending habits to make recommendations and send notifications (regarding electronic tax file. Tax recommendations and/or notifications will trigger throughout the year as the user makes financial purchases that impact their taxes, tax bracket and/or filing status etc. such as; $ remaining to give to charity to maximize annual deduction.

Learns reoccurring financial obligations and alerts users to bills/charges that exceed expected thresholds or purchases and fall outside the user's typical spending habits, essentially and automatically reconciling purchases with bills and detecting errors in statements or potential fraudulent purchases and calculations. (Inaccurate month interest etc. Makes financial recommendations that align with long term and short term goals based on spending habits, for example, a planned vacation requires X saved per month for a future date, if spending habits begin to conflict with financial goals the assistant will alert and identify the behavior.

Example: IRA, Share bulk data, they can expand. Multi-directional between the Vendors, the users, and the financial institutions where they can all systematically share the necessary information necessary for their direct target market. Example is how system can match up clothes from stores to clothes from the closet of the user. Example: how price at store systematically drops for user that selects a condition change to be notified only when the product is 60% off.

Platform that centralizes the entire financial landscape. System through artificial intelligence, semantic intelligence, and machine learning will learn the underline detail agreements and contracts between the consumer and business or business and business for systematic managing, recommendations, reminding, organizing, coordinating, bill paying, payment options, investments, stock options, direct lending, data analytics and predictive analysis. For example, the system for each individual person can organize and manage what bills are a priority to get paid based on household or individual salary or income. System can recommend and provide input on pros and cons of particular bills that the individual or company chooses not to pay. The system could show the individual or business the total amount of interest of a particular bill that is not getting paid. The system can recommend between two different bills the individual or company is having a hard time deciding on which one should be paid first, which one can be put off for a month, or how long it will take to pay a bill etc. . . . . System will capture, archived, categorize, and save all bills, agreements, contracts, for individuals and companies (businesses) for but not limited to managing, matching, coordinating, bill payments, and bi-directional predictive analysis. Individual and company can select which bills, agreements, contracts can be added to their repository for artificial intelligence and machine learning. Reading and learning of these documents can be done through but not limited to email, scanning, Copy, paste, pdf, and word document. All sources can be interconnected. System can also systematically tell a user if they need more charity donations or any kind of donation for a better income tax return. The system will always choose or recommend the best income tax return solution or the best possible outcome for the user. This systematic process will begin at the beginning of each year (January) and end the last day of January. The system will always keep the user in compliance for the best possible outcome. Each outcome can be reconfigured.

Different types of ways in our system directives are used: First type of directive: Our system creates a demand for companies to reduce price to our demand, send Jay Z to Denver for a concert, let me know when the movie hunger games is on TV. The results of this demand can come from a single demand or an aggregation of demands all stemming from consumer directives. Companies can now send Marketing Objects.

Second type of directive: our system can tell the system to let them know when the price of a product is reduced to the product they like, let them know when Jay Z is in concert in Denver, or let them know when Hunger Games is on TV. This is done by creating an algorithm to follow price changes from all products and calculating the reduced price from the original price and send out the marketing object to those who demanded to be notified at the percentage they requested or the new price point they requested, system crawl internal database for Mention of JayZ concert in Denver from Entertainment companies in our database, or system crawling for mention of the "Hunger Games" on TV from a particular network in our database or TV listings online. System can follow an Ecosystem of any type of product or service including a venue, restaurant, dealership, Entertainment options, hotels airlines, retailers, and the specifics of the categories or subject matter through demands of their choice even through voice command. Anonymously companies in the invention can give price reductions to only those who created the demand on a marketing object, other than making it public. The rest of the public will get it at regular price, and these people will never know that it was on sale. In the bi-directional addition, the system can also initiate systematic Marketing Object distributions to the user.

Third type of directive: Remember system can also create a directive and tell the system when that directive exists, then here is another directive to do something else. For example: notify me when Jay Z is in concert, and when you first here about it, buy me tickets "based on a predetermined location", and send the tickets and receipt to my email and update my calendar for that date with reminders leading up to that date.

Fourth type of directive: Directives can also be created from the system to make suggestions for products to buy, what shows to see, what concerts to see, what places to eat at, all based off predictive analysis, popularity of products, Birthdays, anniversaries dates of events, weather, travel, location etc. . . . . .

The computer system may receive, via the computer network, a second directive, which includes second directive data with a second subject matter responsive to the first interest and a second time associated with the second subject matter. The computer system determines if the second directive includes second subject matter responsive to the first interest. The computer system enters the second directive data in at least one database on the computer system. The computer system then communicates the second directive data to the plurality of users via the computer network. The second directive data may include an assent, a conditional assent, or a counter-proposal.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device The computer-usable or computer-readable medium can be, but is not limited to, an electronic, magnetic, optical, electromagnetic, infrared, or semiconductor system, apparatus, device, or propagation medium.

A web crawler 720 systematically browses the World Wide Web for the purpose of populating the database 170 with system-generated marketing directives and/or marketing objects. Starting with a list of seed URLs, the Web crawler visits the URLs, identifies all the hyperlinks in the page and adds them to the list of URLs to visit. Such URLs are recursively visited according to a set of policies. The crawler copies and saves website information as it goes. Copied information may include photos, product descriptions, pricing information, and URLs for each product on-sale on a website visited by the crawler. This information may be used to create a system-generated marketing directive. The system may employ a metric of importance for prioritizing Web pages, by evaluating intrinsic quality and popularity in terms of links or visits. The importance of a page for the crawler can also be expressed as a function of the similarity of a page to a given query. Crawler process may also be created from semantic intelligence which translates and coverts human language to machine language.

Data may be supplied to the database through other sources. As an example, a data feed may be provided for the database to receive updated data from supplier (e.g., vendor and/or designer) data sources (e.g., databases). By way of example and not limitation, a CSV data feed may be used to load a CSV file to load product information from a supplier's database. The file may contain all data for all products from the supplier's database. Alternatively, the file may contain data for products that have changed since the last CSV file provided.

Data may also be supplied to the database through synchronization or asynchronous. One-way file synchronization, i.e., mirroring, may also be employed to update data copied into the database from a supplier's data sources. Consistency among data from a supplier's source to the target data storage may be established by timestamp synchronization. In this implementation, all changes to the source data are marked with timestamps. The time of all synchronizations are stored, at the source, at the target or at both locations. Synchronization proceeds by transferring all data with a timestamp later than the previous synchronization.

A supplier or business may also provide a portal (e.g., an enterprise information portal) (EIP), as a framework for making product information available, managing marketing directives, managing consumer directives and satisfying directives. An administrator of a system according to principles of the invention may access the supplier's data through the supplier's EIP. Additionally, a system according to principles of the invention may automatically access the supplier's data through the supplier's EIP such as by using a crawler to systematically browse the portal to update indexes and data in the database. All bi-directional directives and matching of all directives to the user, consumer, marketing object, subject matter, company, vendor, source or purchasing system can also be systematically generated, distributed, or satisfied using a graphical (Graph) database such as a AWS Neptune database.

All directives may be associated with a condition, financial deposit and expiration date when the consumer needs the directive to be satisfied. For example, a consumer can initiate a singular directive or a menu (plurality) of directives that are associated with the subject matter of interest from a search or a pictogram which can be system generated from the database or/and directly from the vendor or source that is carrying the product or service associated with the pictogram. The consumer can select one or multiple directives and select a condition and/or a financial deposit, and/or an expiration date when the directive needs to be satisfied. If the consumer searches for Justin Bieber, the search will deliver results of a pictogram of Justin Bieber. The pictogram of Justin Bieber may be associated with a menu of directives system generated from the pictogram that is associated with the subject matter of interest or from a marketing object where the menu of directives were manually or systematically inputted via portal from the source or company of the marketing object associated to the consumer directive. One of the directives may say "notify me when this Justin Bieber is on television", one may say "notify me when this Justin Bieber is appearing in concert here", one may say "create a demand for a Justin Bieber concert nearby and send it to an aggregation of his followers, and one may say "show me a demand by another follower who created a demand for Justin Bieber to appear in concert nearby. One directive can trigger another directive or action. For example, The directive that said "create a demand for a Justin Bieber concert nearby and send it to an aggregation of his followers" can trigger a directive or action or option that says "send this directive with a good faith deposit or deposit to increase the chances of the concert taking place". It can also trigger a directive that says "I would only want to attend this Justin Bieber concert if we can attend the concert within the next 5 months". A deposit associated with a directive for example could be a certain amount individually required by the system, the celebrity, promoter or the consumer via portal, to create a demand to be sent out to an aggregation of the celebrity's followers. The system, celebrity, promoter, or consumer can also have an accumulation of money collected as the deposit or trigger for the concert to take place or for the concert to be considered. All deposits may be held in an escrow account or bank account until the celebrity agrees to accept the deposit and/or agree to a concert date before that expiration date set by the consumer. If concert date expires or the celebrity Justin Bieber in this example declines the deposit money, then all money is returned back to the each consumer that participated in the aggregation. This reverses the process on how promoters get people to attend concerts. This process creates the demand first. Normally the concert is created and then the promoter goes out the get consumers to attend the concert through marketing. In this process, the demand is created first by an aggregation of followers, users or consumers in this case with a deposit from each user who wants to see a specific celebrity in concert, 200 k is collected as a deposit from the aggregation of followers or consumers, then the artist is notified. This can be done for every city and every state which in essence in creating the tour for each and every music artist in this example. This example and process can be applied to every subject matter or every pictogram associated with directives no matter the industry. The system can collect the aggregation of users who selected the same product, the same condition to be satisfied like a shirt and a condition of 50% off to be satisfied. If the user also selects he or she want to put down a deposit of $40 dollars to guarantee the product, then the system will search for all users or the aggregation of users who selected that they want that specific shirt and the they want it at 50% off with the minimum guarantee deposit of $40 dollars. Once the system, using Artificial Intelligence or a web crawler within the system gathers all users, the system via a web portal will notify the company or companies carrying the product for example and say we have 3000 users across the country that would like to buy this shirt if you can drop the price by 50% or a certain price point and we also have for example $30,000 dollars collected as a deposit waiting for you in an escrow. Do you want to make the deal? If the company accepts the offer, then the company will automatically send the promo code to discount the product to those users, but if they company decides not to accept the offer, then the money held in escrow will be returned back to the users. Via the company's portal within the system, all companies can select how many shirts they want allocated to receive for example the 15% off promo code, 30% off promo code, 50% off promo code and the response or distributions off the promo codes can be instant as the consumer directive is initiated from the user on which discount the user would like. The system will automatically know the number of discounts allocated for each product and the number of aggregated users wanting each selected discount. This process can be used for each subject matter selected and each consumer directive selected with a condition to be satisfied.

The system all works the same in different variations to all participants to receive system generated necessary information. All sources may be connected in a multi-directional process. For instance, one company's or consumer's directive, command, request, event, product, and/or condition change can trigger another company or consumer to initiate directives, commands or requests to another company or consumer. The creation of new directives and/or commands based on previously created directives and commands can be done simultaneously or instant.

Elastic Search technology can be used in the invention. In this invention, sources, suppliers, business, company, user, vendor, merchant and agency may have the same meaning.

Personalized Commercials via television and mobile device (FIGS. 9 and 15). Within the current invention, to provide personalized commercials to consumers, you will first need a centralized computer system of products and services connected to data feeds and portals from many companies, vendors, merchants or sources. The process can also be integrated using the products and services associated with websites or systems of any company, vendor, or agency.

Each product or service in the database will come with actions, questions, directives where any user can synchronized and link a product or service to themselves and a filters not limited to the time and date in which you would like to purchase the product or service. Within the time and date you are looking to purchase the product, the companies or vendors of those products and services can send you personalized commercials through your household television, mobile devices, or any television set that is located near the current location you are currently residing or where your personal mobile digital device is located.

For television sets, this is how it works: If you have an household of five family members and each member synchronized and linked a product or a service to themselves for example the first member wants to know when BestBuy is having a 50% off sale on a 50" Samsung T.V. set or needs any 50" Samsung T.V. at a price point of $400 dollars from the original $800 dollar price tag within 30 days, and second member wants to be notified about Pop Concerts in the area, and the third member tells the system that she is having a "baby boy" that is due in 6 months and send a directive to notify her and send a matching marketing object when baby products are 60% off. Once these items, directives, and actions are selected, then they are linked to each family member or consumer. Each company, like advertising agencies, production companies, and radio, T.V. networks, through their portal or system linked to the system within the invention will also know instantly that this consumer only known by their unique ID number is looking to purchase or what they might be interested in. Advertising agencies and production companies in the meantime will be producing marketing videos for these advertising company's or companies worldwide to be sent to networks and companies such as Comcast. However, the process can also be done just using the individual networks without using companies such as Comcast. Advertising agencies, production companies, retail companies, or any company can buy commercials time slots locally or nationally on any network during shows, movies, sporting events, or news viewings.

These companies, the network like NBC, or our centralized computer system can now send personalized commercial to the household television sets or smart television sets. Each consumer's information is collected and sent to the company when the consumer sends a directive or sync and link a product or service therefore notifying the centralized computing system and the company their age and gender so each network, company, or our centralized computer system knows exactly what channel to deliver the personalized commercial. Commercials queued up distribution, will be sent to the channel the user or users are currently viewing and only during the 2 to 5 minute commercial time and if the user changes the channel, the system will hold the commercial in queue and distribute it to the next channel the user is watching. However, the system may show the commercial on the channel that the user just changed, if the changeover of channels occurs within a certain time period. It may be too late to stop the commercial, but the system may notice that the system never distributed the commercial when the user was viewing the previous channel, and save the commercial for the next commercial break on the next channel. This process can be repeated. Two or more commercials or videos, can be timely chronologically synchronized to fit the commercial time slot. This works perfectly with Comcast because their shows can be paused within a certain amount of time, therefore it doesn't matter if shows for multiple viewers finishes at different times. The number of commercials in queue for the each user who selected a marketing directive will come with a ticker that counts distributions as they go out, or place them on hold. Each ticker count may be linked to an accounting system for payments. For example, if you have a teenager in the household and they are watching a television show for teens on NBC, then send the commercial about any pop artist that may be coming to see a concert in the area they are currently residing and the exactly digital device whether mobile or a television set GPS location the consumer is located. If the user, travels to New York, then the company, centralized computer system or network can send the commercial to the users television set whether they are staying in a hotel room or watching television at a restaurant bar. The sync and link of products and services follows the consumer wherever they go using the location based GPS location of the consumer's digital mobile device. Consumer and consumer marketing directives can also be located to trigger nearby digital device (ex. television set) by a beacon when entering these physical locations. Depending what channel the consumer has the television set on and the age and gender, decides what commercial is being shown. If one television set is on in the household, then all personalized commercials can be shown. What is shown on television or what personalized commercials can be shown, can also be based on which consumer's digital mobile device is closer to the television set at home by proximity or GPS. This means a GPS trigger connected or integrated to the television set or digital mobile device will always ping each other or be set up to trigger when two or more devices are closer to each other.

When this trigger occurs, then it also triggers the synced and linked products of the consumer or family members and their devices, which then triggers the portal or system centralized computer within the invention, the company, and/or the network to deliver systematic personalize commercials to the consumers or household members. This process of triggers always happens when GPS location of consumer's digital device is in proximity of the location (company) of the product, service, or location of another digital device. Personalized commercials can always just go to their mobile digital devices. Personalized commercials can also be shown before music videos, movie trailers, movies, shows etc. . . . whether on television or any digital mobile device.

These television sets will be computer chipped, encrypted, and have triggers and GPS synchronization like smart phones and for companies to know what channels and shows and what time the users are watching. (Smart televisions) Personalized Commercials can always go to the consumer's digital devices after directives are associated with conditions. Commercials or videos can always be sent to the user's devices with the satisfied marketing directives or marketing objects are sent to the consumer. Televisions can also be linked to consumer personal phone number to complete the process within the invention.

This entire process is multi-directional and chronologically systematically synchronized to all devices, systems, directives, products and services of consumers and companies using predictive analysis for pin point timely product and commercial placement and commercial programming. Network programming system may be interchangeable. This means commercials and commercial time slots can change on the fly systematically or manually.

Networks will have a systematic system linked to the centralized computer system of the invention which are linked to company's videos or products and services also linked to the centralized computer system for systematic releases and distribution of commercials to the consumers or television sets nearby their digital devices or on their mobile digital devices based on triggers, sync and linked directives and actions on products, and GPS location. Commercials can be sent to the user's personalized news feed.

In another embodiment: Since the television may be a smart T.V., each television may also be synchronized and linked to the consumers or user's smartphone for displaying or streaming commercials to the consumer via a television and radio at a time of the commercial time slots for each program. For example, if the consumer or user receives advertisement commercials to their smart phones or computer devices, those advertisement commercials may also be shown on the consumer's television set or a nearby television during the commercial break. Televisions may use a beacon technology, Bluetooth technology, GPS, WiFi, or any kind of technology to recognize if the consumer is near the television set. Recognizing is always constant when television is on. One television set, radio, or the computer within the television set, can be mapped to many different consumer's digital programmed computing devices, in essence turning any and each consumer's digital programmed computer device to that of its own. Signing them off once they are not nearby. Directives are stored in the database and accessed from a database. However, all and different commercial advertisement can be retrieved and stored in a queue for streaming. The television, radio or computer within the television may mix in its own marketing agency's commercials matching directives and subject matter of the first user for streaming with commercials coming directly from the marketing agencies, or commercials coming directly from the retail companies or brands themselves. Each company and network may push a commercial alone without using the networks like Comcast, CNN, FOX or marketing agencies etc. . . . , each company can stand alone. Television or radio computer programmed devices collecting users using nearby WIFI. Once the Smart T.V. recognizes who is in proximity of the television, it will search for those consumer's marketing directives to determine what commercials and how many commercial to stream or play as a video.

For mobile smart phones, mobile digital devices: the entire process of distributing personalized commercials to consumers or user or companies can also be done using scrolling chronological synchronized news feeds. These news feeds very similar to Facebook, Instagram, Snapchat can all receive personalized commercials directly from any company, advertising agencies, or production companies or individuals by creating or initiating marketing directives or selecting actions with or with time-sensitive conditions, conditionally or unconditionally. Any created, initiated or selected marketing directive can be associated or trigger a commercial to be distributed to the consumer or user who created, initiated, or selected the marketing directive. Marketing directives can come with time sensitive dates when a marketing object needs to be received. Commercials associated with the product, service, or marketing directive can be sent to the consumers or user's news feed or calendar within the mobile digital device (ex. Smart phone). Commercials or videos, advertising associated with the product, services, topic, or information created, initiated, or selected as a marketing directive by any user, can be distributed to that user in real-time or soon as practical. Directives are linked to products and services of any company, agency, or vendor's website or system. Payment from the any company may be paid out with each matching commercial distribution to the user's directive.

Each consumer's information (unique Id, age etc. . . . ) is collected for data purposes and sent to the company when the consumer creates, initiates, selects a marketing directive or sync and link a product or service therefore notifying the system and the company their age and gender so each advertising agency, production company, or our centralized computer system knows exactly what user to deliver the personalized commercial to. Commercials queued up distribution, will be sent to the calendar, digital device, and news feed of the user or users who have recently sent out a marketing directive. Systematic distributions! Each marketing directive may trigger a different commercial for distribution. All users who select the same interest or marketing directive, may get delivered the same video commercial or ad.

If a user initiates, selects, creates or triggers a marketing directive or synchronized and linked a product or a service to themselves wanting to know if BestBuy is having a 50% off sale on a 50" Samsung T.V. set or needs any 50" Samsung T.V. at a price point of $400 dollars from the original $800 dollar price tag within 30 days, and wants to be notified about Pop Concerts in the area, and tells the system that she is having a "baby boy" that is due in 6 months and send a directive to notify her and send a matching marketing object when baby products are 60% off. Once these items, directives, and actions are selected, then they are linked to the user and any advertising agency, marketing company, or any company advertising videos or materials associated with these products or services will be systematically distributed to the user. Commercials or material are distributed when the marketing directive of the user matches the marketing object of the company/business. The user gets advertising commercials associated to exactly what they want or is looking to buy.

The centralized computing system will have a multi-directional systematic distribution system. This entire process is multi-directional and chronologically systematically synchronized to all devices, systems, directives, products and services of consumers and companies using predictive analysis for proper product and commercial location and time placement and commercial programming.

One exemplary implementation of the invention comprises a consumer-driven centralized marketing system ("CMS"). One such CMS comprises a centralized processing engine comprising one or more digital computing processors, a directive repository comprising one or more computing storage devices and a marketing object repository comprising one or more computing storage devices the same as, or different from, the directive repository storage devices.

It is contemplated that the term "directive", as used herein, may comprise computer instructions such as, but not limited to, computer software, stored on, and received from/to computing storage devices. Such instructions may also comprise instructions sent/received to/from a user. Participating users may submit directives to the processing engine. Directives may comprise one or more instructions pertaining to a delivery of one or more electronically-deliverable marketing object. Directives may further comprise a consumer directive or a marketing directive. A consumer directive may comprise one of a plurality of directive types including a location directive, a personal information directive, a general directive and a specific directive. One personal information directive may provide user information such as, but not limited to, gender, race, age, income level, profession, and personal interests. Such information may be used by the systems as described herein to facilitate the creation and delivery of related marketing objects. A general directive comprises a directive which remains active in the systems until the general directive is canceled. Specific directives and marketing directives identify users for receiving a marketing objects. In one embodiment, the centralized processing engine is adapted to save the information associated with each directive as data and/or a record in a database which may be referred to herein as a directive repository.

A marketing object may be provided by a user or a third party. One marketing object may comprise one or more marketing items, such as, but not limited to, coupons, announcements, advertisements, promotional codes, job postings, resumes, personal profiles, and other marketing items known in the art. It is contemplated that the centralized processing engine may save the information associated with each received marketing object as data and/or a record in a database. When a marketing object is provided to the system by a user, the marketing object may be associated with a marketing directive provided by the user, wherein the marketing directive may specify to whom, and when, the marketing object may be distributed. Similarly, the consumer directive may instruct the system to deliver certain types of marketing objects to the user via the system. Directives and marketing objects ("MO") may comprise information (also referred to herein as conditions or conditional information) related to the delivery of the directive/MO such as, but not limited to, (i) a date and a time for one or more users to receive the marketing object associated with the directive and (ii) a company to distribute a marketing object.

Notifications of marketing objects may be generated when a specified condition is satisfied. Conditions and notifications vary according to the subject matter. By way of example, a user may be notified when a product becomes available, is on sale (i.e., at a discount, time and date to receive product), or is offered by a vendor at or below a certain price, or is available as a refurbished or open-box item. A user may be notified when a vendor introduces a new product or a newer version or the next generation of a product. A user may be notified when tickets to an event are offered for sale. A user may be notified when a celebrity makes an appearance locally or on television, or is interviewed, or appears in a newly released movie, or makes a public announcement. A user may be notified of each show or movie at a particular venue. These are non-limiting examples of conditions and notifications.

A user may specify a condition for notification using a user interface with form fields. The fields vary according to the subject matter to which the notification pertains. In the case of product, fields may include a selling price below which a user is willing to purchase the product, availability at a specified venue, coupons, public announcements, and other variables pertaining to the marketing and sale of a product. In the case of a celebrity, the conditions for which notifications may be provided may include television appearances, in-person appearances, shows, announcements and the like.

A user's calendar may be updated with a notification. This is especially useful for time constrained notifications, such as notifications of conditions that will exist for a limited time (e.g., sales, live performances, coupons with expiration dates). Illustratively, an .ics iCalendar file or other compatible calendar file or data stream may be sent (e.g. pushed) to a user's calendar app on the user's client computing device to populate the local calendar with the date-related and/or time-related notification information. The process may be automated, requiring no user intervention.

First user marketing directive associated with a subject matter and condition matching the second user consumer directive and subject matter associated with a marketing object when satisfied, then distributed with a link to facilitate a purchase to the first user.

First user marketing directive associated with a subject matter and a condition searching for the second user matching consumer directive and marketing object in the meantime sending the first user commercial advertisement associated to the matching subject matter prior to the matching marketing object distribution associated with a link to the first user to facilitate a purchase.

The marketing object is an image, file, stream or data that will be forwarded to each user with a consumer directive that matches a marketing directive. The marketing object may be stored in the database.

A computer implemented consumer-driven centralized marketing methodology comprising steps of: receiving from a first user via a first programmed computing device a first directive, said first directive including a condition and identifying the first user and identifying a subject matter of interest to the first user, the condition comprising a condition from the group consisting of a price condition for the subject matter of interest, a pricing discount for the subject matter of interest, a topic for the subject matter of interest; Storing the first directive in a database on a second programmed computing device at a first time; Receiving from a second user via a third programmed computing device a marketing directive, said marketing directive identifying a marketed subject matter and including a marketing object; Storing the marketing directive in the database on the second programmed computing device at a time other than the first time; Subsequently, using the second programmed computing device, determining if the subject matter of interest of the first directive matches the marketing directive and subject matter and if the condition is satisfied, in the meantime sending the first user commercial advertisement associated to the matching subject matter prior to the copy of the matching marketing object distribution associated with a link to the first user to facilitate a purchase of the marketing object; If the subject matter of interest of the first directive matches the marketing subject matter and the marketing directive and the condition is satisfied, then making available to the first user, via network communication, from the second programmed computing device to the first programmed computing device, a copy of the marketing object associated with a link to facilitate a purchase of the marketing object.

Time bound provisioning is available. All directives may be time bound. In other words, a directive may be active for a limited period of time, defined in hours, days, weeks, months or years. For example, a general directive may be time bound for a year. The user associated with the general directive may receive a reminder of the time limit prior to the expiration, giving the user a chance to re-provision or remove the time limit. As another example, a merchant user may impose a time limit on a marketing directive for a coupon. The marketing directive may expire on a determined date.

Unit provisioning is also available. For example, a merchant may want to limit a marketing directive to a maximum of 100 or 1000 or 100000 users or transactions. In this case, after the unit limit is reached, the marketing directive expires. The unit limit is reached when the number of copies made available to users equals the unit limit or when the number of transactions using the marketing directive (e.g., using a coupon provided with the marketing directive) exceeds a unit (e.g., transactional) limit. For fairness, in one implementation, the limited number of users may be determined randomly, or using a random selection algorithm, from all users with consumer directives to which the marketing directive is responsive. Alternatively, the limited number of users may be selected based on seniority of their consumer directives—first posted, first served. These and other user selection criteria may be employed if a unit limit must be applied. In the case of a transactional unit limit, the limit may be applied on a first come first served basis, Buying products in real-time from television or radio. Actions or directives can also be selected to interact with television to receive information from a particular product or service to buy from a phone instantly. Celebrities, promoters, designers, television networks, television shows (e.g., QVC) radio networks may use such functionality to promote their shows and the products featured in their shows. A user may be notified of the date and time that a televised or radio broadcasted event, performance or appearance is occurring, or a product is being displayed on TV or discussed on radio. The notification may include a calendar entry. Concomitantly, the system may include a list, for each show or program, of products that appear in the show or program by time and date. The list may be linked to the notification and calendar entry provided to the user. A television show's calendar may synchronize with the user's calendar on their phone in real-time or the system. When an action or directive is selected the product shown in real-time will have a control or options for the user to select in real-time on their phone displaying the product on one or more strips in order to make a purchase.

Network or television programming and retailer's product details via data feeds, API, can be synchronized with the system within the invention and with the user's mobile digital device, remote etc even if coming from a satellite . . . . This synchronization can come with a trigger for the user to initiate for displaying products shown on television or heard on radio stations into their mobile digital devices, data feeds or calendars at the same time they are watching the television or listening to the radio. Each network, celebrity, personal stylist, designer, retailer or any source will have a portal which has access to the repository of archived purchases or universal virtual closet for selecting items or products they want users to access for product details while they are on television or at events. Any source may select any item within the virtual household for wearing purposes or select something from the repository of archived purchases or household repository they want to display on others phones or digital device when those users or viewers trigger the show at the time the product is shown from synchronization or the time or timeframe the Fashion Advertising Model is saying they are wearing the products or items. For example, if a specific celebrity like Justin Bieber selects products from his virtual closet he is wearing today at 7 am and then selects the network and/or show he is wearing those products on, then anyone who inquiries about Justin Bieber, can know exactly what he is wearing on that show at that particular time and day. The celebrity (Fashion Advertising Model), just like any other source or Fashion Advertising Model will have a portal or Page that lets them select the products they are wearing today and the network, show, or event they are wearing it on or the location they are wearing it at, and the day and time they are wearing the products. Most celebrity location awareness will be determined by the calendar of the event the celebrity will be appearing. The chronological synchronized programming of the networks or television programs may be synced with user's mobile digital devices. User's may be alerted, prompt, or notified on products or services associated with marketing or consumer directives during or prior to commercials coming on television or the radio for viewing or purchasing purposes. Companies, advertising agencies, or any company may have their products or services shown on a television show, movies, news, and commercial synchronized networks programming time slots 24/7 and their data feeds or portals to these products and services in the centralized computing system of all things. Once a television show or radio commercial, event, or product is triggered, a list can appear with images showing products on that particular program, show, or movie for the user to select. These images and product details will also trigger the data feed or portal or website matching the products that particular hour or time shown with the products or services within the centralized computer system or repository. The process is chronological synchronized between all devices, all consumers, network programming systems, data feeds, and portals. The networks may also issue a data feed to companies for product syncing with their programming. Companies or networks during producing or prior to airing of the shows, events, news, or movies may have their own portal and website where they could list products they purchased from another storefront or the centralized repository within the invention. Within the centralized repository of products from multiple data feeds from various companies, the producers, directors or Production Companies of the shows or networks can access the website or application to purchase products they will be using in the production of their show, programming event, news event, or movie. Once the products are purchased, these products will be categorized, archived or save within their inventory within their own website of purchased products. Once the products are categorized, any company, network, producer, director, or production company can access or select any product they will be using on their show, event, news, or movie before or during production or filming, and/or they could select products that will be shown during programming prior to the program being aired on television or radio. Each company, production company or producer or director will have to sign up for an account to the centralized system and repository of products as described in the invention.

Within the production companies, networks, producers, or director's account or website, they will have a matching interactive synchronized chronological calendar of programs being aired, to that of the television or radio networks calendar of programs being aired. The purpose of this is so these producers, directors, or Production Company, or networks could match up the products being displayed on the particular show and sync it with the time and date the actual show, movie, or event will be shown or aired. Once again, all consumers will have a trigger to sync to the program to display the products they are viewing, inquiring, or want to purchase. Each product displayed comes with product detail information, a price, and where it can be purchased. Products can display by selecting the show anytime or during the time shown or trigger of the mobile digital device syncing with the television set or radio station.

In this invention, commercials, shows, movies, events, and news are equal to or the same as video, video data, video streaming when delivering or distributing advertising, content, products or services to the user, customer, or consumer.

Universal Virtual Closet is the area of focus for claims with many ways on how it's used: (uses matching logic and Slide-by Technology). Virtual Closet and Repository of Archived Previous Purchases. System's virtual closet and other features can integrate with the websites, rewards system, check out systems, or point of sales systems of vendors and other companies. For example: If a user purchased a product from a vendor's website or stores or within the centralized system within the invention, the product that was purchased can be sent as an image and product details to the user who bought the product or to the person's virtual closet who the user wants the purchased product to populate and categorize. User will have option "button" for the product purchased to categorize into their own virtual closet or archived purchases or a friends or family's virtual closet or archived purchases by prompting the contact list of friends and push a button that allows that product purchase to go to the friend's or contact's virtual closet or repository of archived purchases. The button will also come with a snooze button that tells the system to delay the message, push the product(s) to their friends or family member's own virtual closet or repository of archived purchases and options to give the distribution or notification of the product purchased at least for example 5, 10, 20, 30 days before alerting the friend or family member about the product. Then the user who For example, If the user is buying a product for his girlfriend's birthday a month from now, the user will have the option to delay the response for 30 days that will ask his girlfriend if she would allow this product to be categorized in her own virtual closet. The girlfriend or recipient will have a button "accept" that allows her to accept or reject. (prompting message sent with product) user's product or service info may be categorized in the financial system or tax organizing system within the invention for correct and accurate categorization.

Product information, images can also be captured by credit card, merchant services, gift cards, reward cards, rewards system, coupons to be categorized to the user's Virtual closet or archive purchases within the invention. Our system can also be linked to the company's reward system or point of sales. The reward system can find a user via his or her phone number and use that phone number to trigger the user's smartphone to display products purchased to save into their own virtual closet or send it to the virtual closet or archive system of previous purchases of the family member or friend. Reward system will trigger the first purchaser's phone number to trigger the first user's smartphone to capture, find, and display product details to the first purchaser.

Fashion Closet is a closet systematically set up for the user based on purchases. All purchases are archived and categorized. Clothing, shoes, beauty, jewelry product can make up the fashion closet. Universal Repository of archived previous purchases or virtual closet: The virtual closet or archived system for previous purchased products can all be universal. This system can work across all stores. Once a user makes a purchase at the point of sale device, the system can recognize the user via payment system, rewards system, reward card, phone number, visa, mastercard, Samsung pay, apple pay, american express etc and the products they purchased. Purchases made from a credit card can trigger the digital device or smartphone of the purchaser, find the image and product details of the product purchased in the specific brick and mortar department store for example or online store for example in our database and send it and display it to the user's digital device or smartphone in a list or queue. The system then gives the user the opportunity to save those products in its own virtual closet or send them to a family member or friend in which the purchased product was intended for so they can accept or reject it from their own virtual closet. Credit card or payment system can be linked to the bank and can send a notification to the user, which then sends trigger to the user's smartphone to display products.

Each user may have the opportunity to take a selfie or take a picture to showcase everything that they said they were wearing that particular time duration or times, morning, day or evening when they select each product they are wearing from their virtual closet. System will capture product details image including and save it to the database. In another example, the mannequin system can be used with the entirety of the invention for a user to shop for family member's or friend's exact sizes of clothes or any other product and tell the system or through an action via the digital device to send it to the family member's or friend's personal virtual closet or archived purchases once the product is purchased by the first user. Once the product is sent, the user has the opportunity to accept or reject. If the family or friend accepts, the product will be automatically categorized into their own virtual closet or archive system for all purchases. Also, when someone makes a purchase at the stores physical location, please tie what is purchased using the stores reward system (phone number of customer) which is linked to our system to recognize customer and products purchased (via product code) to add products purchased to their virtual closet. once the phone number or email is entered and the product code is scanned, the system will recognize the product detail online within the invention and give the customer the option to add the product(s) to his or her own virtual closet or repository of archived previous purchases or send them to a family or friend who is captured in the mannequin system.

Virtual closet and in-store and out of store recommendations. Within the invention, any product that a user purchases is saved and categorized within the user's virtual closet or repository of archived purchases. All products details and attributes including the images are saved and categorized. Using Geo location technology, latitude and longitude coordinates, as soon as a user enters the store location, the system can immediate recognize the user via the digital computing device. The system may also recognize all the products details and attributes. The system may also via the online store may recognize products in the store that matches (color, sizes, and dimensions) the products previously purchased inside the user's virtual closet or virtual repository of archived purchases or previous purchases. The system may then collect one or more outfits (Top, Shirt, Pants, Skirt, Shorts, Shoes, Heels etc. . . . ) by grabbing the image and product detail within the user's virtual closet or virtual repository of archived purchases with products within the online store of the brick and mortar location via the matching logic and send the products to the user via the slide-by matching system, tri-slide, 9 flop or any other form in a form of a notification for the user to click on. Once the user clicks or access the notification by touch, the user's personal slide-by matching system, auto-match system, or tri-slide technology may appear or be accessed with all of the matching products from the store and virtual closet or repository of archived purchases. The user can now interchange those products recommended to them based off product within their virtual closet or repository of archived purchases via the matching logic, auto-match system, tri-slide or slide-by technology. The matching logic may also use a graphical database.

Mannequin system. Mannequin system will save clothing or shoe sizes, favorite fashion styles, birthdays, anniversaries, height, weight, or any other personal information for the user and any of their friends and family and integrate with the entirety of the existing invention. In one example, the Mannequin system can allow a user to search for pair of jeans or shirt in their exact size and tell the system to find every person in the system with their exact weight, height, pants size or any other dimensions that has taken a picture wearing those exact same jeans. This will give the user an opportunity to see what those specific pair of pants in this example looks like on another user with their exact same body dimensions.

Recommendations for events purchased through the system: System can recognize each event and how people dress at the event to recommend products to wear for the user. System generated Recommendations can pull clothes from a user's fashion closet or an inventory of archived purchased products from each user and match it up with currently viewed products or products on sale from one of more vendor or retail stores at anytime and anywhere. These recommendations can come prior to a wedding, vacation, or any event that is schedule from the user or the system can just recommend products randomly based on newly stocked products, products that are discounted, previous purchases (purchase history), matching brands, etc. . . . user can also manually match up products. Product can be matched using the matching logic in the invention.

System can also just send the user system generated clothes and shoes (products) from wholesalers, vendor, or retail stores only. Companies can use this system to dress mannequin inside the establishments or department stores. Artificial Intelligence recommends products based off Flight info purchased from system, weather etc. . . . system can basically pack your suitcase from a collection of scheduled events. System captures and saves products and services from the centralized system and repository of a family of vendors and file them into categories for the user. Example: if the user purchases a shirt, pants, bike, airline ticket, concert ticket and hammer, the system will save images, product and service details and file it away in the user's personal virtual closet, tax filing, and financial planner and just the category for which it belongs for tax purposes, financial recommendations, financial advising, matching purposes, recognizing saving or spending habits amongst a unlimited of other things. Features will be a part of artificial and semantic intelligence and machine learning with the current invention. All features can be systematic and automatic with or without user intervention. Our vision is to create a centralized world where business marketing and consumer's needs and wants not limited to products, services, and entertainment options from all industries will be learned and managed for timely pin point systematic recommendations, reminders, and purchases based on priority and popularity with little or no user intervention. The assistance of such a system will significantly reduce marketing cost of businesses while significantly increasing B2C and C2B awareness of timely mutual interaction.

System can periodically read calendars of the user to look up Flight info to determine the city, state, and country the user has scheduled a flight. System will also determine the location of the hotel the user will be staying. System determining flight information and hotel information from user can also be read without reading the calendar. Since the user will be purchasing airline tickets and hotel stay from a centralized system of all products and services from multiple industries, the system will record information of these purchases to determine where the user is going or staying. System can also record information, dates and times of other purchases for that particular day or any particular day to determine everything that user will be doing. For example: the user may purchase a concert ticket in advance, make reservations for a restaurant, go to a night club, Wedding, etc. . . . . Depending where the user is going, what tickets they purchase on those days through the system, night club they may be going to, the system will perform predictive analysis and recommendations to send options of clothes the user might want to purchase on that trip. For example: Las Vegas, the system could send different bikini or swimwear if the trip was determined to be in the summertime. The system can also send matching outfits, shoes etc. . . . to the user to match up clothes or shoes they previously purchased from the Slidebuy system that was in their virtual closet with other clothes from one or more merchants or retail stores. The system could also just systematically select outfits for the user directly from their closet. The system could send movies the user might like for their flight to Las Vegas during the boredom gap from the flight time of the trip. All without the intervention of the user which includes the consumer and the company or source. System can also know where the user is traveling, determine weather, and then start recommending clothes to wear during the duration of the trip. Basically packing the user's suitcase based on known intelligence within the system. For example, events purchased and scheduled within the centralized system, weather etc. . . . . The system will know the route they might be traveling to get to their hotel to notify them of things that are interesting to them or they need to do along the route based off directives the user selects or voice commands. System generated recommendations and predictive analysis based off purchases, calendar info, schedules. AI and machine learning. Recommendations, reminders can be based off any topic, information, industry, product and services from the centralized system.

System or platform can use inventory information and data feed to promote or market products and services automatically to consumers without user intervention. If the company has an overstock of any product or have a product that has not sold after a certain period of time for example 60 days, system can be set through triggers to set out product details to the right target market who issued a directive to get that product at the condition they requested. If the company set in our system or theirs to automatically discount one or more products a certain percentage after 60 days, the system could systematically distribute these products or services to the correct target market based on if the user(s) chooses a system generated directive or action to be notified when a product or service drops a certain price point, or when an directive or action of the product or service conditions changes to satisfy the user, or when the condition requested by the user change is private or public knowledge within a certain time or for the very first time, or if the condition of the product requested already exist. For example, if a user chooses to select or create a directive or action to be notified when a specific shirt price point drop at a certain price, if that product from that specific retail company that has that specific shirt in their inventory or any company that has that shirt in their inventory selects to systematically have filters or triggers set to drop the price a certain percentage based on an aggregation or singular demand to have that price dropped to a certain percentage by the user(s) or based on expiration date and trigger date to automatically have that product or service price dropped, the system or platform will systematically send the notification to the user(s) who have selected the action or created the directive to be notified. The system or platform will systematically schedule events like concerts, comedies, movies tickets, or any entertainment options in the user's calendar and can purchase these items at the same time. User's credit card information will be saved in the system for purchases. User chooses directive to have system automatically purchase product or service on demand or when it's first available for purchase.

System can also send the product that is reduced in price or in stock to the user's auto-matching Slot Machine Mode feature or product reels with the correct product size and color for product matching recommendations from the centralized repository of vendors or from the user's virtual closet or any other product categorized for the user.

Buying products in real-time from television or radio. Actions or directives can also be selected to interact with television to receive information from a particular product or service to buy from a phone instantly. Celebrities, promoters, designers, television networks, television shows (e.g., QVC) radio networks may use such functionality to promote their shows and the products featured in their shows. A user may be notified of the date and time that a televised or radio broadcasted event, performance or appearance is occurring, or a product is being displayed on TV or discussed on radio. The notification may include a calendar entry. Concomitantly, the system may include a list, for each show or program, of products that appear in the show or program by time and date. The list may be linked to the notification and calendar entry provided to the user. A television show's calendar may synchronize with the user's calendar on their phone in real-time or the system. When an action or directive is selected the product shown in real-time will have a control or options for the user to select in real-time on their phone displaying the product on one or more strips in order to make a purchase.

Network or television programming and retailer's product details via data feeds, API, can be synchronized with the system within the invention and with the user's mobile digital device, remote etc even if coming from a satellite. . . . This synchronization can come with a trigger for the user to initiate for displaying products shown on television or heard on radio stations into their mobile digital devices, data feeds or calendars at the same time they are watching the television or listening to the radio. Each network, celebrity, personal stylist, designer, retailer or any source will have a portal which has access to the repository of archived purchases or universal virtual closet for selecting items or products they want users to access for product details while they are on television or at events. Any source may select any item within the virtual household for wearing purposes or select something from the repository of archived purchases or household repository they want to display on others phones or digital device when those users or viewers trigger the show at the time the product is shown from synchronization or the time or timeframe the Fashion Advertising Model is saying they are wearing the products or items. For example, if a specific celebrity like Justin Bieber selects products from his virtual closet he is wearing today at 7 am and then selects the network and/or show he is wearing those products on, then anyone who inquiries about Justin Bieber, can know exactly what he is wearing on that show at that particular time and day. The celebrity (Fashion Advertising Model), just like any other source or Fashion Advertising Model will have a portal or Page that lets them select the products they are wearing today and the network, show, or event they are wearing it on or the location they are wearing it at, and the day and time they are wearing the products. Most celebrity location awareness will be determined by the calendar of the event the celebrity will be appearing. The chronological synchronized programming of the networks or television programs may be synced with user's mobile digital devices. User's may be alerted, prompt, or notified on products or services associated with marketing or consumer directives during or prior to commercials coming on television or the radio for viewing or purchasing purposes. Companies, advertising agencies, or any company may have their products or services shown on a television show, movies, news, and commercial synchronized networks programming time slots 24/7 and their data feeds or portals to these products and services in the centralized computing system of all things. Once a television show or radio commercial, event, or product is triggered, a list can appear with images showing products on that particular program, show, or movie for the user to select. These images and product details will also trigger the data feed or portal or website matching the products that particular hour or time shown with the products or services within the centralized computer system or repository. The process is chronological synchronized between all devices, all consumers, network programming systems, data feeds, and portals. The networks may also issue a data feed to companies for product syncing with their programming. Companies or networks during producing or prior to airing of the shows, events, news, or movies may have their own portal and website where they could list products they purchased from another storefront or the centralized repository within the invention. Within the centralized repository of products from multiple data feeds from various companies, the producers, directors or Production Companies of the shows or networks can access the website or application to purchase products they will be using in the production of their show, programming event, news event, or movie. Once the products are purchased, these products will be categorized, archived or save within their inventory within their own website of purchased products. Once the products are categorized, any company, network, producer, director, or production company can access or select any product they will be using on their show, event, news, or movie before or during production or filming, and/or they could select products that will be shown during programming prior to the program being aired on television or radio. Each company, production company or producer or director will have to sign up for an account to the centralized system and repository of products as described in the invention.

Within the production companies, networks, producers, or director's account or website, they will have a matching interactive synchronized chronological calendar of programs being aired, to that of the television or radio networks calendar of programs being aired. The purpose of this is so these producers, directors, or Production Company, or networks could match up the products being displayed on the particular show and sync it with the time and date the actual show, movie, or event will be shown or aired. Once again, all consumers will have a trigger to sync to the program to display the products they are viewing, inquiring, or want to purchase. Each product displayed comes with product detail information, a price, and where it can be purchased. Products can display by selecting the show anytime or during the time shown or trigger of the mobile digital device syncing with the television set or radio station.

In this invention, commercials, shows, movies, events, and news are equal to or the same as video, video data, video streaming when delivering or distributing advertising, content, products or services to the user, customer, or consumer.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

In addition to the specific embodiments described herein, the systems and methods described herein can be implemented in a computer system such as, but not limited to, the FIG. 29 diagrammatic representation of one embodiment of a computer system 1800, within which a set of instructions can execute for causing a device to perform or execute any one or more of the aspects and/or methodologies of the present disclosure. The components in FIG. 29 are examples only and do not limit the scope of use or functionality of any hardware, software, firmware, embedded logic component, or a combination of two or more such components implementing particular embodiments of this disclosure. Some or all of the illustrated components can be part of the computer system 1800. For instance, the computer system 1800 can be a general purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 1800 includes at least a processor 201 such as a central processing unit (CPU) or an FPGA to name two non-limiting examples. Any of the subsystems described throughout this disclosure could embody the processor 1801. The computer system 1800 may also comprise a memory 1803 and a storage 1808, both communicating with each other, and with other components, via a bus 1840. The bus 1840 may also link a display 1832, one or more input devices18233 (which may, for example, include a keypad, a keyboard, a mouse, a stylus, etc.), one or more output devices 1834, one or more storage devices 1835, and various non-transitory, tangible computer-readable storage media 1836 with each other and/or with one or more of the processor 1801, the memory 1803, and the storage 1808. All of these elements may interface directly or via one or more interfaces or adaptors to the bus 1840. For instance, the various non-transitory, tangible computer-readable storage media 236 can interface with the bus 240 via storage medium interface 1826. Computer system 1800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1801 (or central processing unit(s) (CPU(s))) optionally contains a cache memory unit 1832 for temporary local storage of instructions, data, or computer addresses. Processor(s) 1801 are configured to assist in execution of computer-readable instructions stored on at least one non-transitory, tangible computer-readable storage medium. Computer system 1800 may provide functionality as a result of the processor(s) 1801 executing software embodied in one or more non-transitory, tangible computer-readable storage media, such as memory 1803, storage 1808, storage devices 1835, and/or storage medium 1836 (e.g., read only memory (ROM)). Memory 1803 may read the software from one or more other non-transitory, tangible computer-readable storage media (such as mass storage device(s) 1835, 1836) or from one or more other sources through a suitable interface, such as network interface 1820. Any of the subsystems herein disclosed could include a network interface such as the network interface 1820. The software may cause processor(s) 1801 to carry out one or more processes or one or more steps of one or more processes described or illustrated herein. Carrying out such processes or steps may include defining data structures stored in memory 1803 and modifying the data structures as directed by the software. In some embodiments, an FPGA can store instructions for carrying out functionality as described in this disclosure. In other embodiments, firmware includes instructions for carrying out functionality as described in this disclosure.

The memory 1803 may include various components (e.g., non-transitory, tangible computer-readable storage media) including, but not limited to, a random access memory component (e.g., RAM 1804) (e.g., a static RAM "SRAM", a dynamic RAM "DRAM, etc.), a read-only component (e.g., ROM 1805), and any combinations thereof. ROM 1805 may act to communicate data and instructions unidirectionally to processor(s) 1801, and RAM 1804 may act to communicate data and instructions bidirectionally with processor(s) 1801. ROM 1805 and RAM 1804 may include any suitable non-transitory, tangible computer-readable storage media. In some instances, ROM 1805 and RAM 1804 include non-transitory, tangible computer-readable storage media for carrying out a method. In one example, a basic input/output system 1806 (BIOS), including basic routines that help to transfer information between elements within computer system 1800, such as during start-up, may be stored in the memory 1803.

Fixed storage 1808 is connected bi-directionally to processor(s) 1801, optionally through storage control unit 1807. Fixed storage 1808 provides additional data storage capacity and may also include any suitable non-transitory, tangible computer-readable media described herein. Storage 208 may be used to store operating system 1809, EXECs 1810 (executables), data 1811, API applications 1812 (application programs), and the like. Often, although not always, storage 1808 is a secondary storage medium (such as a hard disk) that is slower than primary storage (e.g., memory 1803). Storage 1808 can also include an optical disk drive, a solid-state memory device (e.g., flash-based systems), or a combination of any of the above. Information in storage 1808 may, in appropriate cases, be incorporated as virtual memory in memory 1803.

In one example, storage device(s) 1835 may be removably interfaced with computer system 1800 (e.g., via an external port connector (not shown)) via a storage device interface 1825. Particularly, storage device(s) 1835 and an associated machine-readable medium may provide nonvolatile and/or volatile storage of machine-readable instructions, data structures, program modules, and/or other data for the computer system 1800. In one example, software may reside, completely or partially, within a machine-readable medium on storage device(s) 1835. In another example, software may reside, completely or partially, within processor(s) 1801.

Bus 1840 connects a wide variety of subsystems. Herein, reference to a bus may encompass one or more digital signal lines serving a common function, where appropriate. Bus 240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1800 may also include an input device 1833. In one example, a user of computer system 1800 may enter commands and/or other information into computer system 1800 via input device(s) 1833. Examples of an input device(s) 1833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1833 may be interfaced to bus 1840 via any of a variety of input interfaces 1823 (e.g., input interface 1823) including, but not limited to, serial, parallel, game port, USB, FIREWIRE, THUNDERBOLT, or any combination of the above.

In particular embodiments, when computer system 1800 is connected to network 1830, computer system 1800 may communicate with other devices, such as mobile devices and enterprise systems, connected to network 1830. Communications to and from computer system 1800 may be sent through network interface 1820. For example, network interface 1820 may receive incoming communications (such as requests or responses from other devices) in the form of one or more packets (such as Internet Protocol (IP) packets) from network 1830, and computer system 1800 may store the incoming communications in memory 1803 for processing. Computer system 1800 may similarly store outgoing communications (such as requests or responses to other devices) in the form of one or more packets in memory 1803 and communicated to network 1830 from network interface 1820. Processor(s) 1801 may access these communication packets stored in memory 1803 for processing.

Examples of the network interface 1820 include, but are not limited to, a network interface card, a modem, and any combination thereof. Examples of a network 1830 or network segment 1830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1830, may employ a wired and/or a wireless mode of communication. In general, any network topology may be used.

Information and data can be displayed through a display 1832. Examples of a display 1832 include, but are not limited to, a liquid crystal display (LCD), an organic liquid crystal display (OLED), a cathode ray tube (CRT), a plasma display, and any combinations thereof. The display 1832 can interface to the processor(s) 1801, memory 1803, and fixed storage 1808, as well as other devices, such as input device(s) 1833, via the bus 1840. The display 1832 is linked to the bus 1840 via a video interface 1822, and transport of data between the display 1832 and the bus 1840 can be controlled via the graphics control 1821.

In addition to a display 1832, computer system 1800 may include one or more other peripheral output devices 1834 including, but not limited to, an audio speaker, a printer, and any combinations thereof. Such peripheral output devices may be connected to the bus 240 via an output interface 1824. Examples of an output interface 1824 include, but are not limited to, a serial port, a parallel connection, a USB port, a FIREWIRE port, a THUNDERBOLT port, and any combinations thereof.

In addition or as an alternative, computer system 1800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 1800 shown in FIG. 18 such as, but not limited to, the network 1830, processor 1801, memory, 1803, etc., may comprise a cloud computing system. In one such system, front-end systems such as input devices 1833 may provide information to back-end platforms such as servers (e.g. computer systems 200) and storage (e.g., memory 203). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Products purchased with Apple Pay/Samsung Pay/Payment systems/credit or debit card/cash from any merchant or vendor storefront online or brick and mortar physical location and products saved and categorized in the household repository of the purchaser or user.

Centralized System of online products from one or more merchants and vendors, and product details including the product image and the product code/UPC. We are using CSV files, FTP files, Data feeds, Software development kits (SDK) and API's of merchants and vendors to create one centralized system.

Our centralized system of online products and product details may integrate Apple Pay, Samsung Pay or any other electronic computerized credit card or payment system to transmit money from customer payment system and merchants.

Our Universal repository of all household purchased products, details and attributes is integrated with the centralized system of online purchased products and the customer payment system of Apple Pay, Samsung pay, credit card or any other electronic or digital computerized payment system The customer/user/Influencer uses an integrated Apple Pay or Samsung Pay, Credit Card, or payment system on an electronic or digital computerized UI for banking transactions or a plastic credit card to shop and purchase products from any online store or physical store location using a point of sales device, rewards system.

At checkout, the customer/user gives the merchant or vendor the product they are choosing to purchase.

The merchant or vendor (storefront) scans the UPC/Barcode or enters in the UPC/Barcode of the products the customer/user chose to purchase into it's own internal system which is recording the product details including the product code, color, size, measurement, dimensions, price, or other attributes pertaining to each product.

The vendor or merchant completes all product scanning in their internal system calculating the final details including the final price.

The customer/user using a digital computerized device/UI of the integrated payment system or credit card scans his or her UI showing the barcode with the merchants or vendors infrared scanner or point of sales device to create a payment transaction of banking details to receive an approval of funds for the vendor or merchant from the customer The customer/user uses a credit card with a chip reader to create a payment transaction for an approval of funds for the merchant or vendor.

The customer/user uses cash to make a purchase (Merchant or vendor will use a phone number, email address, or rewards card of the customer to record and send product details to our integrated centralized system of products and integrated universal household repository of purchased products)

At check out at merchant, vendor, or brink and mortar storefront, the user uses his or her credit or debit card, electronic computerized credit card, or payment system to transmit payment for products for fund approval Once funds are approved, the final transaction and details of the products are created, recorded and saved in the internal system of the merchant or vendor Once funds are approved, the final transaction and details of the products are created, recorded and saved in the internal system of the invention and categorized in the virtual closet or household repository. SlideBuy for the company use and the customer use. (products in the invention via a database can be matched and saved internally during payment transactions. If the system within the current invention doesn't carry the product, the product can still be recorded and saved via merchant rewards system or point of sales system via SDK. During payment transactions system will look to match up product code at the merchant with the product code in our internal system and if there is no match, then product may not be recorded. There may be three or more systems talking to each other to complete transactions: internal system of the invention or centralized products, Apple Pay or Samsung pay system of centralized products and the internal system of the merchant or vendor brick and mortar.)

Once funds are approved with cash or credit card, the final transaction and details of the products are created, recorded and saved for both the customer/user and the merchant or vendor using a customer phone number or rewards system in the internal system of the merchants or vendors that can be matched with the customer name, user id, and phone number in the internal system of the invention.

All product details sent, categorized, and saved to the universal household repository of purchased products for each customer may be recorded and saved matching the customer's phone number and/or email address, and name from the merchant or vendor with the phone number and name of the merchant in the internal system of the invention. Product details categorized to the household repository or virtual closet of the customer may be from the current purchase or from historical purchases.

At the time of the final transaction of funds approval, the store name and the product code of the purchased products recorded at the point of sales between the merchant and customer will trigger the centralized system of products and product codes in the internal system within the invention. Once the product code is read from the payment system transaction, credit card transaction or phone number, email address from a rewards program, the internal system of the invention will look to match up the product code from the brink and mortar storefront products with it's own product codes from the online stores CSV file, FTP file, datafeed or API from the merchants or vendors. If there are any product codes that match, the system will make a copy of the product details including the image and price and record, categorize, and save those product details in the universal repository of household purchased products pertaining to and assigned to that customer. For example, If a product code of a shirt is matched up, that shirt and it's product details will be categorized under shirts and the "virtual closet", and then saved and archived in the universal repository of household purchased products. All matching of product codes, phone numbers and email addresses of each consumer may dictate how the product details are saved and categorized in the household repository or virtual closet.

All purchased products online and at the physical store front location of the merchant and vendor and it's attributes (color, size, brand name, product details) are archived, categorized, and saved in the customer/user/Influencer's repository of household items(fashion closet, tools, furniture etc. . . . ) using a storage database/datalake Once a product is purchased, categorized, saved in a repository of choice (household, place of business, office, movie productions, show production, event, or during commercials), any owner or company of the products purchased, can select any product they want any consumer to view or purchase and the time, place, network, show or commercial in which they want the product to be viewed, clicked on, and/or purchased in real-time on television or in person within the selected radius or street address, city, state and zip code of those products.

Also, when someone makes a purchase at the stores physical location, the system may either transfer, record, retrieve or migrate data currently purchased using the stores reward system (phone number or email address of customer) which is linked to our internal system within the invention to recognize customer and products purchased (via product code) to add products purchased to their virtual closet or household repository. Once the phone number or email is entered and the product code is scanned, the system will recognize the product details online within the invention or in the rewards system of the merchant or vendor and give the customer the option to add the product(s) to his or her own virtual closet or repository of archived previous purchases or send them to a family or friend who is recorded in the mannequin system.

System within the invention, household repository, virtual closet and other features can integrate with the websites, rewards system, point system, check out systems, or point of sales systems of vendors and other companies. For example: If a user purchased a product from a vendor's website or stores or within the centralized system within the invention, the product that was purchased can be sent as an image and product details to the user who bought the product or to the person's virtual closet who the user wants the purchased product to populate and categorize. User will have option "button" for the product purchased to categorize into their own virtual closet or archived household purchases or a friends or family's virtual closet or archived purchases by prompting the contact list of friends and push a button that allows that product purchase to go to the friend's or contact's virtual closet or repository of archived purchases. The button will also come with a snooze button that tells the system to delay the message, push the product(s) to their friends or family member's own virtual closet or repository of archived purchases and options to give the distribution or notification of the product purchased at least for example 5, 10, 20, 30 days before alerting the friend or family member about the product. Then the user who for example, If the user is buying a product for his girlfriend's birthday a month from now, the user will have the option to delay the response for 30 days that will ask his girlfriend if she would allow this product to be categorized in her own virtual closet. The girlfriend or recipient will have a button "accept" that allows her to accept or reject. (prompting message sent with product) user's product or service info may be categorized in the financial system or tax organizing system within the invention for correct and accurate categorization. Product detail information, images may also be access by the household repository of purchased products or virtual closet by integrating with the credit card system, point of sales device, merchants services, phone number, email addresses, gift cards, reward cards, rewards system, loyalty program and/or coupons systems of the vendors, stores, or merchants within the invention. When integrating with the Merchant's or vendor's rewards system or loyalty program using a Software Development Kit (SDK), credit card information, reward card information, phone numbers or/and email addresses may also allow the system within the invention to access the purchasing history of every member or buyer of the merchant or vendor. The integration of the rewards system of the merchant or vendor may allow the system within the invention to access the purchasing history of each member or buyer and add or populate those product details including the image that was purchased to the household repository or virtual closet of each user, influencer, or member within the invention by matching email addresses and phone numbers to populate the product details to the correct household repository or virtual closet of each user. The integration of the rewards system, loyalty program or point of sales system of the merchant or vendor allows the system within the invention to also populate and categorize the current purchases to the member's or user's household repository or virtual closet by primary and subcategories by accessing and product details including image and price by identifying the user and product details by credit card, rewards card, email address, and phone number that matches the phone number and email address with the system of the invention. Product codes will be used to recognize the product detail from the merchants rewards or loyalty program system and matching it in our internal system within the invention. In this invention, Repository of Archived previous purchases, universal repository of purchased products, household repository of purchased products, universal household repository, universal household repository of previous purchased products, household repository, archived purchases, archive purchases, archived system, purchasing history are all one is the same or can be treated as equal meaning. In this invention, user, member, customer, consumer, influencer, follower, fashion model, fashion advertising model, consumer advertiser may be one is the same or can be treated as equal meaning.

Provide the users with an option to add, update or delete the items which will help them to finalize their closet without much effort.

Virtual Household Product Repository

The platform or application has a centralized database of online stores, products associated with brands, sizes, prices, colors, images and other attributes. Each product can be associated to one or more stores, size, images, prices, brands etc. . . . . Upon any purchase, each member may have their website or application of products displayed in their personal sizes only.

Personal Profile is linked to the repository-Personal sizes and measurements of all kinds are collected during sign-up for each member to personalize suggestions that fit the exact measurements or sizes for each member. (ex. Clothing sizes or house measurements)

Seller, owner, or advertiser either registers a store or products into a personal or family virtual household Product repository or the seller or advertiser could have products stored into a virtual personal household repository upon a purchase as a registered user or by credit card, rewards number (purchase history) phone number or email at the physical location check out or credit card processing system of the store or online store checkout or processing system.

Once one or more products or items are stored and categorized in virtual household repository under the categories in which the product(s) belong (Household category—virtual closet, virtual living room, virtual dining room virtual pets, virtual electronics, Product category—Bed sets, Sectional couches, dining tables, Paintings, shirts, tops, skirts, dresses,), then any user or owner of the product (s) could select one or more products he or she wants to wear, showcase, advertise, or sell to any other member of the same platform or similar platform.

Each product comes with product details or attributes including the color(s), size, and image labeled or tagged by the brand or retailer before the product was purchased or registered by the user or owner. Once a physical product is purchased, a copy of the product details including the image, size and color is stored into the proper category in the personal virtual household product repository (ex. Virtual closet, T-Shirt) for each owner or member. For this reason, any product can be compared, suggested, or recommended to match against any other product that has contrasting or matching attributes for marketing, promotional, or advertising purposes to help facilitate a purchase.

Each online store associated to products can be triggered by any member or owner for the purpose of advertising, marketing, selling, or purchasing.

Any Virtual household product repository can be shared amongst members and any member can view, click, like, or purchase any product from any other member's household product repository. Members can also manually or systematically match up or be suggested products from their own personal household product repository to match or be suggested products from any other household product repository from any other member or centralized database of online stores and products. Any member can purchase any product from other member's virtual household product repository. Products can be searched, compared, suggested, recommended, or matched up by store name, brand name, product name, product category, household category, size, color, price, and other keywords or attributes from the product details.

Any product in the Virtual household product repository of any personal member could be matched up, compared, or suggested to any other product from their own personal repository or any other member's repository by a trigger button associated to a specific product and product details (product name, color, size, brand, attributes, etc. . . . ) or a trigger button associated to the online store which could be associated to the physical location that's linked to the online store, and a trigger button associated to trigger the database of other members nearby using geo location/locational services to trigger their repository and a trigger button associated to smart T.V.'s, T.V. network show information, cable boxes, satellite boxes all associated to other members and their repositories.

Any product in the virtual household product repository can be made "private" where other members cannot view or access the product. They can also be made "public". They can also be deleted. They can also be selected to initiate an online sale of the actual physical product which can come with a flat fee or a bidding system until the product is sold to the highest bidder. They can also be linked to the url or redirect from the online store that actually sold the product or any url link with similar attributes of the first product.

The virtual household repository can also be used to select products any owner or member wants to market or advertise by showcasing the product or wearing the product to facilitate "likes" and "purchases" from other members. Each product selected may be associated with the day and time product was selected, product details, store name, store link, brand name, color, size, a physical location, Television Networks and television show details like cast, channel, time the show is aired. Also by customer ID, a Fashion Calendar, a points system and a way for the member or advertiser to earn money from other members liking or purchasing the product advertised by the first member or the member who selected the products.

All products that are purchased from the platform whether from the database of online stores or the database of products are first sent to the notification page of the member. All Products pre-populated from purchase history from any store that is linked to each member via credit cards data, email, phone number, or rewards number are also sent to the notification page of each member. Once a copy of the product details for each product purchased is sent to the notification page, the user could add it to their personal virtual household product repository via a trigger button that will categorized the product under the correct "household category" and then the correct "product category" within the personal repository.

Pushing and categorizing purchased products to the personalized household repository:

System within the invention, household repository, virtual closet and other features can integrate with the websites, rewards system, point system, check out systems, or point of sales systems of vendors and other companies. For example: If a user purchased a product from a vendor's website or stores or within the centralized system within the invention, the product that was purchased may distribute an image and product details to the user who purchased the product via his or her Household Repository or to another user's (friend or family) personalized household repository. User will have option "button" for the product purchased to categorize into their own virtual closet or archived household purchases or a friends or family's virtual closet or archived purchases by prompting the contact list of friends and push a button that allows that product purchased to go to the friend's or contact's virtual closet or repository of archived purchases. The button will also come with a snooze button that tells the system to delay the message, push the product(s) to their friends or family member's own virtual closet or repository of archived purchases and options to give the distribution or notification of the product purchased at least for example 5, 10, 20, 30 days before alerting the friend or family member about the product. Then the user who for example, If the user is buying a product for his girlfriend's birthday a month from now, the user will have the option to delay the response for 30 days that will ask his girlfriend if she would allow this product to be categorized in her own virtual closet. The girlfriend or recipient will have a button "accept" that allows her to accept or reject. (prompting message sent with product) user's product or service info may be categorized in the financial system or tax organizing system within the invention for correct and accurate categorization. Product detail information, images may also be access by the household repository of purchased products or virtual closet by integrating with the credit card system, point of sales device, merchants services, phone number, email addresses, gift cards, reward cards, rewards system, loyalty program and/or coupons systems of the vendors, stores, or merchants within the invention. When integrating with the Merchant's or vendor's rewards system or loyalty program using a Software Development Kit (SDK), credit card information, reward card information, phone numbers or/and email addresses may also allow the system within the invention to access the purchasing history of every member or buyer of the merchant or vendor. The integration of the rewards system of the merchant or vendor may allow the system within the invention to access the purchasing history of each member or buyer and add or populate those product details including the image that was purchased to the household repository or virtual closet of each user, influencer, or member within the invention by matching email addresses and phone numbers to populate the product details to the correct household repository or virtual closet of each user. The integration of the rewards system, loyalty program or point of sales system of the merchant or vendor allows the system within the invention to also populate and categorize the current purchases to the member's or user's household repository or virtual closet by primary and subcategories by accessing and product details including image and price by identifying the user and product details by credit card, rewards card, email address, and phone number that matches the phone number and email address with the system of the invention. Product codes will be used to recognize the product detail from the merchants rewards or loyalty program system and matching it in our internal system within the invention. In this invention, Repository of Archived previous purchases, universal repository of purchased products, household repository of purchased products, universal household repository, universal household repository of previous purchased products, household repository, archived purchases, archive purchases, archived system, purchasing history, personalized repository, personalized household repository, personalized household product repository, personalized household product repository of purchased products, virtual household product repository, household product repository, household repository, or repository are all one is the same or can be treated as equal meaning. In this invention, user, member, customer, consumer, influencer, follower, fashion model, fashion advertising model, consumer advertiser, may be one is the same or can be treated as equal meaning.

Provide the users with an option to add, update or delete the items which will help them to finalize their closet without much effort.

Once a user makes a purchase at the point of sale device, the system can recognize the user via payment system, rewards system, loyalty program, product code, reward card, phone number, email addresses, visa, mastercard, Samsung pay, apple pay, american express etc and the products they purchased. Purchases made from a credit card can trigger the digital device or smartphone of the purchaser, find the image and product details of the product purchased in the specific brick and mortar department store for example or online store for example in our database and send it and display it to the user's digital device or smartphone in a list or queue. The system then gives the user the opportunity to save those products in its own virtual closet for example (Household Product Repository) or send them to a family member or friend in which the purchased product was intended for so they can accept or reject it (categorization options) from their own virtual closet. Credit card or payment system can be linked to the bank and can send a notification to the user, which then sends trigger to the user's smartphone to display products. Our system can also be linked to the company's reward system, loyalty system or point of sales.

Trigger 1—Adding purchased products from a store location to the personalized household repository—

During a purchase transaction of the user, the rewards system or loyalty program of the merchants or vendor can find a user via his or her phone number, email address, or rewards number and use that phone number, email address, or rewards number to trigger the user's Customer ID number and triggers the product data feed database, API or online store associated to the Physical Location of the brick and mortar in the system in the invention. During the purchase transaction of the user at the store physical location, the system will recognize the product(s) code from the transaction and trigger the identical product(s) code in the database of product data associated to the online store and distribute those products to the User Interface to display those product details purchased associated with options to be categorized and saved into the user's Personalized Household Product Repository (virtual closet or archive repository of purchases), or family member or friend's household product repository that is synced virtually to the User Interface of the user.

Trigger 2—Populating purchase history of products and services to a user's personalized household repository The system within the invention is associated or linked to the rewards programs of one or more store merchants or vendors for purchase history. During the signing up process within the invention, as the user enters his or her phone number, email address, or rewards number or during the confirmation or approval process of the user's phone number, email address or rewards number, the system will check "all merchant's or vendor's" rewards program associated or linked to the system to see if there are identical or matching phone numbers, email addresses or reward numbers to the user during or after sign up approval. The system will then identify all stores with matching phone numbers and email addresses, trigger the online store product data database or api within the invention associated to each store or the product details associated to each product including the image in the merchant's or vendor's database and distribute all the user's product purchase history including a url link associated to the product details and check out system of the merchant and vendor, if applicable, to a "holding area product repository" or "database" (products before they are categorized in the personalized product repository—may also be the notification page). Each product from the purchase history can be viewed on the user's interface. Once the product purchase history is captured or held in the system of the invention via a personalized holding area product repository, the user via a user interface may accept or delete the product. If the product is accepted via a user interface, the product details including a url link and image associated to the online store database or API product feed of the online store held in the personalized holding area product repository may be transferred and categorized into the user's Personalized Household Product Repository by "Household Category" and then "Product Category" manually or systematically using the product detail attributes for sharing or re-distribution to followers of each influencer for marketing and advertising purposes to facilitate a purchase. If deleted via user interface, the product will be deleted from the Personalized Holding Area Product Repository (notification page) If product accepted no longer have a product url link associated to facilitate a purchase, then the system will distribute the product details including an image of the product. All products may be associated to similar products within the centralized product datafeeds from the product database for distribution of marketing, advertising, or purchases purposes.

Marketing, Advertising, and Purchasing Triggered Product Distributions Options from the Personalized Household Repository of Purchased Products of the "Influencer" may require the Influencer/User to select the product(s) they want distributed to or viewed by the "Follower" via a Fashion Calendar or matched up or suggested against other products being sold from its source, brands or stores. When products are selected by the influencer to wear privately or in public, If wearable products, the Influencer will take a photo of themselves in the wearable attire selected, the system could either recognize the products in the photo by image and/or facial recognition by scanning the influencer in the photo to locate the customer ID, and then recognize the Virtual Personalized Household Repository and then recognize the items on the photo through image recognition technology. This increases the likelihood of recognizing the precise products because the image recognition search is limited to just the influencer (user's) Personalized Household Repository of purchased products or the system will just recognize the products selected by the influencers from their Personalized Household Repository or Fashion Calendar and record the location, second, minute, hour, day and time the products were selected to wear in public once the Influencer takes a photo of themselves wearing the products. Anytime a Follower or another user initiates a trigger for product distribution or to view the products associated to the fashion calendar that was associated to the photo and products selected, the products of all users on the show that selected products from their repository may be distributed to the follower's user interface and personalized website via a complete profile, fashion calendar or a my style page to show the product details of what the influencer selected including a url link to the source's website. All user's earn money to advertise their own clothes. If it's a non-wearable product, then the owner can just select the product(s) that will be shown on the show that day or select the product that will be in the building that day. Both scenarios are examples on how other products can be advertised or marketed by the influencer and triggered by the Follower. If the product is triggered while in a physical location by the follower, the longitude and latitude will be used to locate the seller for example and furniture in a Starbucks. If shown on T.V., the network and show the product will be displayed on can be searched to retrieve product details on T.V.

Influencer may select from the virtual closet what he or she is wearing today which is time stamped until 4 am of their current location or until they select other products to wear that day which those products will be time stamped.

Influencer may then take a photo of themselves wearing the products they have selected to wear.

The Influencer may then enter a location, select a location, enter a T.V. Network, a show, venue or an event of the exact location they will be appearing when wearing the products.

Those selected locations will be saved in the database for each Influencer and any follower located at the selected location or anyone looking at the show etc. . . . The Follower could then select the show name, T.V. network or search the celebrity name to reveal exactly what the Celebrity or Influencer is wearing on the show. The Follower may then have options to "Like" or/and Purchase product worn by the Influencer or Celebrity and receive similar Products to the products worn by the Influencer or Celebrity. The show name, T.V. network, and a celebrity search may be associated products associated to product a url link associated to the Store, Merchant or Vendor online product datafeed via the database or API associated to product details associated to a check out processing system.

How Influencer earn money: Merchants, Sellers or Vendors payout for every product is purchased within the invention. If the product is sold from an Influencer, the Influencer receives a percentage of the total payout. Once a product is selected by the Influencer for advertising or marketing purposes, the product is linked or associated to product details including an image, price point, and merchant's or vendor's or third party seller's check out processing system where the product can be purchased from the Follower and shipped to the Follower. Each product url link in the personalized household product repository is associated to a store (Merchant or Vendor) which is associated to product details which is associated to the Influencer's Customer ID which is associated to the marketing affiliate program that records purchases and who made the purchase which is associated to the system within the invention that is associated to the a multi-level marketing system that records Follower's purchases (including product details), Influencer's points from the Follower's purchase, Influencer's earned percentage from the Follower's purchase, Influencer's earned money from the Follower's purchase. Once a Follower makes a purchase from the personalized repository of the Influencer which is associated to the Product URL link, the system will record the time and day of the purchase, record the customer ID of the Follower and the Influencer, the system will recognize the purchase price and the product details, distribute the product details including the Url link to the Holding Area Repository or distribute the product details including the url link directly to the personalized household product repository of the Follower, then send the Follower Customer ID to the Influencer, Send a copy of the product purchased by the Follower to the Influencer including the purchase price, then the system will calculate the percentage amount due to the Influencer from the purchase. The Influencer may then transfer funds into their bank accounts.

Trigger 3—Purchasing directly from T.V.

Celebrity or Influencer selects product(s) they are wearing from their Personalized Household Product Repository (Influencer's Portal" (Virtual Fashion Closet). Each product selected is associated to a Product URL link which is associated to Product Details which is associated to a check out processing system. When an Influencer or Celebrity selects one or more products to wear, they will have to take a photo of themselves. The photo taken of themselves using the camera from the digital user interface is associated to the products that are selected from the Virtual Closet. Once the photo is taken, the system links the selected products to the photo via a Fashion Calendar, Via the Profile page, via a My Style page, and Newsfeed which are all associated to the Customer ID.

Upon associating an item with a virtual closet, a fashion advertising model, also referred to herein as an influencer, may identify in the virtual closet which items the influencer is wearing for the present day. Upon selecting one or more items, the selection may be associated with a time period. One such default time period may comprise period running form the time the item was selected until 4:00 am the following date in the same time zone. Any follower of the influencer, as described herein, that accesses the influencer's profile in the application during the time period and chooses to view what items the influencer has identified as wearing will see the items selected by the user. The default time period may be set to any particular time. Additionally, the default time period may display other items if the influencer changes outfits and/or otherwise updates the application to display other items as being worn by the influencer.

Upon identifying what clothing items the influencer is wearing or other products the influencer is associated with, the influencer may access a camera feature on the application and take a photograph (e.g., a "selfie") of the influencer wearing the selected item(s).

In the publish screen, the influencer may select to display the items associated with the influencer immediately or may select to display the items at a time scheduled in the future. When choosing to publish immediately, the influencer may designate a location associated with the publication. Such location may be updated by the influencer as the influencer changes locations throughout the day. Such locations may be broad (e.g., "Los Angeles") or narrow (e.g., "Tropicana at the Roosevelt"). Broader or narrower locations and locations/areas in between, are also contemplated.

When a post is scheduled, it is contemplated that the scheduled post screen may be displayed. Various selections may be chosen by the influencer, such as broadcast media networks (e.g., TV/Radio Network) and shows (e.g., TV/Radio Show). Also contemplated along these lines are other media types such as, but not limited to, print media (newspapers, magazines), internet (YouTube, Facebook, Podcasts), and Out of Home media types. Additionally, or alternatively, live appearances at identified city, states, and event locations may be chosen, as well as a date and time of such live/media appearances. Upon selecting this information, an additional scheduled post screen to provide additional information related to the scheduled appearance may be displayed. Upon providing the necessary information related to the publication, the influencer may choose to display the information in a calendar associated with the system, such as, but not limited to, a fashion calendar. It is further contemplated that, upon publishing the items, a user searching for an identified media publication may access the items associated with the influencers that have uploaded items into the system and associated for the media publication. Time settings associated with the publication may enable/disable users to access the items at appropriate times (e.g., only during/after a TV show has aired). The fashion calendar may display one or more photos or selfies the influencer chooses take of themselves wearing the same outfit or clothes in the same day. The fashion calendar may also allow influencers to publish one or more photos and selfies of themselves wearing different attire or clothes worn during a single day. All photos or selfies the influencer takes of themselves and products they have chosen to wear in the virtual closet during the same timestamp may be populated and published to the fashion calendar automatically or manually. The fashion calendar operates like a regular daily and monthly calendar with days, months, years, dates, and times except the fashion calendar populates products, attires, or clothes the influencer wears every day. The fashion calendar tracks or timestamps the place the influencer was located when they took the photo or selfie even if postponed, the time the influencer took the selfie or photo even if postponed, and the day the influencer took the photo or selfie. The fashion calendar is also used for the follower to view and purchase products worn by the influencer and follow the styles of their favorite influencer.

The Influencer may then enter a location, select a location, enter a T.V. Network, a show, venue or an event of the exact location they will be appearing when wearing the products.

Those selected locations will be saved in the database for each Influencer and any follower located at the selected location or anyone looking at the show etc. . . . The Follower could then select the show name, T.V. network or search the celebrity name to reveal exactly what the Celebrity or Influencer is wearing on the show. The Follower may then have options to "Like" or/and Purchase product worn by the Influencer or Celebrity and receive similar Products to the products worn by the Influencer or Celebrity. The show name, T.V. network, and a celebrity search may be associated products associated to product a url link associated to the Store, Merchant or Vendor online product datafeed via the database or API associated to product details associated to a check out processing system.

Establishments, Owner, Network, Production Studio or Influencer selects product(s) they may be displaying in their establishment or on television. (Virtual Starbucks)

Establishment, Production Studio, Owner or Influencer must select one or more products from their Personalized Household Product Repository which is associated with a selected day, time, show name, and Network the non-wearable products will be displayed on the show through their portal that includes their Personalized Household Product Repository, time, day and year stamp of what products are being displayed on T.V., Episode and Season information of the show, show name, name of movie, network it will shown on T.V., address of physical location the recorded or live show is airing in front of studio audience if applicable, The times products are being shown on T.V or in a movie can be selected down to the milliseconds for precise time the product is actually being shown. Each product selected is associated with a url link for product detail information including a sale price and could also be associated to similar products using machine learning technology from product detail information.

Any Follower will have a (follower's portal) to select or search the celebrity or influencer they are looking at on television that is wearing products of interest or the Follower may select Network, show, or movie they are watching from a menu of entertainment television or streaming options driven from the database within the system, FTP file, or API from Networks or third party sources. Once the Follower selects the Show or movie from its User Interface, the system will display the influencer that are on that show or movie that has selected products they are wearing from their Personalized Household Repository using their Influencer's portal or the system will display on the Follower's User Interface the non-wearable products that are being shown on that show or movie or establishment that was selected from the Personalized Household Repository of purchased products of the Influencer (owner, Production Studio, Establishment). If wearable products, the Follower may select the influencer or influencer's they are interested in knowing what they are wearing, and the system will show you the products they are wearing throughout the movie or show or at the exact time the influencer is wearing the product by initiating their trigger button. The Influencer while at the live show televised in front of a live audience or filming location, could trigger the location to confirm or time stamp that he or she is at the location that may be televised live or at a another time. Once the location is triggered, the location by street address and place name may be linked or associated to the actual show name and network and channel the show will be airing on television. Prior to leaving for the televised show location, the Influencer could select an immediate post or postpone post or scheduled post after selecting products they are wearing from their Fashion Closet with the time, date, show name, and T.V. network name. When Followers are viewing television, not only can they received a list of celebrities via a digital user interface that have selected products to wear to earn money for advertising those products or trigger the celebrities on television to view, like, and purchase products they are wearing but the Follower may also receive Influencer's profiles from products they like or want to purchase on television that are worn by the Influencer which is associated to the Influencer's fashion calendar. The influencer's profile may also be shown on the Follower's user interface after the Follower has selected the TV show or Trigger the T.V. show where they saw the Influencer wearing the products. In the system, from a periodic check or GPS location check, the system will be able to confirm the Influencer was actually at the location during the time and day the show was being filmed by checking the GPS coordinates of the trigger and matching them up with the actual coordinates and street address where the T.V. show was actually being filmed. The system will only display Influencers from the television show to the Follower's user interface that had confirmed and approved matching GPS location, matching T.V. show names from the triggered location and Television show selected after taking a photo associated to the products selected, and time, day and place the show was airing. Only one approval process can be used to confirm and approve.

Trigger 4—System recommended products shown on T.V. from a commercial or a source who is selling the product's portal and Personalized Universal Repository of archived purchased products, purchasable products (products or services you want to sell), retrieving and then matching up products previously purchased (personalized household repository) from the user viewing the T.V. show or commercial at that particular time for the user to facilitate a purchase:

Steps for buying products from television commercial or matching products from television against products users own at home or at a business location.

Smart phone and Smart T.V.

Through location base services or beacon, the Smart T.V. can recognize if one or more members are in front of any specific television by recognizing the owner or owner's of the smartphone that is in front of the television.

Application needs to be on and locational services is on

Additional process—Cable box/satellite is synchronized to the smartphones of the owner of the cable box or its family members. Cable Box/satellite can also be linked or synchronized to each member or owner by Bluetooth or wifi. The platform or application is linked to the cable box or satellite boxes of the networks or satellite providers.

Additional process—The SlideBuy database is sync with the networks or network or satellite providers or streaming services for T.V. program information or metadata show information including corresponding channel positions, network affiliations, airing dates, airing times, airing channels, titles, episode titles and descriptions, channel logos, cable information, network information, show level information, run times (synced), times and dates, and Celebrity bio information including the image, show, and network Identification numbers (Via API or FTP file, Delta file). SlideBuy will also have it's own database full of celebrity bio information and Identification numbers that matches the API's, FTP file, or delta file from the network providers, networks or third party company that is providing the metadata not limited to show, movie, sporting events, news, Celebrity Identification numbers and other attributes to identify topics, channels, run times and keywords etc.

All companies or networks or individual users will have their own portal to select products they want shown on T.V., commercials, in-person, at events, or online (including social networks) that they want customers, consumers, or followers to purchase from their universal repository of archived purchased products, purchasable products (products or services you want to sell), or sellable products (products you want to sell).

Retailers datafeeds api's and T.V. and Radio networks scheduling or programming API's may be synchronized for accurate dates and times of product and services awareness, product details (including purchase price and product attributes), aired on T.V. and radio in real-time for any user to retrieve those product details by pushing a button which can trigger beacons from the smartphone and the smart T.V. to display on the user interface of the user or to send a product shown on T.V. shows or commercials to the UI of the user to match against products from the user's repository of household purchased products.

Users manually or the system (through system generated recommendations) may match up products shown on Smartphones, computers, T.V. or Radio (including commercials) to products that match, associated, or is relevant to products that the user previously purchased when the user is viewing the T.V. or Radio or prior to the user viewing the T.V. or Radio for notification that the product matching will be aired soon.

this can be done by using smart T.V's, regular T.V.'s or SmartPhones. T.V. can recognize who is currently in front of the t.v. and what channel the T.V. is currently on when the user is watching the television. The Smart T.V. can recognize the user's smartphone within a certain radius or within a certain proximity through an internal geo location technology, GPS or Beacon etc. . . . when deciding what products shown on T.V. associated or relevant to the user's previously purchased products of the user's who are viewing the T.V. at the particular time. The source (Merchant, Vendor, user) may also just select the time down to the millisecond and the date and network and/or channel the product(s) will be aired on T.V. The source products to be aired on T.V. is determined by the products the source has selected to show for that date and time from the source's user interface, computerized device or digital device that may trigger the API that calls the household repository of purchased products or the database of products the source wants to sell. Both Smart phone and Smart T.V. can be used as a beacon to determine which computerized digital device is closer to the T.V. to then determine the user ID of the user or user's and then determine the products the user have in their Household repository of purchased products using machine learning and the matching logic to match products from commercials or T.V. to products the user owns and display those products to the user's user interface (Artificial Intelligence) Once a commercial is being aired from the network, show and channel, the beginning of the commercial showing (time stamped), the duration of the commercial, may trigger the beacon on the Smart T.V., which may then trigger the nearest beacon or beacons from the user or user's smartphone to initiate the matching process and matching logic for matching products from the commercial to product's within the user's household repository. User's may also push a button on the UI to trigger the beacon within the smartphone which may trigger the beacon within the Smart T.V. to initiate the matching logic that may match products from the Household Repository to product's aired on T.V. or T.V. or Radio Commercials. During this process, if the user triggers the beacon or trigger button (soft button or trigger button) on his phone which trigger's a beacon on the T.V. which triggers the date and time, the network, the channel the show or commercial is airing all down to the milliseconds, our internal system will read and evaluate all products primary category, sub categories, and attributes within the user's repository of household purchases (database) and read and evaluate the products primary categories, subcategories, and attributes including image being aired on T.V. and radio or vice versa (API, FTP or our internal database) and then the system will send the recommendations (product(s) from the T.V. and the product(s) from the user's repository of household purchases) to the user interface/smartphone/T.V. or computer of the user for coordinating or matching purposes via the color code and matching logic to view or/and facilitate a purchase.

The database or databases of the centralized system of online products and services within the invention may be triggered too for an API call, CSV file, FTP file, to facilitate a purchase through our internal gateway or through the gateway of the merchants, vendors, or companies.

Trigger 5—Determining attire or products in real-time, in person, from another user without taking a picture of them or scanning them wearing the product:

When determining attire worn by Influencers, the Follower may initiate a trigger button when within 300 feet radius of the Influencer or another user. The trigger is associated to the Personalized Household Product Repository (Virtual Closet). GPS tracking and location settings on are requirements associated to the user interface to be always on.

In Step 1 Follower clicks on the trigger button from it's User Interface with options to select a radius distance options and filtered options to narrow down search to determine the influencer(s) nearby from closet to furthest for example: (Find Influencer with Blue shirt and Red Shoes and Female Gender, and within 30 feet radius). The action of the trigger may first determine the Follower's Customer ID, Profile, and Personalized Household Product Repository, which is associated to a Zip Code, GPS Location, Place, Geo location, longitude and latitude coordinates where the trigger was initiated.

In Step 2 The system may then trigger the customer database table (customer ID) to determine and activate other nearby users (Influencers) from periodic GPS location check that monitors and records the Zip Code, and/or the City, State or Country of Influencer's and then searches or query the customer database for the GPS location, longitude and latitude coordinates of those Influencers for matching or identical or Zip Code, GPS location, and/or longitude and latitude coordinates or Zip Code, GPS location, longitude and latitude coordinates within the selected radius of the Follower at the time and day of the initiation of the Trigger. This action narrows the search within the customer database for a quicker and faster response to determine and locate the Influencers within the exact radius.

In Step 3 Each Influencer's Customer ID is associated to a product URL link which may be associated to the product table database from one or more merchants or Vendors that may be associated to product details within their Personalized Household Product Repository (Virtual Closet) that was selected by each Influencer of the product they are wearing the day and time and duration the Influencer selected they were wearing the products which may be time stamped to determine the exact time the Influencer selected to take a photo of themselves wearing the products which may be associated to the Influencer's profile which is generated from the photo taken after selecting the products worn during that time and day.

In Step 4 The system will then display the list of influencer's profiles and selected items the Influencer's are wearing at the time of the trigger initiated by the Follower's Digital User Interface device and associate the Follower to one or more Influencers so the follower may have Instant access to the Influencer's Profile, Fashion Calendar, Personalized Household Product Repository (Virtual Closet for example), and Products the Influencer selected to wear at that time and day which may be associated with a fashion calendar. The Follower may now send comments by texting with the Influencer, like a product the influencer is wearing etc. . . . , The system will only display Influencers within the selected radius not limited to (for example less than 100 feet radius, less than 300 feet radius, etc. . . . ). The follower may filter by gender, size, Color of Products etc. . . .

In Step 5 Follower may request to one or more Influencers from the triggered result to follow.

In Step 6 Once the Follower clicks on the Influencer's profile via a digital User Interface or choose to follow the Influencer, a list of products of what the Influencer is currently wearing will display on the User Interface in separate windows. Each Product is associated to URL link associated to product details associated to one or more Merchants or Vendors in the Store and product table database or via API data feed. Each window or product may display with a "Like button" with a drop down with options to either like the product "anonymously" where the Influencer doesn't know who liked the product(s) or "public like" where the Influencer will know exactly what follower liked their product or products. When the Influencer clicks the "Like Button", the Influencer will immediately receive a notification of an anonymous or public Like by the Follower. Each notification may also display an image and product detail of the product liked and the Follower profile. The follower can also make a purchase of the products. The add mannequin system records the body measurements during set up for each user by each user entering in their sizes for each category of wearable items. If the Follower decides to trigger an Influencer in real-time and decides to purchase one or more products displayed in the windows that shows each product they are wearing, the system may first check the sizes of each product of the Influencer and then check the sizes of the Follower, if the sizes of the influencer is different than the sizes of the follower, then the system will check to see if the sizes of the follower is available in the system and is the same exact product or products of the influencer. If the products are the same and is the exact size of the follower, then the system will display the product to the follower with the option to facilitate a purchase (URL Link). If the sizes are not the same, then the system will recommend a different product similar to the first product or non-matching product by Url link, product code and size. This may also work vice versa with the system checking the sizes of products of the followers first and then the influencer.

Upon associating an item with a virtual closet, a fashion advertising model, also referred to herein as an influencer, may identify in the virtual closet which items the influencer is wearing for the present day. Upon selecting one or more items, the selection may be associated with a time period. One such default time period may comprise period running form the time the item was selected until 4:00 am the following date in the same time zone. Any follower of the influencer, as described herein, that accesses the influencer's profile in the application during the time period and chooses to view what items the influencer has identified as wearing will see the items selected by the user. The default time period may be set to any particular time. Additionally, the default time period may display other items if the influencer changes outfits and/or otherwise updates the application to display other items as being worn by the influencer.

Upon identifying what clothing items the influencer is wearing or other products the influencer is associated with, the influencer may access a camera feature on the application and take a photograph (e.g., a "selfie") of the influencer wearing the selected item(s).

In the publish screen, the influencer may select to display the items associated with the influencer immediately or may select to display the items at a time scheduled in the future. When choosing to publish immediately, the influencer may designate a location associated with the publication. Such location may be updated by the influencer as the influencer changes locations throughout the day. Such locations may be broad (e.g., "Los Angeles") or narrow (e.g., "Tropicana at the Roosevelt"). Broader or narrower locations and locations/areas in between, are also contemplated.

When a post is scheduled, it is contemplated that the scheduled post screen may be displayed. Various selections may be chosen by the influencer, such as broadcast media networks (e.g., TV/Radio Network) and shows (e.g., TV/Radio Show). Also contemplated along these lines are other media types such as, but not limited to, print media (newspapers, magazines), internet (YouTube, Facebook, Podcasts), and Out of Home media types. Additionally, or alternatively, live appearances at identified city, states, and event locations may be chosen, as well as a date and time of such live/media appearances. Upon selecting this information, an additional scheduled post screen to provide additional information related to the scheduled appearance may be displayed. Upon providing the necessary information related to the publication, the influencer may choose to display the information in a calendar associated with the system, such as, but not limited to, a fashion calendar. It is further contemplated that, upon publishing the items, a user searching for an identified media publication may access the items associated with the influencers that have uploaded items into the system and associated for the media publication. Time settings associated with the publication may enable/disable users to access the items at appropriate times (e.g., only during/after a TV show has aired). The fashion calendar may display one or more photos or selfies the influencer chooses take of themselves wearing the same outfit or clothes in the same day. The fashion calendar may also allow influencers to publish one or more photos and selfies of themselves wearing different attire or clothes worn during a single day. All photos or selfies the influencer takes of themselves and products they have chosen to wear in the virtual closet during the same timestamp may be populated and published to the fashion calendar automatically or manually. The fashion calendar operates like a regular daily and monthly calendar with days, months, years, dates, and times except the fashion calendar populates products, attires, or clothes the influencer wears every day. The fashion calendar tracks or timestamps the place the influencer was located when they took the photo or selfie even if postponed, the time the influencer took the selfie or photo even if postponed, and the day the influencer took the photo or selfie. The fashion calendar is also used for the follower to view and purchase products worn by the influencer and follow the styles of their favorite influencer.

Knowing what product details of products seen in real-time/knowing what someone is wearing in real-time:

Allow user to shop from a store or stores

Allow system to capture the product images and details via API or CSV file etc. . . . after purchase from any store and archive those purchases in repository of household categories. For example: Virtual Closet, Virtual Furniture, Virtual tools, Virtual Cars etc. . . . .

Users have a repository or purchased products to select what they are wearing the moment they are ready to wear the product, they can then take a photos with products on, and then the system will time stamp a data and time the photo and products selected and ask the user if they want to publish it now to the public, make it private, of publish at a delayed scheduled time.

The user can also select any household product for example "any furniture" and place that furniture in a house they are showcasing or selling or they can select furniture they are showing on T.V. for example, The Good Morning America show. Each item when selected can be time stamped with a date and time for immediate publishing to the public or for delayed scheduling for another time or date.

Those photos and each individual product that the person is wearing is stored in a fashion calendar for the user to see what they wore and the follower to see what the user is wearing.

Each user will have a trigger button that will activate all other users within the selected radius, building, and address and have those users profiles and selected products and photos they have selected sent to their own mobile application so they can know what they are wearing in real-time. (using GPS coordinates of triggered device to form radius and send all users of SlideBuy who opted in to publish products and to be paid (also through points system and payments from clicks, views, and purchases of products worn from other users) to the triggered device of the user.

Each user will opt in once they publish their products and give our system access to their location all the time or at the time of activating the trigger button.

Each user can activate their own personal closet or repository to compare or match up clothes to the user's products from their virtual closet or they can just purchase them Trigger 6—Using Facial Recognition or Facial and Image Recognition to determine attire worn by another user/influencer on television or scanning their face in person to determine attire using facial recognition or Facial and Image to determine attire:

Facial Recognition or Facial Recognition Trigger Addition to the Virtual Household Product Repository How does this work on T.V. for any show or movie:

Addition: Trigger for television shows and movies on networks and movies from theaters can also be used with facial recognition, Image recognition, or cursor technology.

When a user is in front of the T.V., whether from a remote control or a Smart phone or any digital device, the user could trigger a button and at the precise moment of the trigger for example at 30 minutes 54 seconds, and 8 milliseconds into the movie or show, for a user to know what someone is wearing on T.V or what product is being shown on T.V.

The system will first trigger the facial recognition technology to determine the which actors or actresses or people or products that are being shown at the precise time of the trigger. Or the names, customer bio, or customer ID (including Image or photo of the customer or actor) of each person on television can be manually placed or set at the precise moment or time of any trigger moment throughout the duration of the movie or show or sporting event or commercials.

Then the system will determine the customer ID (including Image or photo of the customer or actor) of each person on television at the time of the trigger or the company ID or owner ID (customer ID) of the person or company that owns the products on T.V. at the time of the trigger.

(image recognition technology can also be triggered as a third In Step to determine products on T.V. . . . image recognition technology can be associated to the repository and customer ID)

The system will then trigger the Household Repository, then Household Category, then Product Category (for example Virtual Closet, Virtual Living room) of each customer ID identified on television from the facial recognition technology to determine what product(s) the customer selected to wear or be shown on television at the precise time of the trigger. Each product or pictogram selected by the customer or each product categorized as a Household Category and Product Category inside the Virtual Household Product Repository, are associated to one or more URL links to be re-directed to the store, source, merchant or brand the product(s) were purchased and the product details including all attributes but not limited to size, color, gender, price, measurements and image. Including a way to purchase the product.

All URL links are associated to product details (including the image) which are associated to one or more stores, merchants, sources or brands within the database. Each store, merchant or brand are associated to each personal Virtual household product repository which is associated to each customer ID.

Customer or actor's photo or image is associated to the customer ID which is associated to the virtual household product repository which is associated to the household category which is associated to the product category of each product shown on television that is owned by the customer.

All Products on T.V. can be displayed on television or on any digital device including a smartphone of the customer initiating the trigger for product details, likes, purchases, or comparing, matching, or systematic suggestions from products on television against products owned inside their Personal Virtual Household Product Repository (ex. Household category, Product Category for ex.—Virtual Closet, Virtual Living room).

The television or cable box or satellite can also recognize the person in front of the television through a beacon or smartphone to smart T.V. and geolocation technology associated to radius technology to determine how many people are in front of the television and which person is the closes. The cable box or Smart T.V. can recognize the Smartphones of each person closes to the TV using geo location technology which is associated to each customer ID which is associated to each Personal Virtual household Product Repository of the customer which is associated to product URL Links which is associated to the store or merchant database.

Time or clock meter during the duration of the show or movie is associated with the facial technology and associated with the image of the person or product on T.V. which is associated with the Customer ID or Company ID in the database which is associated to the Personal Virtual Household Product Repository of each owner or actor or actress of the products and associated to URL links to each store that is associated to the store and product database.

We use an FTP file or API that populates a database to give us times and dates movies, shows or sporting events will start and end, celebrity ID's, celebrity, movie and show BIO's. This show and movie information within the database or from a third party API may be synchronized with the network television information seen by the user in real-time.

User smart phone (for ex. Comcast on the go) can be linked to the comcast box or television to determine who is front of the T.V. to trigger Customer ID and Virtual household product repository.

Each Personal Virtual household Product Repository can be triggered for matching, comparing, or suggesting products from the store against the products owned by the customer in the repository.

Products can also be delivered or shipped directly from a warehouse or from being re-directed to the URL link of the brand or store that sells the product and shipped directly from them.

Trigger 7—Matching or Suggesting products sold by a brand or store or source to the a true direct target market or another user against their products in their personalized household repository of purchased products:

Since we know what our users own in their Personalized Household Repository of purchased products, a Brand or Store using a seller's portal or their own Personalized Household Repository of Products they are selling could select products they need to sell and our system will automatically send that product to be matched or suggested to any user who owns the exact same brand that actually using a matching logic. For example, Gucci could select a Gucci Shirt to sell and to match or be suggested against another product the user has in its personalized household product repository that is also Gucci like a "Pants" that will match the Gucci Shirt. The suggested product can also be by "Color" to match up or be suggested to another product for matching colors or contrasted looks. For example, If a user doesn't own purple in their virtual closet and Gucci was trying to sell a purple "Shirt", our system will recognize that user doesn't own purple in their closet or/and they don't own any "Gucci" in their Closet, so the system will determine not to send that user the selected Purple "Shirt" from Gucci, because that user is not the true target market because they will not be interested in Purple or Gucci because they don't own Purple or Gucci.

Trigger 8: Walking in a Physical Store Location—System matching or suggesting purchased products against products for sale in the store.

SlideBuy user should have accepted that SlideBuy app to use the Location Settings.

Location Settings should be switched on.

Influencer shops and purchases products from any online store or physical store location. All purchased products and attributes (color, size, brand name, product details) are archived and saved in the Influencer's repository (database) of household items(fashion closet, tools, furniture etc. . . . )

Walk Near Stores or Store Matches Products once you are in the Store

In Step 1 Once a user is within the exact longitude latitude coordinates of any store In Step 2 System will Trigger the user's digital device (UI) once the physical location (Geo location-longitude latitude coordinates) of the device matches the physical location (Geo location-longitude latitude coordinates) of any store In Step 3 System will then find and access the online store in our database that matches the store's physical location longitude latitude coordinates that matched the user's (digital device location) physical location longitude latitude coordinates and during the same time the system will find and access the Personalized Household Repository (database) of purchased products in the virtual closet (for example) of the user whose digital device (UI) was triggered once he or she entered store's physical location longitude latitude coordinates that matched with their (digital device location) physical location longitude latitude coordinates (entry of Physical Store location will trigger online store database within the invention for suggesting, comparing, or matching distributions)

In Step 4 The system will then in random order either first retrieve or call a product or products from the triggered online store database, FTP file, API, or CSV file reading the attributes of the product(s) including size, Image, color, measurements, and brand name. The system will then in random order, by the most purchased brand, or by the most or least purchased color either first retrieve or call a suggested or matching product or products from Personalized household repository of purchased products in the virtual closet of the triggered user reading the attributes of the product(s) including size, color, measurements, brand name for example) and match the products against other products in the database of product data from the online stores to facilitate a purchase. Using the color code matching algorithm and matching logic. (see matching logic) (Logic will recognize the total count of the same color products and same brands within the user's virtual closet via database and suggest an online store product from that triggered location to be sent to the user's tri-slide to match against a product the user has in their virtual closet based of which brand or color the user owns the most or second most) Product are sent or retrieve to display in the UI or Website or smart television.

In Step 5 The system will collect and place the first of many products to match in a reel to display one at a time in the tri-slide from the online store data that will match one product from the user's virtual closet.

In Step 6 Send the Push notification from the SlideBuy app with the matching details.

In Step 7 The user can also match manually swiping the tri-slide window from right to left or hit the "SB" button for the system to automatically match the products.

In Step 8 User is always have the preference to switch off the push notification.

Trigger 8 option for In Step 2 and 3:

User may also choose a product from their Personalized Household Product Repository and Trigger a soft button that will initiate the matching and suggested process from the online store product database to match or suggest products from the brand or store against the product the user selected from their personalized household repository. The user could trigger this button anywhere, including at home. The user may select the store or brand from the user interface where they want to access products for sale to match up or be suggested against the product the user selects from their personalized household product repository of purchased products.

System will send a new product that matches a product in the database every 10 minutes. User will have a button a button to push on the tri-slide to match the product of their choice within the virtual closet to match up to several store product when they are in the physical store location or when they are home. Must grab product using the "M" match it feature. Once product is sent the tri-slide, the user can initiate the button that matches the products when you are in the physical location of the store.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts and/or steps have been described, the order may be modified in other implementations consistent with principles of the invention. Further, non-dependent acts may be performed in parallel. Still further although implementations described above discuss use of facial and voice biometrics, other biometric information (e.g., fingerprints, eye retinas and irises, hand measurements, handwriting, gait patterns, typing patterns, etc.) may be used to identify people and provide corresponding virtual repository information.

The term "comprises/comprising" when used in this specification is taken to specify the presence of stated features, steps or components but does not preclude the presence or addition of one or more other features, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, step, or instruction referenced in this application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A computer-implemented method of managing a virtual repository system, the method comprising:
   a computing system storing a plurality of virtual repositories, each virtual repository of the plurality of virtual repositories being associated with a user of a plurality of users, and each virtual repository of the plurality of virtual repositories including item records for items owned and used by at least one user of the plurality of users, and the plurality of virtual repositories including a first virtual repository associated with a first user, and a second virtual repository associated with a second user; and
   the computer system receiving a selection of a first item record of the second virtual repository from a second computing device of a second user, the first item record corresponding to an item in use by the second user;
   the computing system receiving a first trigger from a first computing device of the first user, the first trigger requesting first information and the first trigger including media information, the media information including image data for a face of the second user; and
   the computing system performing facial recognition on the image data and identifying the second user;
   the computing system sending results to the first computing device, the results including a link to the first item record of the second virtual repository, the first item record of the second virtual repository being responsive to the first trigger.

2. The computer-implemented method of claim 1, wherein the step of receiving on the computing system a first trigger from a first computing device of the first user includes receiving on the computing system a first trigger that includes a request for information associated with at least one virtual repository of the plurality of virtual repositories associated with an identified user.

3. The computer-implemented method of claim 1, wherein the second user is associated with an event, the event being an event associated with the second user; and, during the event, the second user using items for which the second virtual repository includes item records, and wherein the step of receiving on the computing system a first trigger from a first computing device of the first user includes receiving on the computing system a first trigger that includes a request for information associated with the event; and the step of sending results from the computing system to the first computing device includes sending an identification of the second user and an affiliate link for an item record of the second virtual repository.

4. The computer-implemented method of claim 1, wherein the first trigger includes location information, the location information identifying a location of at least one of the first user and the second user at a first time at which the first trigger is received on the computing system, and the second user being in a determined vicinity of the location at the first time, and the results identify the second user, and the results provide an affiliate link for an item record of the second virtual repository; and the method further comprising:
   the first user selecting the affiliate link on the first computing device; and
   providing a reward to the second user.

5. The computer-implemented method of claim 1, wherein the first trigger includes location information, the location information identifying a location of the first user at a first time at which the first trigger is received on the computing system, and the results identify a plurality of users, excluding the first user, in a determined vicinity of the location at the first time, and the results provide a link to a selected item record from each virtual repository for each user of the identified plurality of users.

6. The computer-implemented method of claim 1, wherein the first trigger includes broadcast information, the broadcast information including time data for appearance of a second user during a broadcast.

7. A computer-implemented method of managing a virtual repository system, the method comprising:
   a computing system receiving a plurality of virtual repositories, each virtual repository of the plurality of virtual repositories being associated with a user of a plurality of users, and each virtual repository of the plurality of virtual repositories including item records for items owned and used by at least one user of the plurality of users, and the plurality of virtual repositories including a first virtual repository associated with a first user, and a second virtual repository associated with a second user; and
   the computer system receiving a selection of a first item record of the second virtual repository from a second computing device of a second user, the first item record corresponding to an item in use by the second user;
   the computing system receiving a first trigger from a first computing device of the first user, the first trigger requesting first information and the first trigger including media information, the media information including recorded speech data for the second user; and
   the computing system performing speaker recognition on the speech data and identifying the second user;
   the computing system sending results to the first computing device, the results including a link to the first item record of the second virtual repository, the first item record of the second virtual repository being responsive to the first trigger.

8. The computer-implemented method of claim 1, wherein the first trigger includes product information, the product information identifying an item for which item records exist in a first plurality of virtual repositories, and each virtual repository of the first plurality of virtual repositories being associated with a user of a first plurality of users; and
   the results identifying the user assigned to each virtual repository in the first plurality of virtual repositories, and the results providing a link to each virtual repository in the first plurality of virtual repositories.

9. The computer-implemented method of claim 1, wherein the first trigger includes a directive, the directive including a condition, and the results identify the second user, and the results include a link to second virtual repository; and
   the step of sending results from the computing system to the first computing device comprising sending results from the computing system to the first computing device if the condition of the directive is satisfied.

10. The computer-implemented method of claim 1,
displaying the results on the first computing device,
filtering the results on the first computing device, the filtering excluding a first portion of the results from display on the first computing device.

11. The computer-implemented method of claim 1
each virtual repository of the plurality of virtual repositories including a virtual repository identification;
for a first virtual repository of the plurality of virtual repositories, the computing system, receiving, via network communication, item records from a plurality of third party sources, said third party sources including a remote merchant sales computing system, the item records being records of items acquired by the user;
the computing system merging the received item records;
the computing system storing the merged received item records in a cache;
the computing system presenting to the first user the merged received item records stored in the cache;
the first user, via the first computing device, validating the merged received item records stored in the cache as presented by the computing system; and
the computing system associating the validated merged received item records stored in the cache with the first virtual repository; and
the computing system storing the validated merged received item records on a storage device.

12. The computer-implemented method of claim 11, wherein the step of the computing system merging the received item records comprising merging received item records into a table, each item record comprising a plurality of fields.

13. The computer-implemented method of claim 12, wherein the step of the computing system merging the received item records further comprising extracting data from the received item records, the step of extracting including identifying and storing data for the fields of each item record.

14. The computer-implemented method of claim 11, each item record including at least one of a photograph of an item.

15. The computer-implemented method of claim 11, further comprising the computing system associating an affiliate link with at least one of the validated merged received item records.

16. The computer-implemented method of claim 11, further comprising using the first computing device to search emails for item records, and providing the item records from searched emails to the computing system for merging with the received item records.

17. The computer-implemented method of claim 16, further comprising a software component on the first computing device monitoring browser activity for item records, and providing the item records from browser activity to the computing system for merging with the received item records.

18. The computer-implemented method of claim 17, further comprising receiving manually input item records on the first computing device, and providing the manually input item records to the computing system for merging with the received item records.

19. The computer-implemented method of claim 1, wherein the results include a link to an ordered table of data from item records associated with at least one virtual repository of the plurality of virtual repositories.

20. The computer-implemented method of claim 1, wherein the results include a link to navigable graphic representation of the virtual repository.

\* \* \* \* \*